(12) United States Patent
Costa

(10) Patent No.: US 10,095,091 B2
(45) Date of Patent: Oct. 9, 2018

(54) CONTROLLED CAMERA OFF-AXIS ALIGNMENT FOR THE DYNAMIC BORE-SURFACE-STRUCTURE INSPECTIONS VIA ROTATIONAL/ORBITAL/ROTATIONAL ORBITING ANGULAR OFF-AXIS CONTROLLED VISION CAMERA SYSTEMS AND THEIR CORRESPONDING OPTICAL POSITIONAL/ANGULAR ALIGNMENT DATUM'S

(71) Applicant: Larry J. Costa, Mooresville, NC (US)

(72) Inventor: Larry J. Costa, Mooresville, NC (US)

(*) Notice: Subject to any disclaimer, the term of this patent is extended or adjusted under 35 U.S.C. 154(b) by 1 day.

(21) Appl. No.: 15/480,594

(22) Filed: Apr. 6, 2017

(65) Prior Publication Data
US 2017/0295303 A1    Oct. 12, 2017

Related U.S. Application Data

(60) Provisional application No. 62/319,180, filed on Apr. 6, 2016.

(51) Int. Cl.
*G03B 17/56* (2006.01)
*H04N 5/232* (2006.01)
(Continued)

(52) U.S. Cl.
CPC ......... *G03B 17/561* (2013.01); *G05B 19/406* (2013.01); *H04N 5/2251* (2013.01);
(Continued)

(58) Field of Classification Search
None
See application file for complete search history.

(56) References Cited

U.S. PATENT DOCUMENTS

| 3,163,936 A | 1/1965 | Konrad |
| 4,254,552 A | 3/1981 | Samis |

(Continued)

OTHER PUBLICATIONS

Notification of Transmittal of the International Search Report and Written Opinion of the International Searching Authority, or the Declaration, issued by the Korean Intellectual Property Office for PCT/US2017/026460 dated Aug. 11, 2017, 9 pages.
(Continued)

*Primary Examiner* — Clayton E LaBalle
*Assistant Examiner* — Dennis Hancock
(74) *Attorney, Agent, or Firm* — Perkins Coie LLP

(57) ABSTRACT

An orbiting camera mount including an anti-rotation arm for connection to a spindle nose of a machine tool. A stationary pulley, having a pulley bore, is fixed to an end portion of the anti-rotation arm. The mount also includes a mounting post for connection to a spindle of the machine tool. The mounting post includes a drive shaft portion extending through the pulley bore. A drive housing is fixed to the drive shaft portion for rotation therewith and an output shaft is supported in the drive housing. A driven pulley is fixed to the output shaft and a drive belt extends between the stationary and driven pulleys, whereby rotation of the mounting post causes the output shaft to orbit around the drive shaft portion. A camera mounting stem is coupled to the output shaft and is oriented at a non-zero angle with respect to the drive shaft portion.

17 Claims, 32 Drawing Sheets

(51) Int. Cl.
*G05B 19/406* (2006.01)
*H04N 5/225* (2006.01)

(52) U.S. Cl.
CPC ........... *H04N 5/2257* (2013.01); *H04N 5/232* (2013.01); *H04N 5/23209* (2013.01)

(56) References Cited

U.S. PATENT DOCUMENTS

| | | | |
|---|---|---|---|
| 4,317,287 A | | 3/1982 | Sausele |
| 4,687,390 A | | 8/1987 | Samis |
| 4,834,595 A | | 5/1989 | Cacciotti |
| 5,339,188 A | | 8/1994 | Fritzel |
| 5,538,214 A | * | 7/1996 | Sinila ................. A61B 5/04004 248/278.1 |
| 5,731,881 A | | 3/1998 | Buechler |
| 5,775,215 A | | 7/1998 | Hirate |
| 6,099,177 A | | 8/2000 | Ito |
| 6,681,055 B1 | | 1/2004 | Sato |
| 6,802,128 B1 | | 10/2004 | Yang |
| 7,093,368 B1 | | 8/2006 | Nelson |
| 7,270,277 B1 | | 9/2007 | Koziol |
| 7,854,068 B2 | | 12/2010 | Di Benedetto |
| 8,262,000 B2 | | 9/2012 | Denniston |
| 8,336,215 B2 | | 12/2012 | Hoshiyama |
| 8,539,683 B2 | | 9/2013 | Kuno |
| 9,573,181 B2 | | 2/2017 | Costa |
| 2007/0033816 A1 | | 2/2007 | Zeng |
| 2007/0128739 A1 | | 6/2007 | Wilson |
| 2008/0061473 A1 | | 3/2008 | Laracey |
| 2009/0263199 A1 | | 10/2009 | Wang |
| 2012/0325781 A1 | | 12/2012 | Gneiting |
| 2014/0100558 A1 | * | 4/2014 | Schmitz ............. A61B 17/3478 606/33 |
| 2016/0097967 A1 | | 4/2016 | Costa |
| 2016/0219192 A1 | | 7/2016 | Rosenberry |
| 2017/0252115 A1 | * | 9/2017 | Stoianovici ............ A61B 34/70 |

OTHER PUBLICATIONS

Wordupmag. "3-axis Synchronous Belt Drive Carbon Fiber Camera Mount with GS-9257MG Servos" YouTube (https//www.youtub.com/watch?v=jCeMGGZ17Pk>) Apr. 12, 2013.

* cited by examiner

CONTROLLED CAMERA OFF-AXIS ALIGNMENT FOR THE DYNAMIC BORE-SURFACE-STRUCTURE INSPECTIONS VIA ROTATIONAL/ORBITAL/ROTATIONAL ORBITING ANGULAR OFF-AXIS CONTROLLED VISION CAMERA SYSTEMS AND THEIR CORRESPONDING OPTICAL POSITIONAL/ANGULAR ALIGNMENT DATUM'S

CROSS-REFERENCE TO RELATED APPLICATION(S)

The present application claims priority to and the benefit of U.S. Provisional Application No. 62/319,180, filed Apr. 6, 2016, the disclosure of which is hereby incorporated by reference in its entirety.

BACKGROUND

The stationary field-of-view "horizon" and/or fixed angle alignment perspective(s) of traditional vision camera systems can limit the collection of useful image data. In addition, the traditional image software algorithms used to process the anti-aliased/raw data images taken by vision cameras compromise the finer details of the image in an attempt to clarify the aliased image data noise which causes a loss/modification of the image's data (Exhibit-1).

The image sensors in typical vision cameras have their pixels arranged in a generally rectangular array, while the image's raw data captured by the vision camera for inspecting typical workpieces does not always comprise straight edges and/or features. Typical machined surfaces often have the, sometimes near microscopic, appearance of elliptical circular paths (e.g., arcs that are in an overlapping traversing spiraling pattern(s) across the surface of the workpiece/object of interest), thereby increasing the difficulties for the image software algorithms to process the anti-aliased images without the loss of useful image data.

SUMMARY

Provided herein are orbiting camera mounts and associated camera systems incorporating the same. In a representative embodiment, an orbiting camera mount can include an anti-rotation arm configured for connection, at a first end portion, to a spindle nose of a machine tool. A stationary pulley, having a pulley bore, is fixed to a second end portion of the anti-rotation arm. The mount also includes a mounting post configured for connection to a spindle of the machine tool and includes a drive shaft portion extending through the pulley bore and rotatable therein. A drive housing is fixed to the drive shaft portion for rotation therewith and an output shaft is supported in the drive housing. A driven pulley is fixed to the output shaft and a drive belt extends between the stationary pulley and the driven pulley, whereby rotation of the mounting post causes the output shaft to orbit around the drive shaft portion. A camera mounting stem is coupled to the output shaft for rotation therewith.

In some embodiments, the drive shaft portion and the output shaft can be oriented approximately parallel with respect to each other. In some embodiments, the camera mounting stem can be oriented at a non-zero angle with respect to the drive shaft portion. In some embodiments, the drive belt can comprise a timing belt. In some embodiments, the mount can include a universal joint coupling the camera mounting stem to the output shaft. In some embodiments, the drive housing can include first and second body portions. In some embodiments, the first body portion can include a pair of parallel bores configured to receive the drive shaft portion and the output shaft. In some embodiments, the second body portion can include a stem bore configured to receive the camera mounting stem and oriented at a non-zero angle with respect to the pair of parallel bores. In some embodiments, the stationary pulley and the driven pulley can have a one-to-one drive ratio whereby the camera mounting stem rotates counter to the drive shaft portion.

The disclosed Dynamic Rotational/Orbital/Rotational Orbiting Off-axis Vision Camera Systems having a dynamic rotating and/or non-rotating orbital spindle mounted vision camera being re-positional for workpiece inspection/metrology at perpendicular and or controlled off-axis alignment to the work piece surface. The camera being perpendicular and/or off-axis to the work piece surface facilitates having the detailed work piece images comprising mostly the non-linear features of elliptical circular paths—arcs that would not be aligned with the rectangular/linear array pattern of the vision camera's image sensor pixels that will increase the amount of the image's anti-aliased/raw data to be analyzed via the image processing software algorithm(s) as being additional useful/critical image data for the image software algorithms to be used/compared for the images' analysis. (Exhibit-2)

The positional, rotational and or non-rotating orbital spindle mounted vision camera for workpiece inspection/metrology, while being activated to acquire its images, facilitates having the work piece images' analysis being improved by having a sequence of nearly identical image patterns to comparatively detect the surface anomalies from, while utilizing the additional image data to perceptually improve the images for their analyses.

For the subtractive (e.g., machining) and additive (e.g., 3D printing) manufacturing process having the vision camera being rotated and or orbited and or rotated while being orbited via the machine tool that manufactured the workpiece, while being activated to acquire its images, facilitates the workpiece/object of interest images having the same rotational aspect/perspective datum's as the cutting or additive tools that produced the surface and detail features of the workpiece/object of interest that is being imaged for its analysis for surface finish and detail defects to improve the analytical differential for the difficult to detect defects being more readily differentiated by the image analysis software as an anomaly in the desired data pattern via the image's useful raw data as being additional data to be used for the images' comparisons.

Having the additional benefits for the vision camera being rotated and or orbited and or rotated while being orbited via the spindle having the camera's field of view being at the controlled off-axis to the machine tool's spindle that manufactured the workpiece/object of interest, while being activated to acquire its images, to facilitate the image's being acquired from the workpiece/object of interest at an off-axis angle to the spindle's rotational axis not being perpendicular to the manufactured workpiece/object of interest surface, to reduce the illumination reflectivity, improve defect illumination, etc., to subsequently capture the finer near microscopic, being almost invisible, details of the overlapping traversing spiraling pattern across the manufactured surface that facilitates having the workpiece's/object of interest's surface imaged in a controlled off-axis offset from the orthogonal/perpendicular "as manufactured" orientation/alignment to improve the direct and or comparative analysis improving the analytical differential for the difficult to detect defects being more readily differentiated by the image analysis software as an anomaly in the desired data pattern via the image's useful additional image data as being additional data used for the comparative images' comparisons.

Having the vision camera rotated and or orbited and or rotated while being orbited via a "spindle" perpendicular to the workpiece, while being activated to acquire its images, to facilitate the camera images having the same rotational aspect/perspective perpendicular to the surface of the workpiece/object of interest that is being imaged for its analysis for surface finish and detail defects to facilitate improving the analytical differential for the difficult to detect defects being more readily differentiated by the image analysis software as an anomaly in the desired data pattern via the image's useful additional image data as being additional data to be used for the images' comparisons.

Having the additional benefits for the vision camera being rotated and or orbited and or rotated while being orbited via the spindle having the camera's field of view being at an off-axis to the rotating spindle that is perpendicular to the surface of the workpiece/object of interest, while being activated to acquire its images, to facilitate the image's being acquired from the workpiece at an off-axis angle to the spindle's rotational axis not being perpendicular to the workpiece/object of interest surface, to reduce the illumination reflectivity, improve defect illumination, etc. . . . , to subsequently capture the finer near microscopic, being almost invisible, details of an overlapping traversing spiraling pattern across the workpiece/object of interest surface facilitates having the workpiece's/object of interest's surface imaged in a controlled off-axis offset from its orthogonal/perpendicular orientation/alignment to improve the direct and or comparative analysis improving the analytical differential for the difficult to detect defects being more readily differentiated by the image analysis software as an anomaly in the desired data pattern via the image's useful additional image data as being additional data used for the comparative images' comparisons.

For the subtractive workpiece manufacturing process, not being limited to machining, electrical erosion, grinding, cutting, etc., with the base material/structure being metallic, composite, mineral, plastic, and other materials, can contain voids-gaps and or contaminations/inclusions within its internal structures as a result of the, otherwise solid, material comprising an amalgamation of materials that are to be used to manufacture base material for the work piece(s). This is most often demonstrated by the intentional or accidental inclusion of recycled material in the manufacturing of the base material for that is to be used for the workpiece(s) subtractive manufacturing process, in which frequently the base material's overall weight/density is measured as a means of monitoring base material's manufacturing process. As an example, the inclusion of recycled "compacted graphite" cast iron, used to increase the wear resistance of the traditional/typical cast iron workpieces, in the fabrication of a new raw cast iron casting that is to be machined via the subtractive workpiece manufacturing process, where the compacted graphite may not be fully homogenized/evenly distributed in the base material, as it may not have been anticipated by the base material fabricator/casting foundry, causing a significant localized structural difference with the base cast iron material and creates a localized lubricant within the base material making it more difficult to machine in comparison to the adjacent and anticipated typical cast iron. In addition to the risk of and potential for the detectable weight difference of incidental voids-gaps to be offset by the detectable weight difference of the contaminations/inclusions of dissimilar materials within the workpieces' base material to create hidden structural defect(s) and differences that are not readily and or directly detectable and or traceable by the base materials' manufacturing process monitoring means. These hidden base material defects will make the subtractive workpiece manufacturing process more difficult, dangerous, and can create the additional risk for a loss of life for workpiece failure events from these undetectable structural defects.

It is one of the benefits of the Controlled Camera Off-axis Alignment for the Dynamic Bore-Surface-Structure Inspections via Rotational/Orbital/Rotational Orbiting Angular Off-axis Controlled Vision Camera Systems is to facilitate the real-time point-of-use acquisition of the additional data required for the real-time base material manufacturing defect detection via capturing the reliable real-time operational data for the closed-loop subtractive manufacturing process's control system being synchronized/correlated to the variable data for operational performance of the subtractive manufacturing process, subtractive energy output-effective utilization-thermal loss-operational deflection(s), axis positioning accuracy-error, ambient conditions-deviations, environmental environment-deviations, seismic state-activity, base material void-gap and structural difference(s) detection, defect traceability utilizing an adaptive control system means for correction/verification/resumption, facilitating statistical process control data trending, etc. with the operational and workpieces' subtractive manufacturing process data archiving for statistical analysis, performance verification, traceability, defect allocation of responsibility, defect root cause data, etc. as required.

For additive manufacturing processes, not being limited to fusion, laser, electric welding, ultrasonic welding, re-flow, bonding, melting, dispensing, layered buildup, laminating, impregnation, etc., being accomplished in common atmospheric, vacuum, mixed gases, or dedicated gas environments, the benefits for the vision camera(s) being rotated and or orbited and or rotated while being in the same being alignment as the additive deposition device means while having the camera's field of view being at the controlled off-axis to the machine tool's additive deposition device means that fused the additive material of the workpiece, while being activated to acquire its image data, to facilitate the image's being acquired from the workpiece in real-time at the point-of-use being at an off-axis angle to the additive deposition device's alignment axis not being perpendicular to the additive manufactured workpiece surface, to reduce the illumination reflectivity, improve defect illumination, etc. . . . , to subsequently capture the finer near microscopic and microscopic details of the fused additive material's structures, being almost invisible, details of the overlapping pattern(s) across the fused workpiece surface that facilitates having the workpiece imaged in a controlled off-axis offset from the orthogonal/perpendicular "as fused" orientation/alignment to improve the direct and or comparative analysis improving the analytical differential for the difficult to detect defects being more readily differentiated by the image analysis software as an anomaly in the desired data pattern via the image's useful additional image data as being additional data used for the comparative images' comparisons. (Exhibit-4)

The workpiece structure via the additive manufacturing process, for metallic, composite, mineral, plastic, and other additive materials, inherently comprise voids-gaps between the adjacent structures as a result of the additive material being sequentially deposited and or fused together to create the work piece. This is most often demonstrated by the measurable reduction in weight of the workpiece, which is frequently measured as a means of monitoring additive manufacturing process as the overall weight of the finished additive workpiece part is used to calculate the overall density of the workpiece. However there is the potential for the inherent voids-gaps to be concentrated in an approximate and adjacent location within the workpiece to create a grouping of these hidden excessive voids-gaps creating structural defect(s) that are not readily and or directly detected and or traceable by the other additive process monitoring means. In the aerospace industry, where the reduction of weight is a desired attribute, these hidden defects can create the additional risk for a loss of life for workpiece failure events from these undetectable void-gap and other structural defects.

It is one of the benefits of the Controlled Camera Off-axis Alignment for the Dynamic Bore-Surface-Structure Inspections via Rotational/Orbital/Rotational Orbiting Angular Off-axis Controlled Vision Camera Systems is to facilitate the real-time point-of-use acquisition of the additional image data required for capturing more reliable real-time operational data for the closed-loop additive manufacturing process's control system being synchronized/correlated to the variable data for operational performance of the additive manufacturing process, additive energy output-focus-scattering-reflectivity, axis positioning accuracy-error, ambient conditions-deviations, environmental environment-deviations, seismic state-activity, additive material void-gap detection, additive material wetting and or saturation detection, real-time additive manufacturing defect detection/remelt/rework/repair/traceability utilizing an adaptive control system for correction/verification/resumption, facilitating statistical process control data trending, etc. with the operational and workpieces' additive manufacturing process data archiving for statistical analysis, performance verification, traceability, defect allocation of responsibility, defect root cause data, etc. as required. (Exhibit-3)

BRIEF DESCRIPTION OF THE DRAWINGS

Embodiments of the Controlled Rotatably and Orbital Mounted Angular Off-axis Vision Camera System disclosed herein may be better understood by referring to the following Detailed Description in conjunction with the accompanying drawings, in which like reference numerals indicate identical or functionally similar elements.

EXHIBITS

Figure 1:
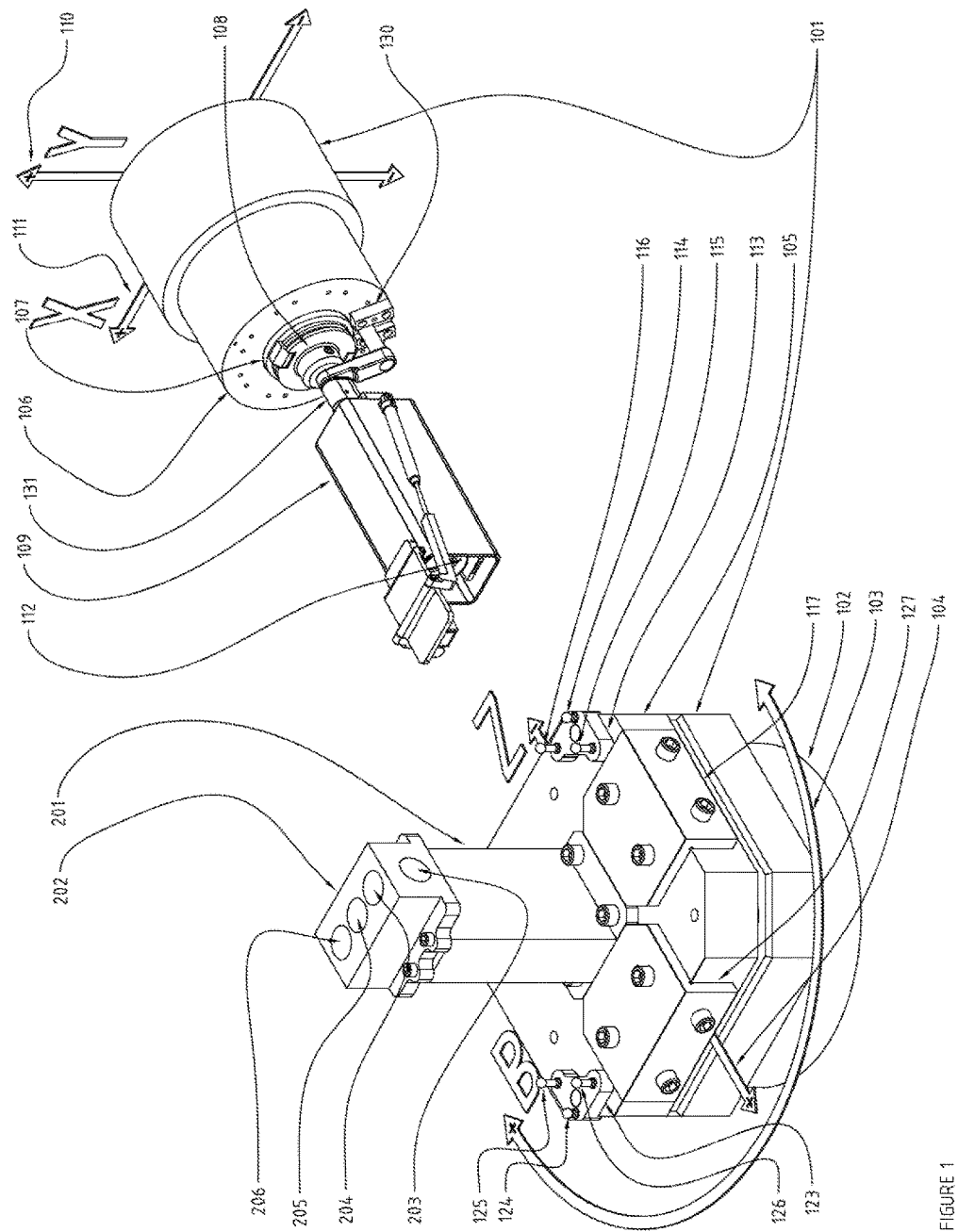
FIG. 1 is an isometric view depicting a multiple axes Horizontal Machine Tool with the Controlled Orbital Mounted Angular Off-axis Vision Camera System according to a representative embodiment.

The following exhibits are appended hereto and constitute a part of the present application. In addition, the following exhibits are hereby incorporated by reference in their entirety.

Exhibit-1 (Wiki Definition for Sub-pixel resolution) is the sub-pixel image analysis of a circle or arc via the rectangular array of pixels in an image sensor and image analysis software's use of an aliasing algorithm on the an image data's to create an anti-aliased image that results in a loss of the image's data.

Exhibit-2 (ViDi brochure for commercial image analysis software) is the Deep Learning-based industrial image analysis software for automated detection, inspection, and classification of workpiece images.

Exhibit-3 (NISTIR 836 February 2015 is the U.S. Department of Commerce National Institute of Standards and Technology publication NISTIR 8036 for the "Measurement Science Needs for Real-time Control of Additive Manufacturing Powder Bed Fusion Processes".

Exhibit-4 (Laser Metal Additive Micro-grain Images) is the comparison of the corresponding 200 um and 400 um scaled images of the micro-grain structures of a "3D printed" metallic workpiece/object of interest via the layered additive manufacturing powder bed fusion process.

Exhibit-5 (Operating Instructions Visiport DA175T_EN is the manufacturer's documentation for the pressurized air driven version of the spinning disk Visiport® for the cleared viewing through a transparent and protective window utilizing the pressurized air to minimize contamination between the spinning and stationary optically transparent elements of the viewport.

Exhibit-6 (Installation and Operation Manual Visiport VP180-65-MAN-EN1 is the manufacturer's documentation for the electric driven version of the spinning disk Visiport® for the cleared viewing through a transparent and protective window utilizing the an electric motor to minimize the disruptive airflow of the spinning and stationary optically transparent elements of the viewport while its compatible with being utilized within a vacuum chamber.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments disclosed herein.

DETAILED DESCRIPTION

The depictions shown in the drawings of the Camera Spindle Positioning System for the Controlled Rotatably and Orbital Mounted Angular Off-axis Vision Camera System (CROMAOVCS) are generally for a multiple axes Computer Numerically Controlled (CNC) Horizontal Machining Center (HMC) machine tool, or its operational equivalent. With the operational benefits of the Controlled Rotatably and Orbital Mounted Angular Off-axis Vision Camera System being achievable via the use of CNC positioning system having an additional axis, or axes, that replicate the perceptual vision camera's views of the Controlled Rotatably and Orbital Mounted Angular Off-axis Vision Camera System. While the basic requirements to achieve the minimal benefits of the Controlled Rotatably and Orbital Mounted Angular Off-axis Vision Camera System can be accomplished via the Controlled Rotatably and Orbital Mounted Angular Off-axis Vision Camera System being mounted onto an equivalent rotatable spindle having the perceptual vision camera's views being at a controlled/predefined off-axis to the spindle's axis of rotation having the vision camera's focal target being either central to or offset from the spindle's axis of rotation center-line.

For these drawings the multiple axes Horizontal CNC Machine Tool uses the Spindle Positioning System for the positioning and rotation for the Controlled Rotatably and Orbital Mounted Angular Off-axis Vision Camera System as depicted in FIGS. 1-31. The multiple axes CNC Machine Tool's rotational spindle is also referred to as the CNC Machine Tool's C axis because of its rotational/pivoting axis alignment with the Z axis, having the spindle tool holder's angular adjustment being up-and-down in the Y axis is also referred to as the CNC Machine Tool's A axis because of its rotational/pivoting axis alignment with the X axis. While other CNC Machine Tool configurations can utilize a rotational spindle nose assembly as the CNC Machine Tool's C axis containing a pivoting spindle assembly as the CNC Machine Tool's A axis with the rotational spindle for the tool holder as the CNC Machine Tool's S axis.

The up-down angular adjustment relative to the camera's field of view is referred to as "Pitch" when viewed from the side, and the left-right angular adjustment relative to the camera's field of view can be referred to as "Yaw" when viewed from the top for the following drawing's descriptive purposes.

The Controlled Orbital Mounted Angular Off-axis Vision Camera System is depicted in FIGS. 1-5 and the axial alignments for the corresponding Vision Camera Images' field of view images in FIGS. 10 through 17.

Figure 6:
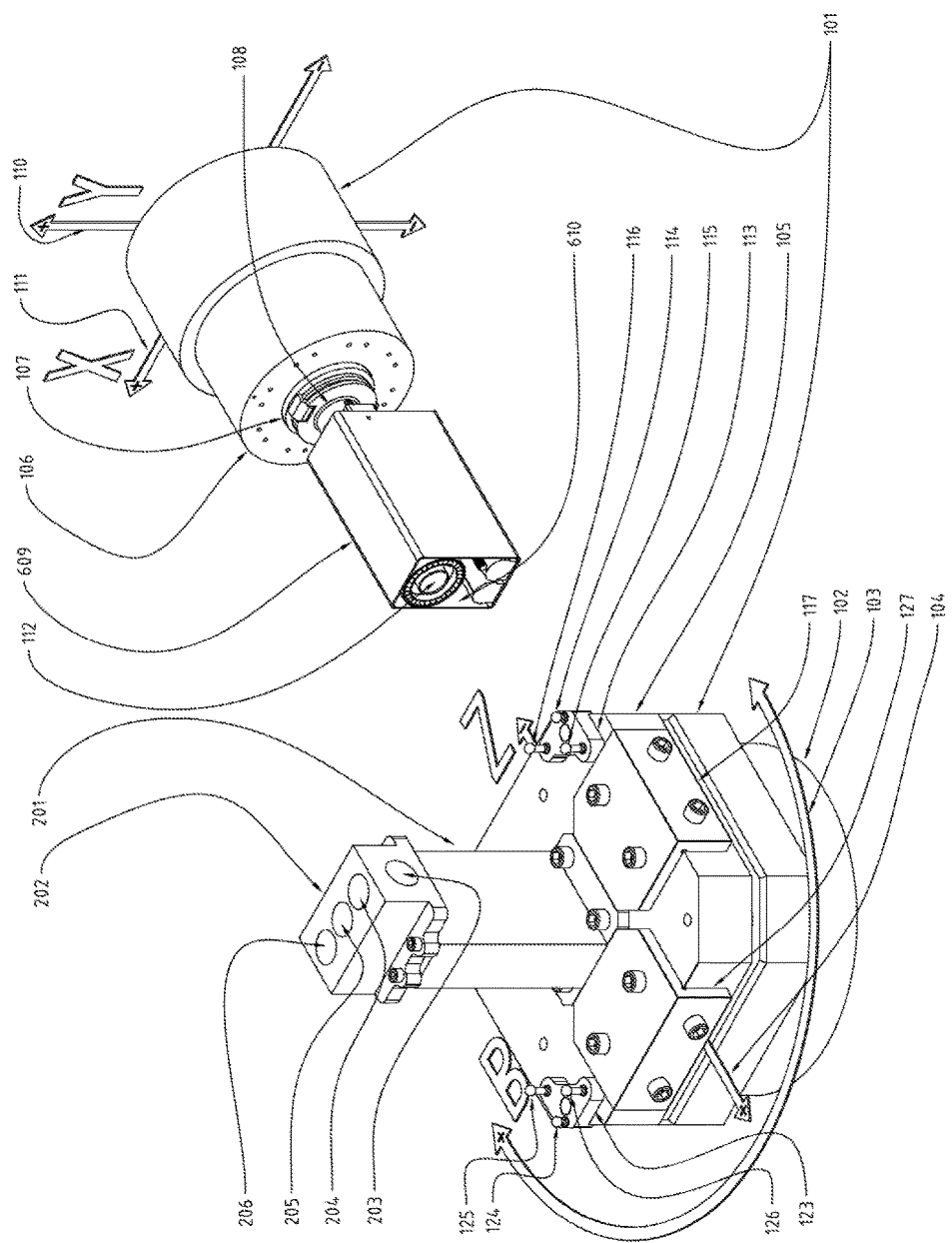
FIG. 6 is a front isometric view depicting the multiple axes Horizontal Machine Tool with the Rotatably Mounted Angular Off-axis Controlled Vision Camera System.
Figure 7:
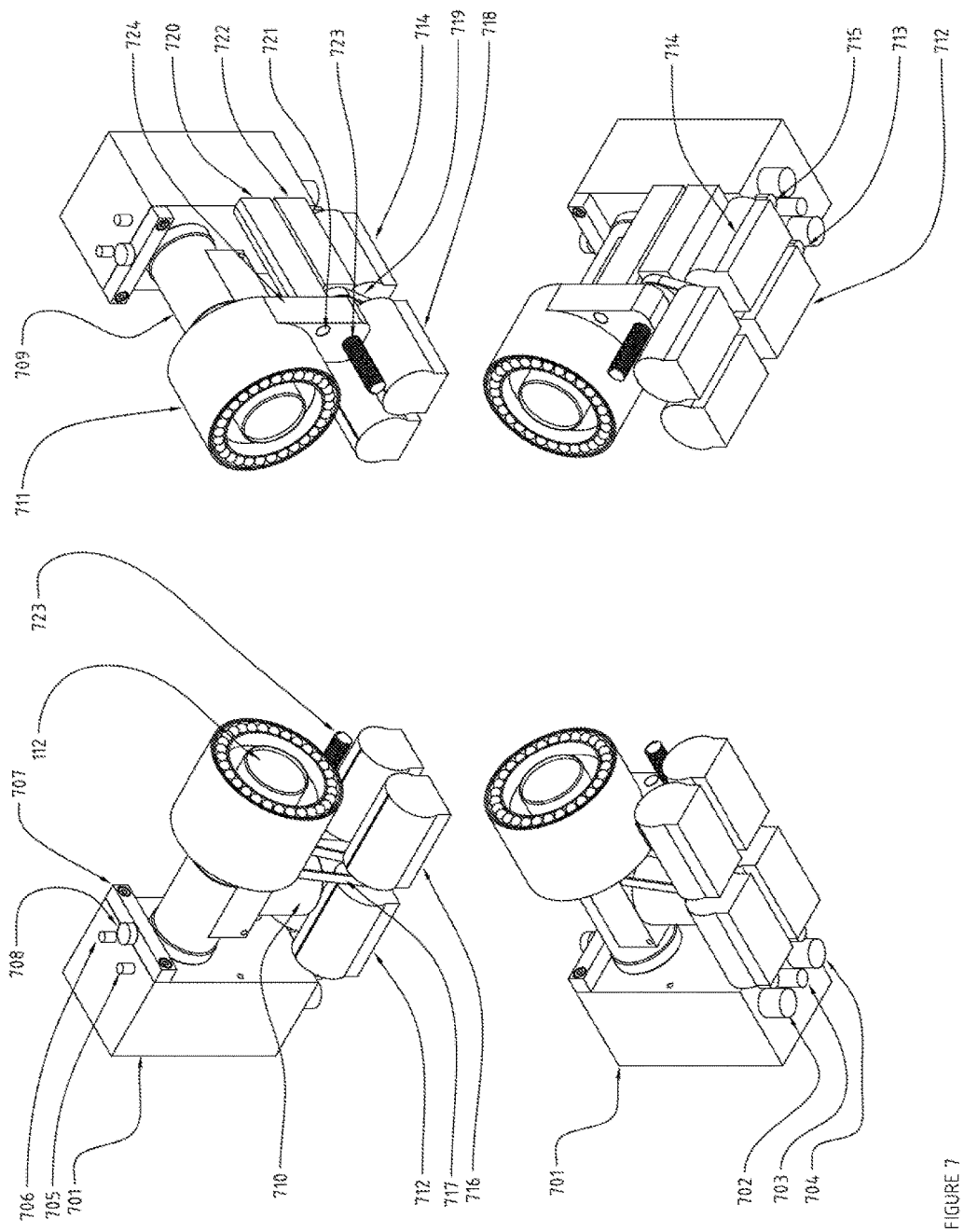
FIG. 7 is isometric views depicting the internal positional elements for controlling the vision camera optics of the Rotatably Mounted Angular Off-axis Controlled Vision Camera System.
Figure 8:
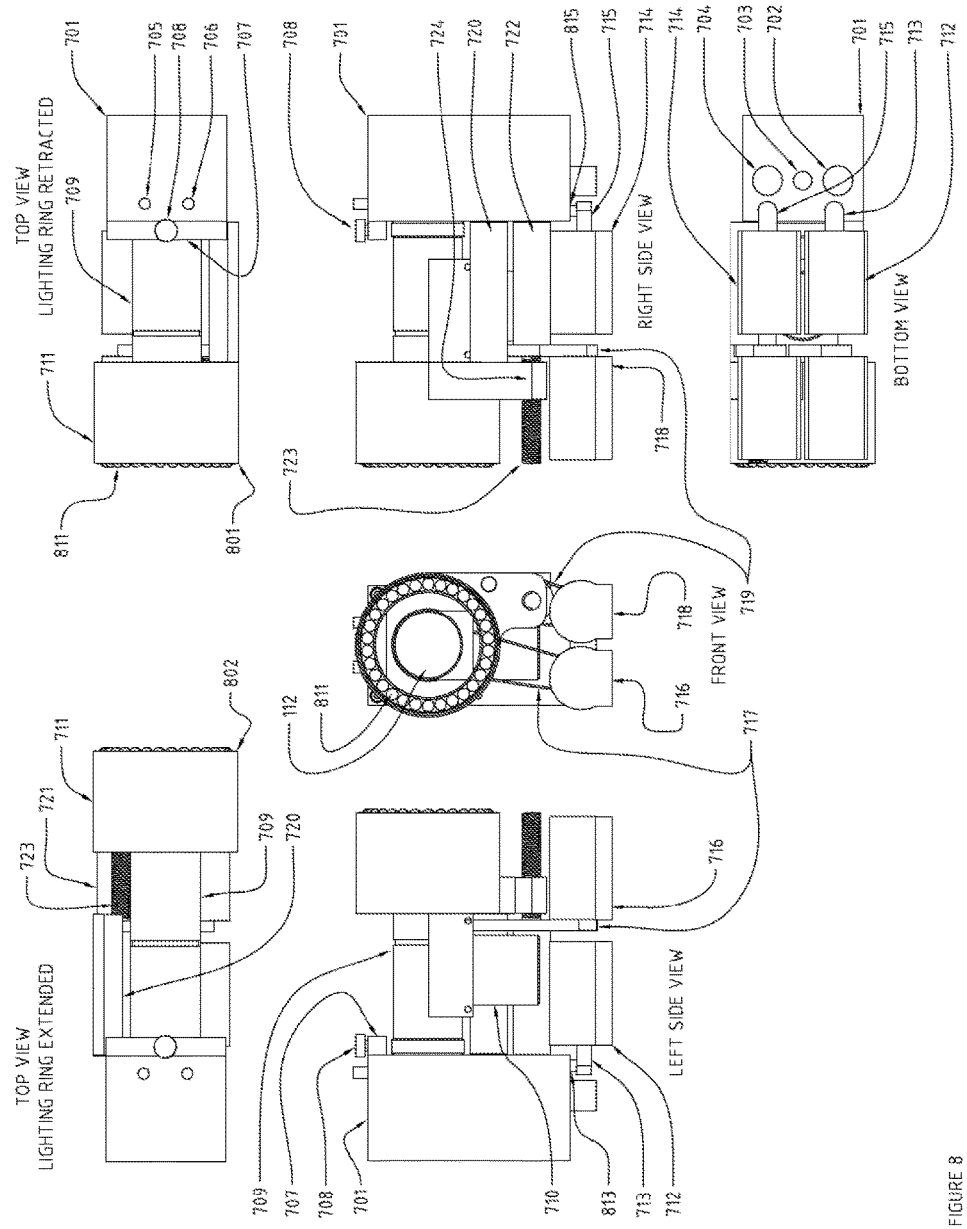
FIG. 8 is orthogonal views depicting the internal positional elements for controlling the vision camera optics of the Rotatably Mounted Angular Off-axis Controlled Vision Camera System.

The Controlled Rotatably Mounted Angular Off-axis Vision Camera System is depicted in FIGS. 6-8 and the axial alignments for the corresponding Vision Camera Images' field of view images in FIGS. 18 through 29.

Figure 9:
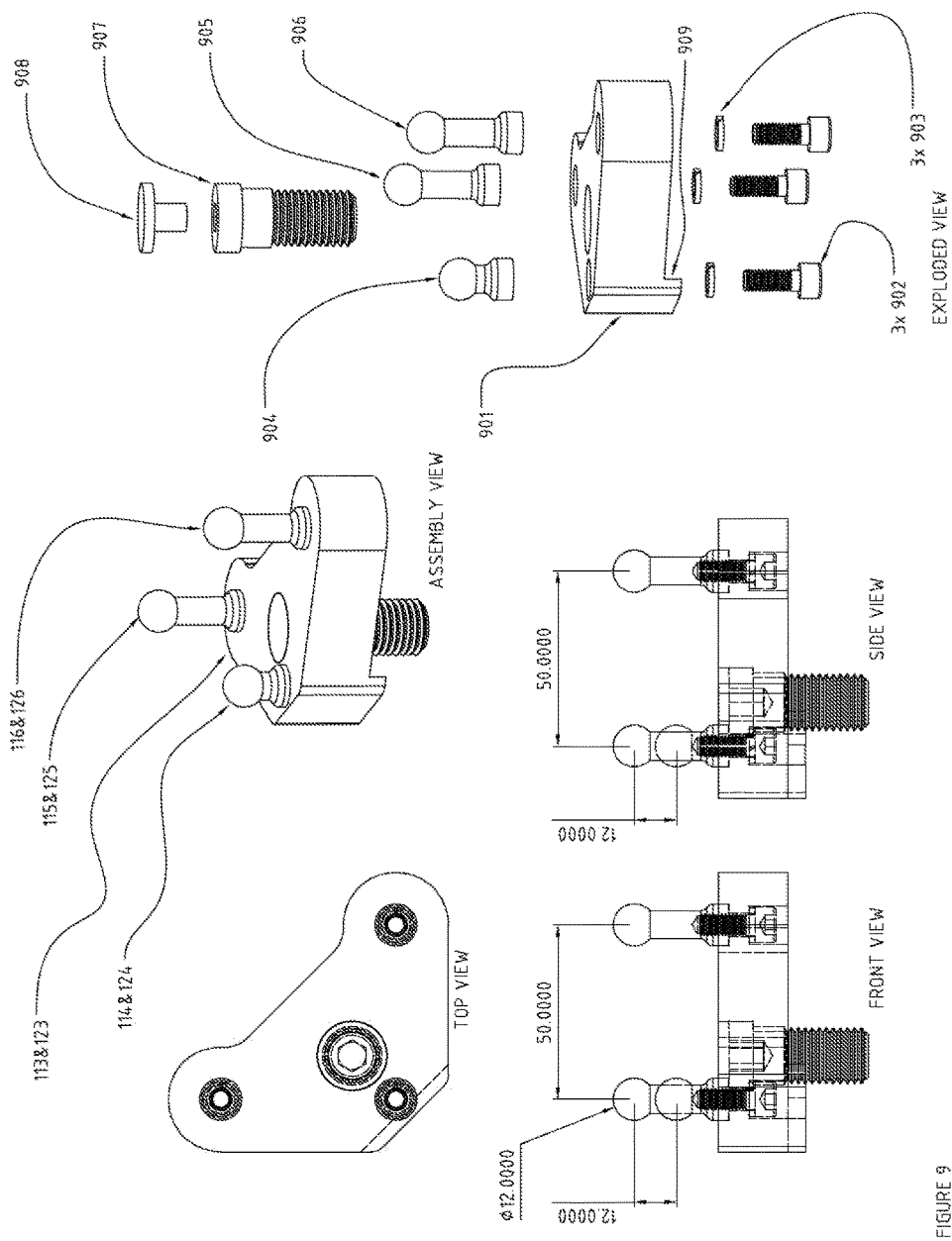
FIG. 9 is orthogonal and isometric views depicting the Optical Positional/Angular Alignment Datum module.

The Controlled Rotatably and Orbital Mounted Angular Off-axis Vision Camera Systems' corresponding Optical Positional/Angular Alignment Datum's as depicted in FIG. 9.

Figure 30:
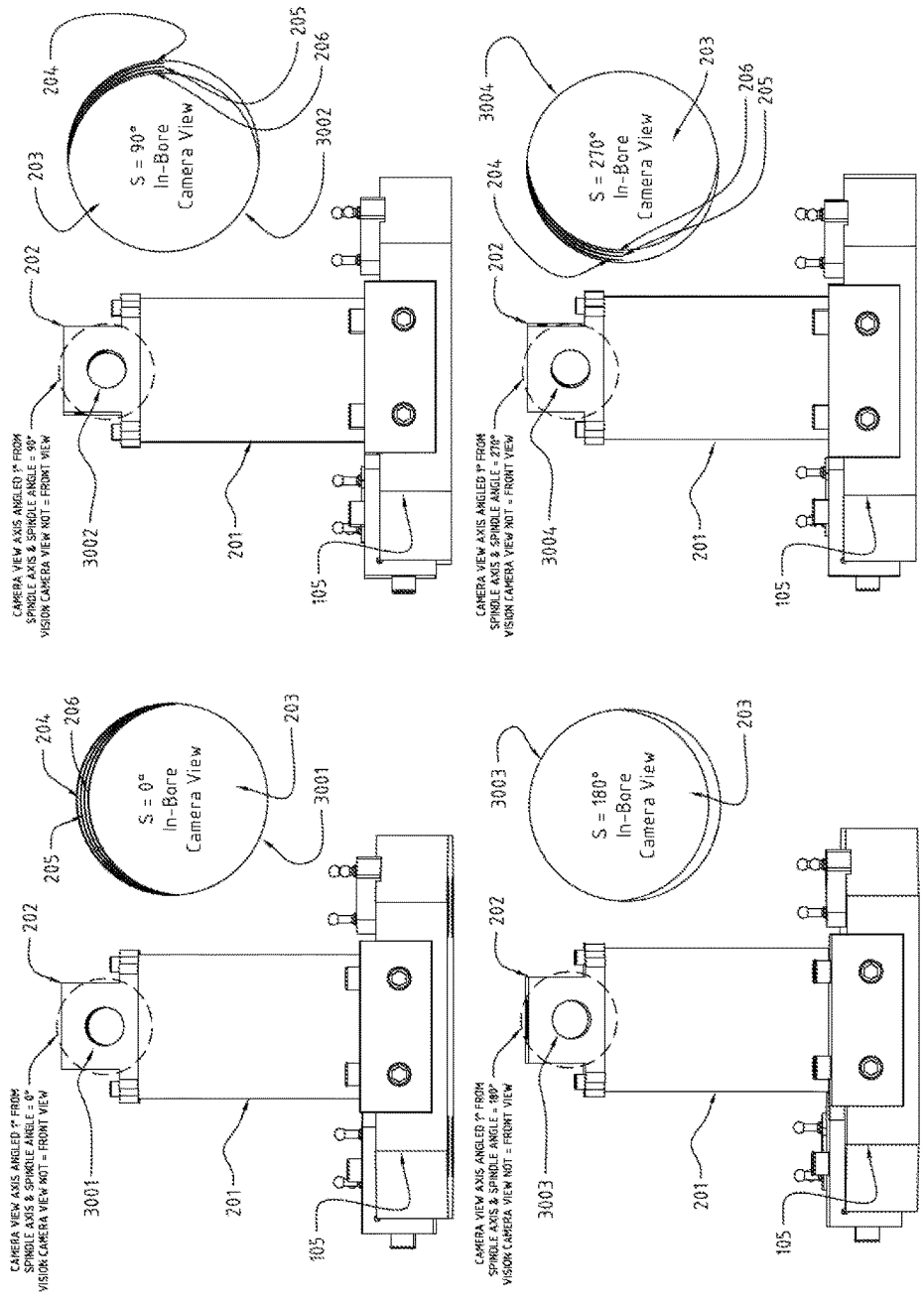
FIG. 30 is comparative camera aligned views depicting the visual perspective of the Controlled Orbital Mounted Angular Off-axis Vision Camera System comprising the Work Piece Metrology/Vision Camera System.
Figure 31:
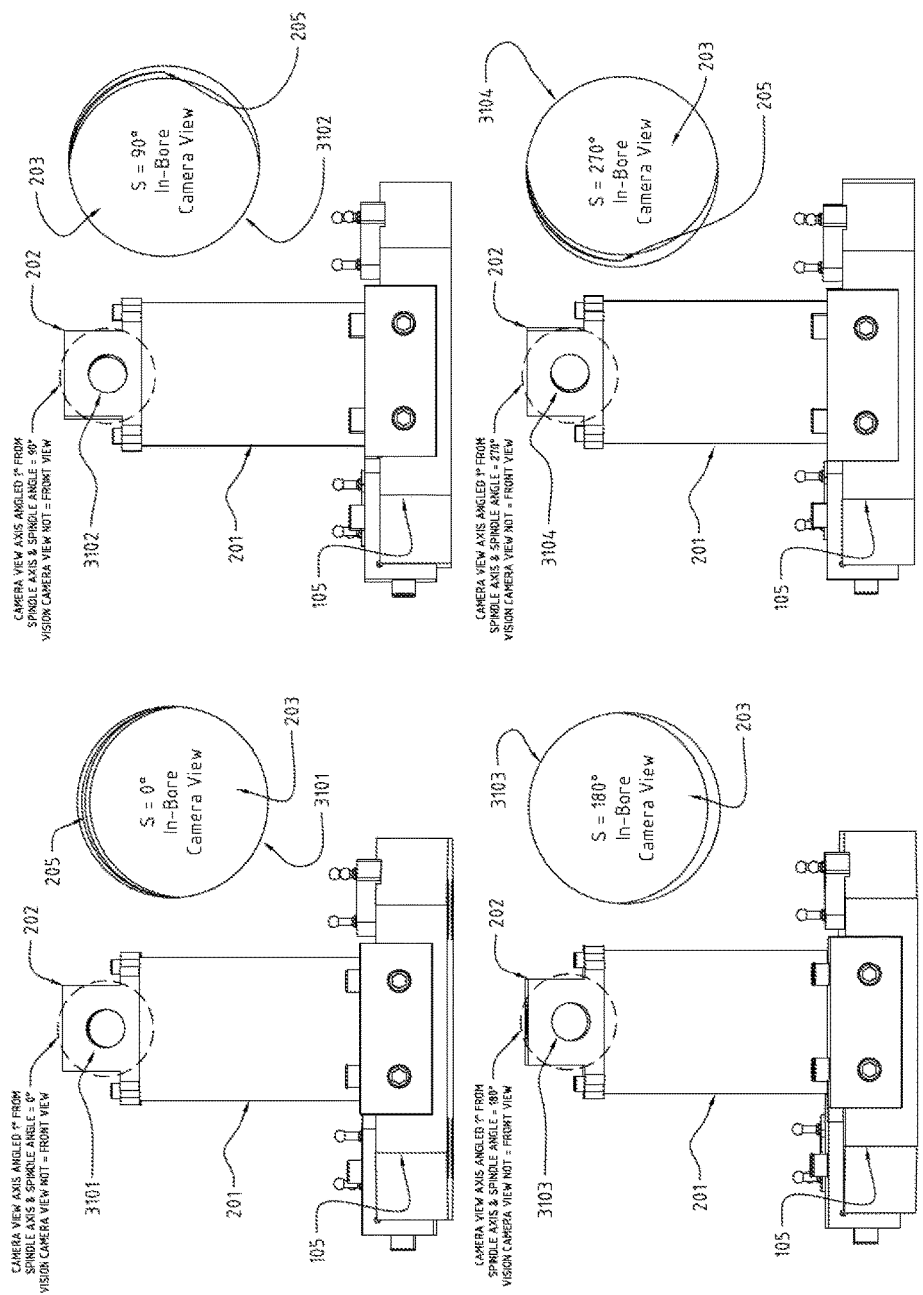
FIG. 31 is comparative camera aligned views depicting the visual perspective of the Controlled Orbital Mounted Angular Off-axis Vision Camera System comprising the Work Piece Metrology/Vision Camera System.

The Controlled Rotatably and Orbital Mounted Angular Off-axis Vision Camera Systems' work piece off-axis alignment/field of view comparisons' for the for the corresponding Vision Cameras' field of view images in FIGS. 30 and 31.

FIG. 1 (X− Front Isometric View) depicts the multiple axes Horizontal Machine Tool 101 with the Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131 that is installed in the spindle tool holder 108 being secured in the machine tool's rotational spindle 107 that is an its 0° position being in the spindle nose 106 being linearly positioned by the X axis 111 and Y 110) axis for the vision camera to view Optical Positional/Angular Alignment Datum 116 that is part of the Optical Positional/Angular Alignment Datum module 113 mounted onto the workpiece pallet 105 being mounted to the rotational B axis 102 that is at its 0° position being linearly positioned by the Z axis 104, having the work piece 202 being mounted to a workpiece holder 201 that are positionally aligned by the edge datum locators 117 and 127.

Figure 2:
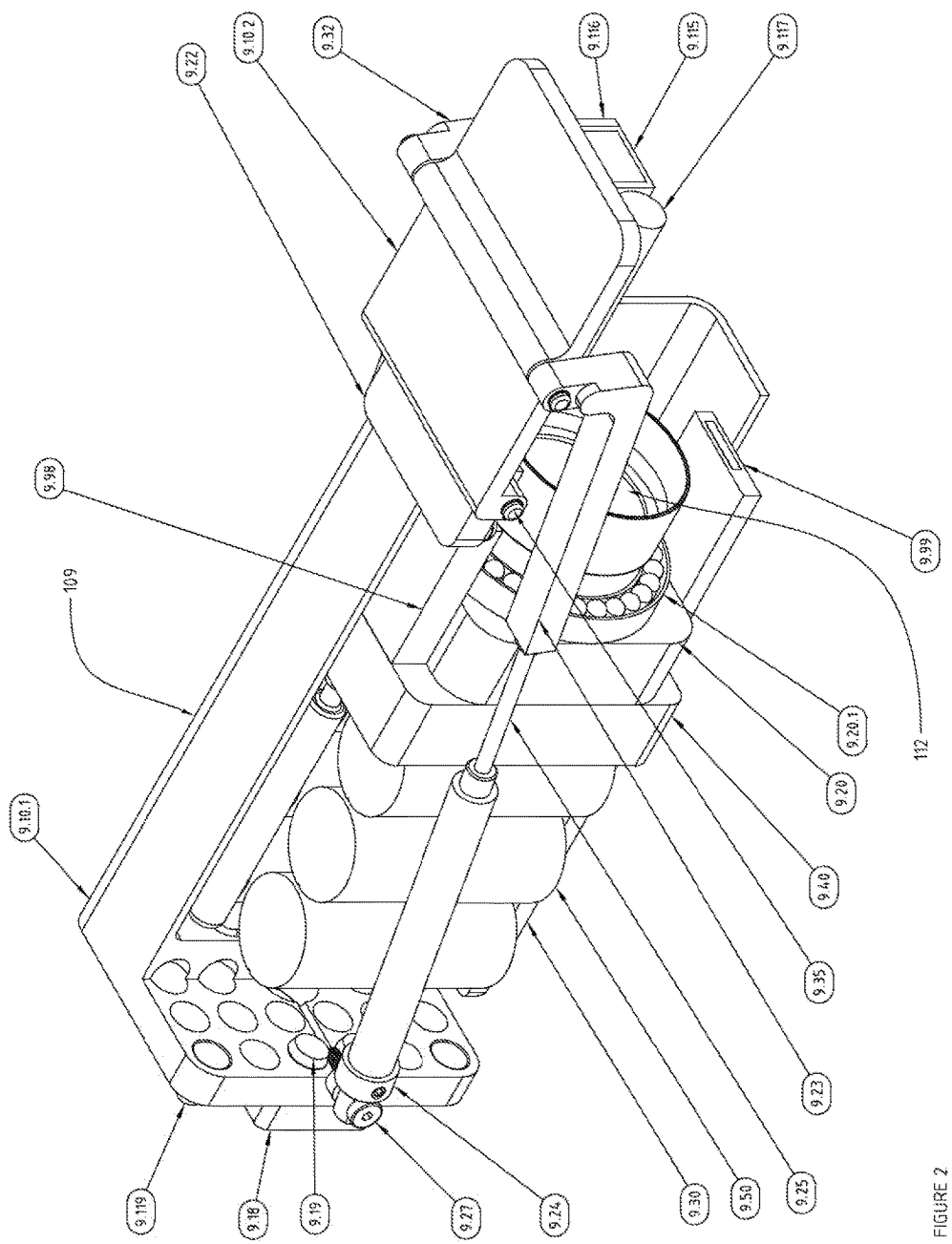
FIG. 2 is a front Isometric view depicting the advanced multi-functionality Spindle Work Piece Metrology/Vision Camera System according to a representative embodiment.
Figure 3:
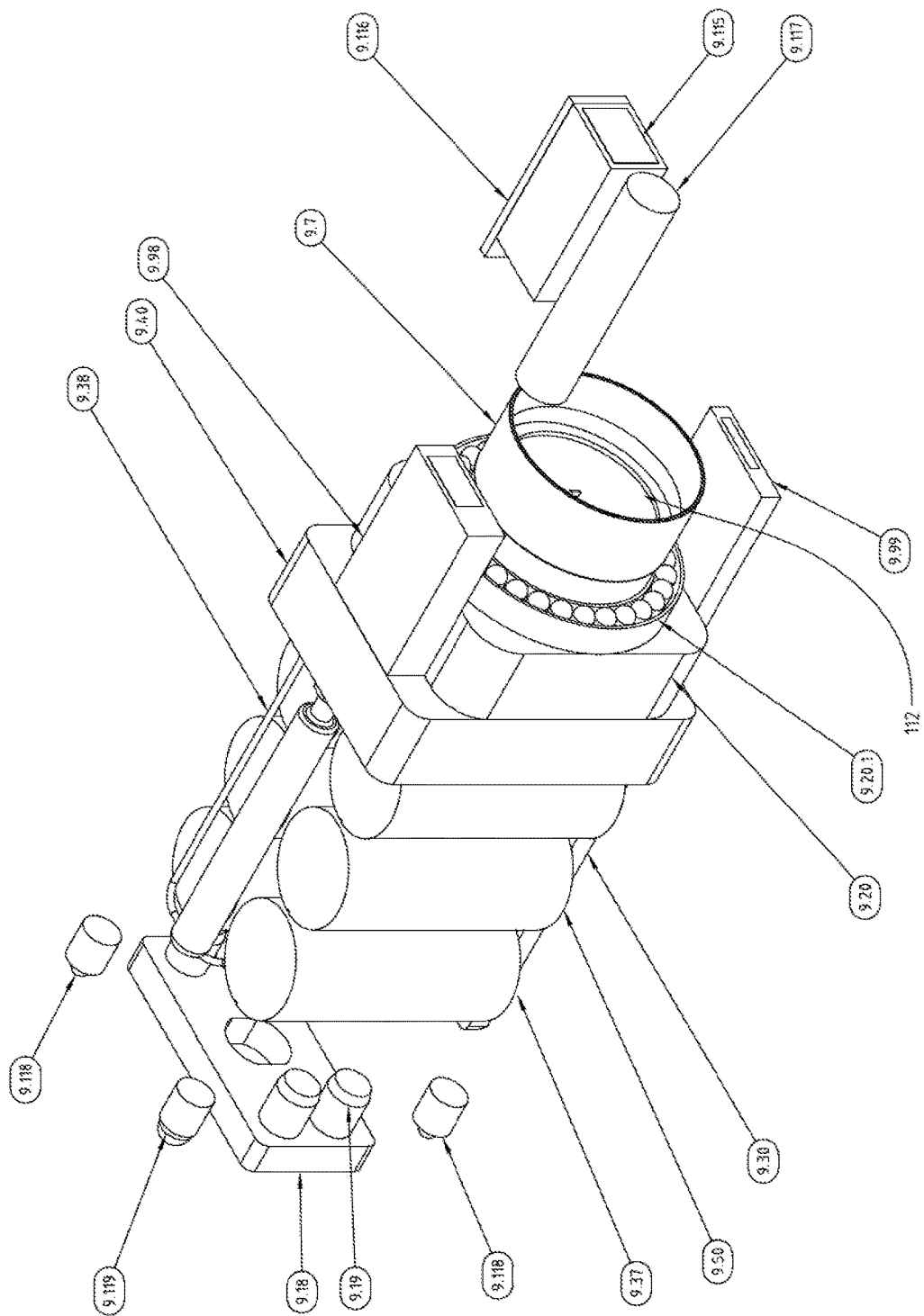
FIG. 3 is a front isometric view depicting internal modules and devices for the advanced multi-functionality Spindle Work Piece Metrology/Vision Camera System.

FIGS. 2 and 3 comprising the following typical components and or their equivalents for the Work Piece Metrology/Vision Camera System 109 that are common to the Rotatably Mounted Angular Off-axis Controlled Vision Camera System ***609, Controlled Rotating Field of View Synchronous Orbital Off-Axis Alignment Camera Device—not shown, and Controlled Orbital Off-Axis Alignment Camera Device with an Dedicated Drive Axis for the Controlled Rotational Off-Axis Alignment Camera Device—not shown (*—not shown):

| | |
|---|---|
| 9.1 | 2-CONTACT_ENCLOSURE |
| 9.10.2 | ENCLOSURE_LENS_COVER |
| 9.10.1 | 2-CONTACT_CUT-AWAY_ENCLOSURE |
| 9.1 | 4-CONTACT_DIRECT_INTERCONNECTION_MODULE |
| 9.101 | NO-CONTACT_INDUCTION_INTERCONNECTION_MODULE |
| 9.102 | 2-CONTACT_DIRECT_INTERCONNECTION_MODULE |
| 9.103 | 4-CONTACT_ENCLOSURE |
| 9.104 | NO-CONTACT_ENCLOSURE |
| 9.107 | 4-CONTACT_CHARGING_UNIT |
| 9.108 | WIRED_COMMUNICATIONS_MODULE |
| 9.109 | 2-CONTACT_AND_INDUCTION_CHARGING_MODULE |
| 9.11 | HEXAGON_SOCKET_SET_SCREW-ISO 4028-M6X16 |
| 9.11.1 | MOUNTING_STEM |
| 9.11.2 | 20 MM_O-RING |
| 9.111 | INDUCTION_CHARGING_MODULE |
| 9.112 | 2-CONTACT_CHARGING_MODULE |
| 9.113 | HEXAGON_SOCKET SET SCREW- ISO 4028-M6X30 |
| 9.114 | 4-CONTACT_CHARGING_MODULE |
| 9.115 | LASERCHECK_8826_HEAD |
| 9.116 | AIR_BLOW-OFF_KNIFE |
| 9.117 | IR-TEMPERATURE_SENSOR |
| 9.118 | TRANSMIT_IR-LED |
| 9.119 | RECEIVE_IR-SENSOR |
| 9.12 | KJS02-M3 |
| 9.13 | HEXAGON SOCKET SET SCREW- ISO 4027-M5X5 |
| 9.14 | HEXAGON SOCKET SET SCREW- ISO 4027-M3X5 |
| 9.15 | HEXAGON SOCKET SET SCREW- ISO 4026-M3X3 |
| 9.16 | AIR_PRESSURE_SWITCH |
| 9.17 | VENT_MBO-1032M-10-SS |
| 9.18 | STEM_ROTATIONAL_LOCATOR |
| 9.19 | PIN-HARDENED GROUND MACHINE DOWEL-ANSI B18.8.2-1/2 X 1 |
| 9.20.1 | ILLUMINATION-RING |
| 9.2 | CAMERA-MODULE |
| 9.22 | LENS-COVER_PIVOT-HINGE-MOUNT |
| 9.23 | 2ND_CYLINDER_ROD_MOUNT |
| 9.24 | USR-08-2_CYLINDER |
| 9.25 | USR-08-2_ROD |
| 9.26 | CYLINDER_PIVOT_SPACER |
| 9.27 | HEXAGON SOCKET SHOULDER SCREW-ISO 7379-6.5 X 12 |
| 9.28 | 6 MM_O-RING |
| 9.29 | HEXAGON SOCKET SET SCREW-ISO 4026-M5X6 |
| 9.3 | 2-CONTACT_INDUCTION_INTERCONNECTION_MODULE |
| 9.31 | HEX NUT-ISO 4035-M5 |
| 9.32 | 1ST_CYLINDER_ROD_MOUNT |
| 9.33 | CYLINDER_ROD_PIVOT |
| 9.34 | EXTERNAL TYPE-3AM1-ANSI B27.7-6 |

| | |
|---|---|
| 9.35 | LENS_COVER_PIVOT |
| 9.36 | HEXAGON SOCKET BUTTON HEAD SCREW-ISO 7380-M5X10 |
| 9.37 | CONTACT_SHOULDER_SCREW_DIN-921_M6X8 |
| 9.38 | CAMERA_AIR_FEED |
| 9.39 | HEX NUT-ISO 4035-M6 |
| 9.4 | WIRELESS_COMMUNICATIONS_MODULE |
| 9.41 | INDUCTION_COIL |
| 9.5 | TLP-93311-A-SM_LTC-HLC-BATTERY |
| 9.7 | LENS_SHROUD |
| 9.93 | COMPRESSED_COMPRESSION_SPRING-1.000000 X 11.500000 X 31.140000 |
| 9.94 | EXTENDED_COMPRESSION_SPRING-1.000000 X 11.700000 X 81.940000 |
| 9.95 | 2-CONTACT_AND_INDUCTION_CHARGING_UNIT |
| 9.96 | INDUCTION_CHARGING_UNIT |
| 9.97 | 2-CONTACT_CHARGING_UNIT |
| 9.98 | LASER_DISTANCE_SENSOR |
| 9.99 | LASER_BAR-CODE_READER |

FIG. 2 (X+ Front Isometric View) depicts the advanced multi-functionality Spindle Work Piece Metrology/Vision Camera System 109 having the internal components being shown via the housings cutaway with the protective lens cover being in the open position.

FIG. 3 (X+ Front Isometric View) depicts the internal modules and devices for the advanced multi-functionality Spindle Work Piece Metrology/Vision Camera System 109.

Figure 4:
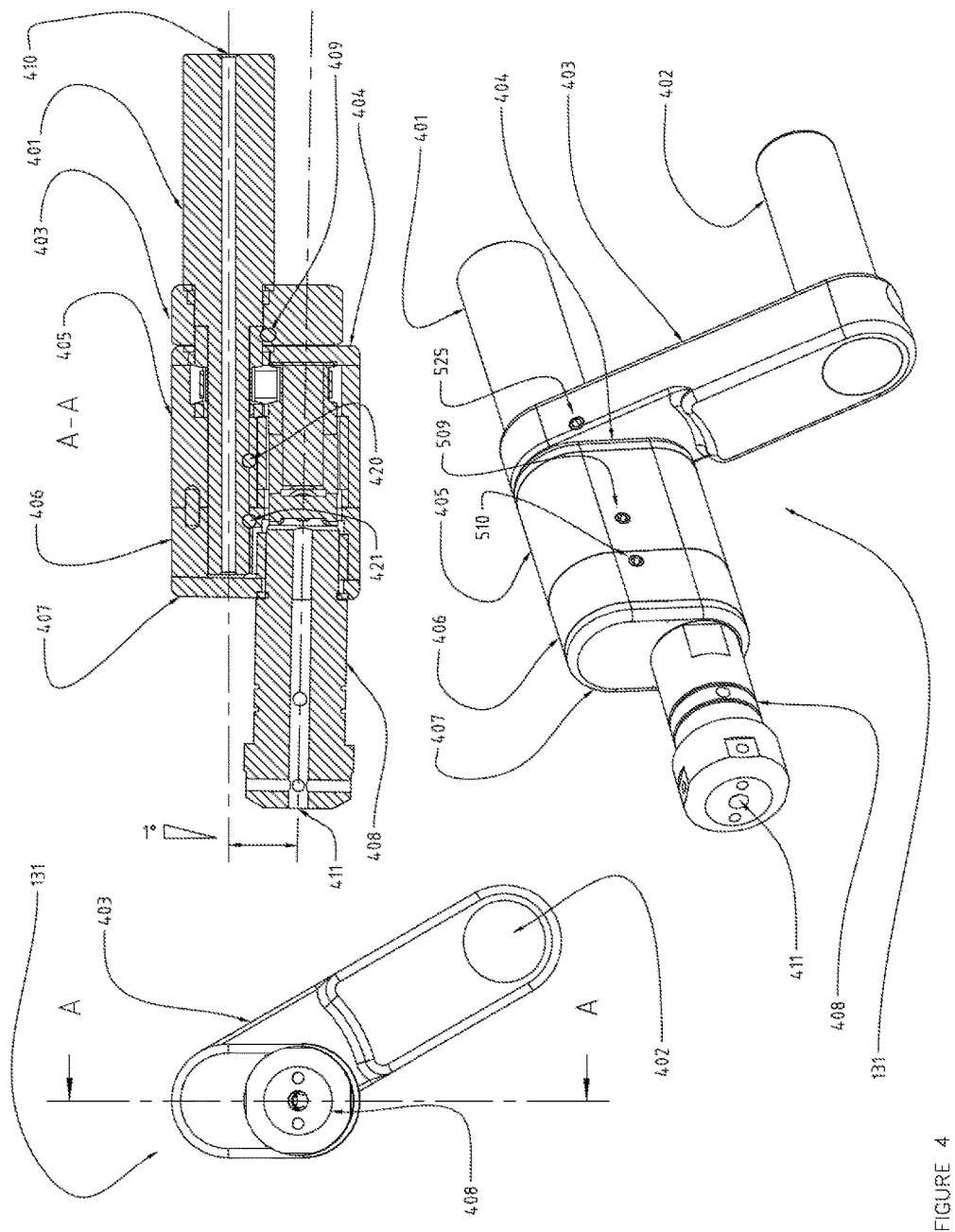
FIG. 4 is a front, side cross-section, and front isometric view depicting the major external components and internal passages of the Controlled Non-Rotating Field of View Synchronous Orbital Off-Axis Alignment Camera Device.

FIG. 4 (Front, Side cross-section, and X− Front Isometric Views) depicts the major external components and internal passages the Controlled Non-Rotating Field of View Synchronous Orbital Off-Axis Alignment Camera Device 131.

Figure 5:
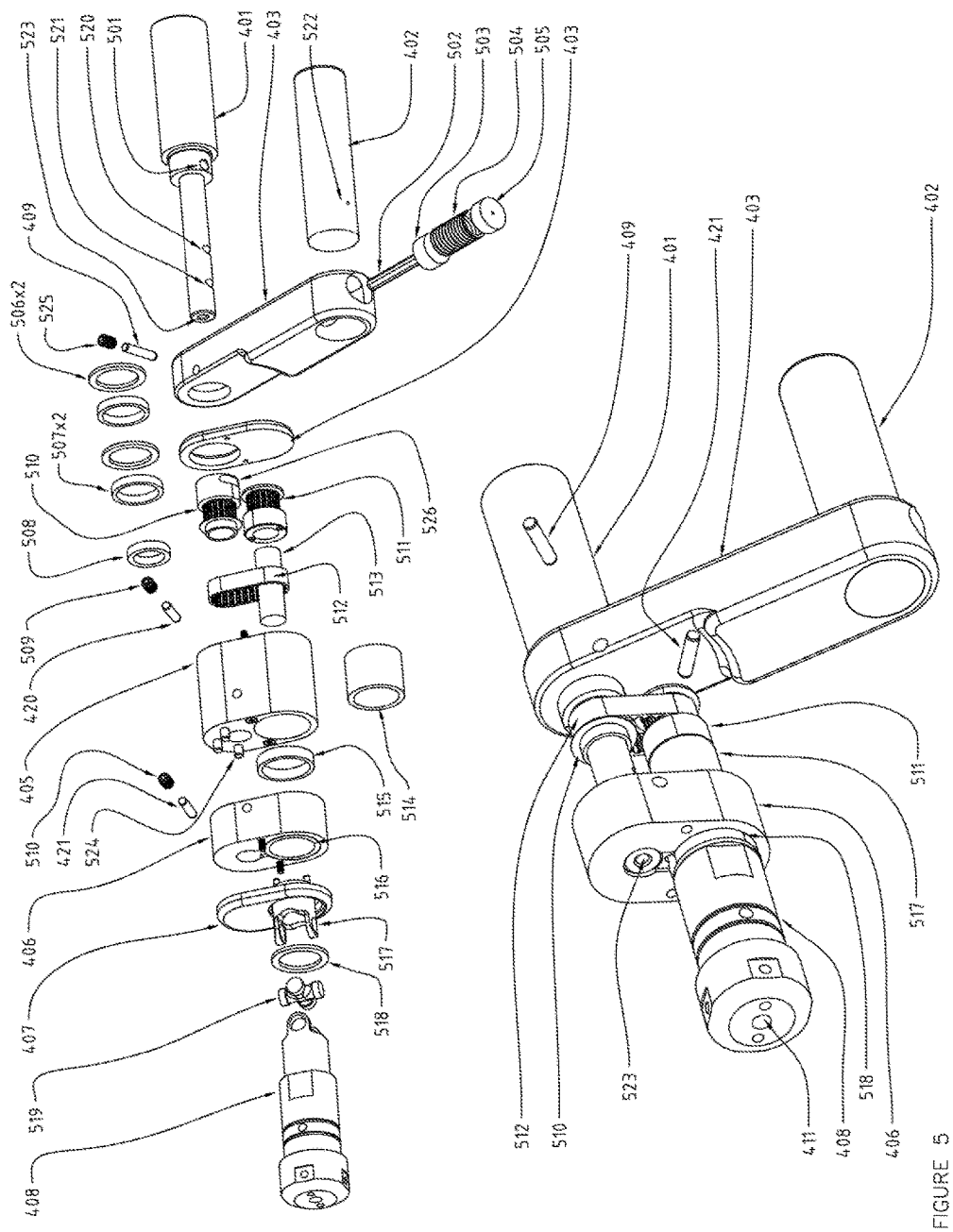
FIG. 5 is an exploded and front isometric view depicting the exploded assembly of Controlled Non-Rotating Field of View Synchronous Orbital Off-Axis Alignment Camera Device and its assembled orbital drivetrain.

FIG. 5 (Exploded, Drive and Driven components X− Front Isometric Views) depicts the exploded assembly of Controlled Non-Rotating Field of View Synchronous Orbital Off-Axis Alignment Camera Device 131 and its assembled orbital drivetrain, that can be configures as a Controlled Rotating Field of View Synchronous Orbital Off-Axis Alignment Camera Device or as an Controlled Orbital Off-Axis Alignment Camera Device with an Dedicated Drive Axis for the Controlled Rotational Off-Axis Alignment Camera Device while the off-axis is either orbiting or stationary.

FIG. 6 (X+ Front Isometric View) depicts the multiple axes Horizontal Machine Tool 101 with the Rotatably Mounted Angular Off-axis Controlled Vision Camera System 609 installed in the spindle tool holder 108 being secured in the machine tool's rotational spindle 107 that is an its 0° position being in the spindle nose 106 being linearly positioned by the X axis 111 and Y 110) axis for the vision camera to view Optical Positional/Angular Alignment Datum 116 that is part of the Optical Positional/Angular Alignment Datum module 113 mounted onto the workpiece pallet 105 being mounted to the rotational B axis 102 that is at its 0° position being linearly positioned by the Z axis 104.

FIG. 7 (Isometric Views—*not shown) depicts the internal positional elements for controlling the vision camera optics 112 of the Rotatably Mounted Angular Off-axis Controlled Vision Camera System *609 having the having the vision camera 701 connected to the optical lens 709 having an internal coaxial illumination source 710) that is centrally located to the shadow guide tube 711 and its illumination ring 811. Having the vision camera 701 being pivotally mounted onto its stationary guide 708 having it's up-down pitch being pivoted by the identical motions of the linear actuations of the left movable pivot 713 and right movable pivot 715 via the simultaneous forward or reverse actuation of their corresponding left pivot actuator 712 and right pivot actuator 714, while having its left-right yaw being pivoted by the differential in the motions of the linear actuations of the left movable pivot 713 and right movable pivot 715 via the simultaneous forward and reverse actuation of their corresponding left pivot actuator 712 and right pivot actuator 714, having the variable focal distance zoom optical lens 709 being controlled by its rotary actuator 716 being connected by the timing drive belt 717, and having the shadow guide tube 711 and its illumination ring being controlled by its rotary actuator 718 being connected by the timing drive belt 719 that is positioned by its rotary-linear screw 723 in its corresponding guide bearing housing 722 and additionally guided by the linear shaft 721 in its corresponding guide bearing housing 720).

Having the *command-and-control means of the Rotatably Mounted Angular Off-axis Controlled Vision Camera System (*609 being facilitated via the bidirectional radio *I/O antennas connected to the vision camera 701 antenna mounts 705 and 706 that are used to transmit and receive data externally while the *power and *internal I/O is electrically connected via their corresponding wiring ports 702, 703, and 704, for being typical as shown in FIGS. 1,2, and 3 for the Work Piece Metrology/Vision Camera System 109.

FIG. 8 (Orthogonal Views—*not shown) depicts the internal positional elements for controlling the vision camera optics 112 of the Rotatably Mounted Angular Off-axis Controlled Vision Camera System *609 having the having the vision camera 701 connected to the optical lens 709 having an internal coaxial illumination source 710) that is centrally located to the shadow guide tube 711 and its illumination ring 811. Having the vision camera 701 being pivotally mounted onto its stationary guide 708 having it's up-down pitch being pivoted by identical motions of the linear actuations of the left movable pivot 713 being attached to its corresponding guide 813 and right movable pivot 715 being attached to its corresponding guide 815 via the simultaneous forward or reverse actuation of their corresponding left pivot actuator 712 and right pivot actuator 714, while having its left-right yaw being pivoted by the differential in the motions of the linear actuations of the left movable pivot 713 and right movable pivot 715 via the simultaneous forward and reverse actuation of their corresponding left pivot actuator 712 and right pivot actuator 714, having the variable focal distance zoom optical lens 709 being controlled by its rotary actuator 716 being connected by the timing drive belt 717, and having the shadow guide tube 711 and its illumination ring 811 being controlled for its extension toward 802 and its retraction from 801 the work piece by its rotary actuator 718 being connected by the timing drive belt 719 that is positioned by its rotary-linear screw 723 in its corresponding guide bearing housing 722 and additionally guided by the linear shaft 721 in its corresponding guide bearing housing 720).

Having the *command-and-control means of the Rotatably Mounted Angular Off-axis Controlled Vision Camera System *609 being facilitated via the bidirectional radio *I/O antennas connected to the vision camera 701 antenna mounts 705 and 706 that are used to transmit data externally while the *power and *internal I/O is electrically connected via their corresponding wiring ports 702, 703, and 704, for being typical as shown in FIGS. 1,2, and 3 for the Work Piece Metrology/Vision Camera System 109.

FIG. 9 (Orthogonal and Isometric Views—*not shown) depicts the Optical Positional/Angular Alignment Datum module 113 and or 123 comprising a base feature 901 having both an edge locational alignment feature 909 with the aligned location features to accurately position the alignment datum's 113 and 123 lower alignment datum's 114 or 124 with the corresponding higher alignment datum's 115 and 116 or 125 and 126 for its being secured to the workpiece pallet *105 via the fastener 907.

Figure 10:
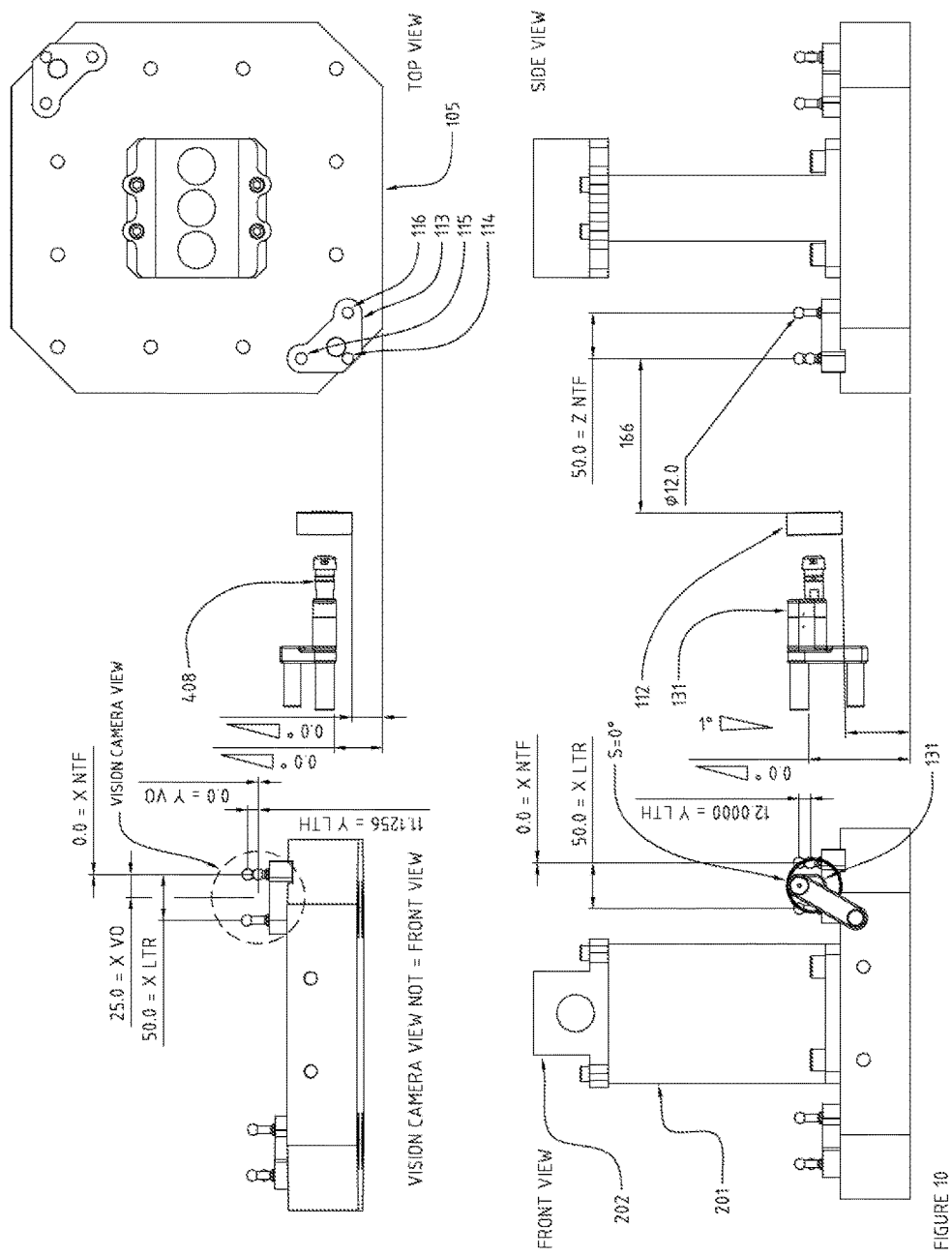
FIG. 10 is orthogonal and camera views depicting the Spindle 0° and its Pitch +1° for the positional alignment and corresponding vision camera's field of view for the multiple axes Horizontal Machine Tool.

FIG. 10 (Orthogonal and Camera Views—*not shown) depicts the Spindle 0° and its Pitch +1° for the positional alignment and corresponding vision camera's field of view for the multiple axes Horizontal Machine Tool *101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder *108 being secured in the machine tool's rotational spindle *107 that is at its 0° rotational position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Work Piece Metrology/Vision Camera System *109 having the camera's Yaw as shown in the Top View being axially aligned and the Pitch as shown in the Side View axially misaligned +1° with the workpiece pallet 105 and correspondingly aligned with the alignment datum's 113 lower alignment datum 114 and it's higher alignment datum 116 for having a 0.0 X axis Near To Far offset (X NTF) as shown in the Camera View that corresponds to their actual 0.0 offset as shown in the Front View, while having a 11.1256 Y axis Low To High offset (Y LTH) as shown in the Camera View that does not correspond to their actual 12.0 offset as shown in the Front View, while having it's corresponding higher alignment datum's 115 50.0 X axis Left To Right (X LTR) as shown in the Camera View that corresponds to their actual 50.0 offset as shown in the Front View, to detect the Yaw alignment and Pitch misalignment for the 0° orientation of the Work Piece Metrology/Vision Camera System *109, the Controlled Non-Rotating Field of View Synchronous Orbital Off-Axis Alignment Camera Device 131, or the Horizontal Machine Tool *101.

Figure 11:
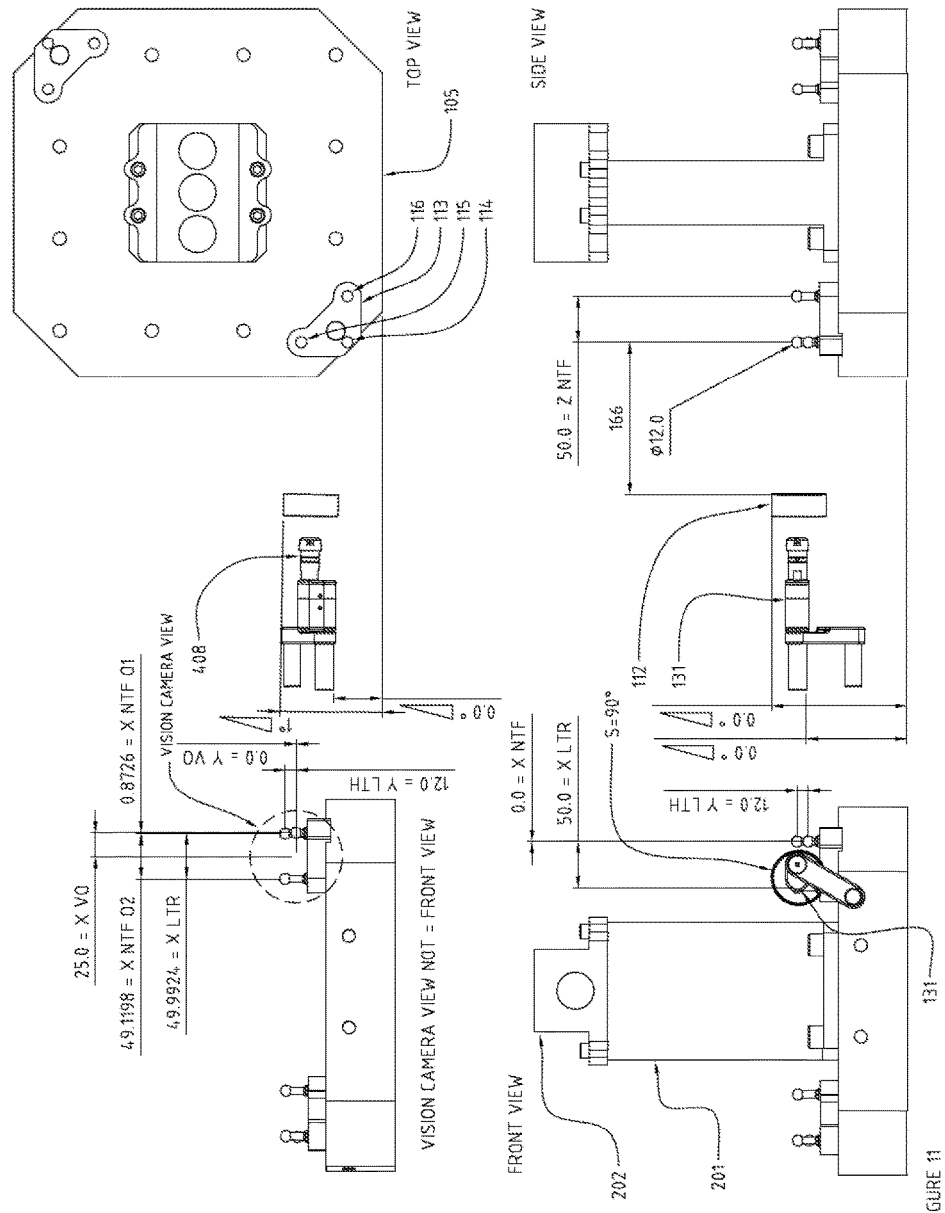
FIG. 11 is orthogonal and camera views depicting the Spindle 90° and its Yaw +1° for the positional alignment and corresponding vision camera's field of view for the multiple axes Horizontal Machine Tool.

FIG. 11 (Orthogonal and Camera Views—*not shown) depicts the Spindle 90° and its Yaw +1° for the positional alignment and corresponding vision camera's field of view for the multiple axes Horizontal Machine Tool *101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder *108 being secured in the machine tool's rotational spindle *107 that is at its 90° rotational position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Work Piece Metrology/Vision Camera System *109 having the camera's Yaw as shown in the Top View being axially misaligned +1° and the Pitch as shown in the Side View axially aligned with the workpiece pallet 105 and correspondingly aligned with the alignment datum's 113 lower alignment datum 114 and it's higher alignment datum 116 for having a 0.8726 X axis Near To Far offset (X NTF O1 as shown in the Camera View that does not correspond to their actual 0.0 offset as shown in the Front View and 49.1198 X axis Near To Far offset (X NTF O2 as shown in the Camera View that does not correspond to their actual 50.0 offset as shown in the Front View, while having a 12.0 Y axis Low To High offset (Y LTH) as shown in the Camera View that corresponds to their actual 12.0 offset as shown in the Front View, while having it's corresponding higher alignment datum's 115 49.9924 X axis Left To Right (X LTR) as shown in the Camera View that does not correspond to their actual 50.0 offset as shown in the Front View, to detect the Yaw alignment and Pitch misalignment for the 90° orientation of the Work Piece Metrology/Vision Camera System *109, the Controlled Non-Rotating Field of View Synchronous Orbital Off-Axis Alignment Camera Device 131, or the Horizontal Machine Tool *101.

Figure 18:
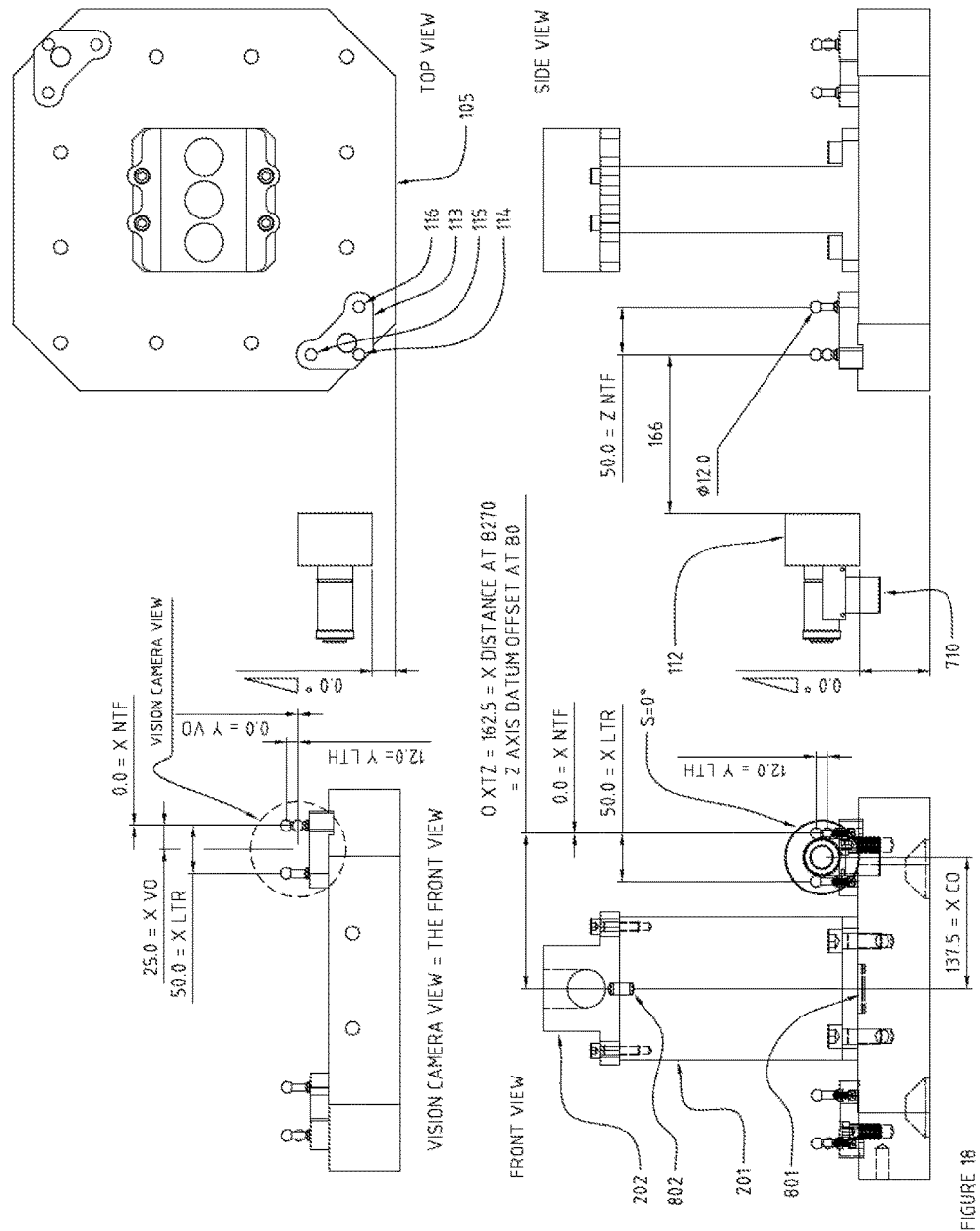
FIG. 18 is orthogonal and camera views depicting the Spindle 0° and its initial Yaw and Pitch alignment positional analyses, verification, and calibration.

Optionally, the workpiece pallet 105 being mounted to the rotational B axis *102 is rotated to its 269° position for having a common alignment with the vision camera optics 112 of the Work Piece Metrology/Vision Camera System *109 to have the vision Camera View being the same as the Front View to facilitate having the potential for the same common vision camera alignments as shown in FIG. 18.

Figure 23:
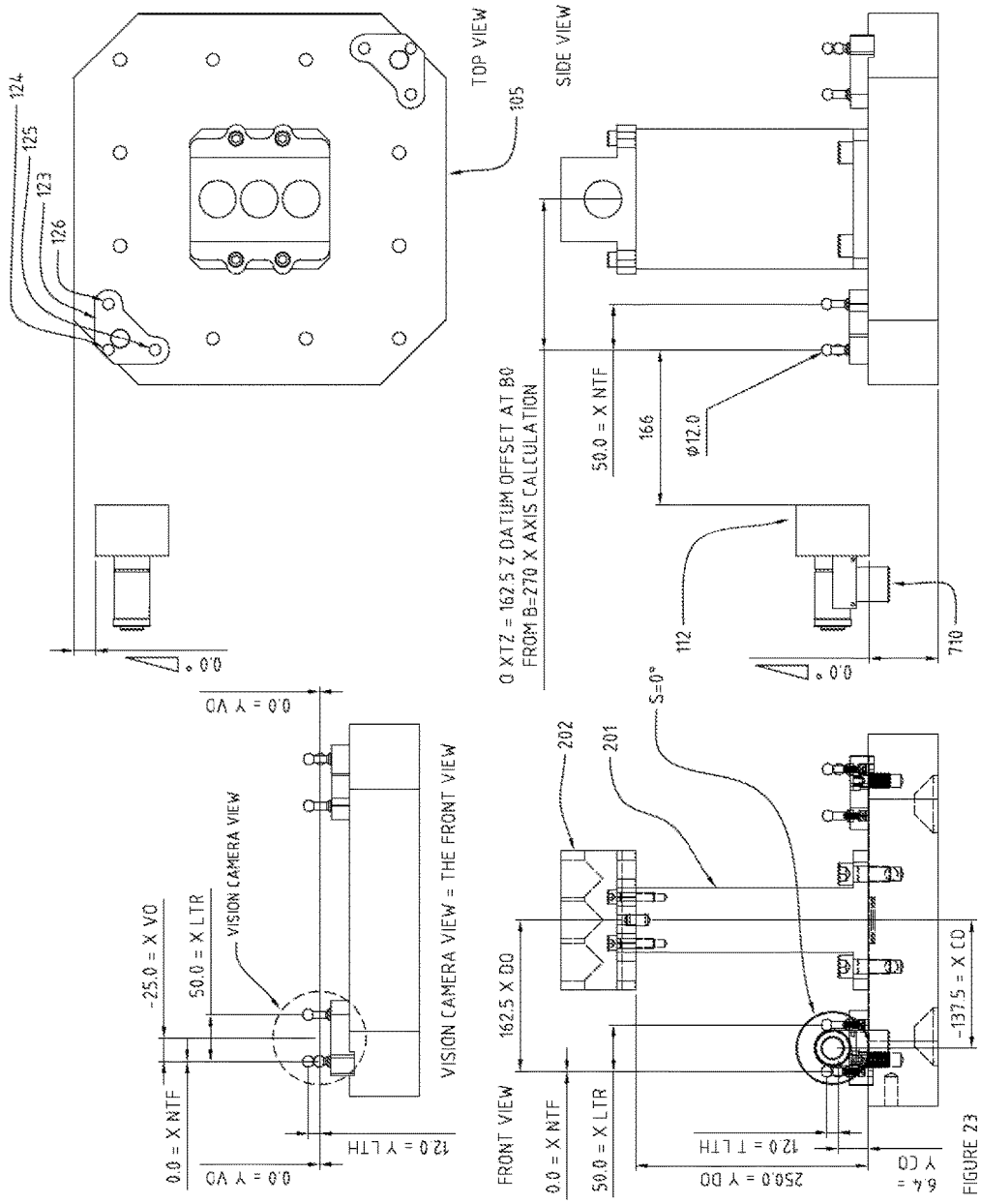
FIG. 23 is orthogonal and camera views depicting the Spindle 0° and its initial Yaw and Pitch alignment positional analyses, verification, and calibration and its equivalent X and Y axes workpiece datum offset.

Optionally, the workpiece pallet 105 being mounted to the rotational B axis *102 is rotated to its 359° position for having a common alignment with the vision camera optics 112 of the Work Piece Metrology/Vision Camera System *109 to have the vision Camera View being the same as the Front View to facilitate having the potential for the same common vision camera alignments as shown in FIG. 23.

Figure 12:
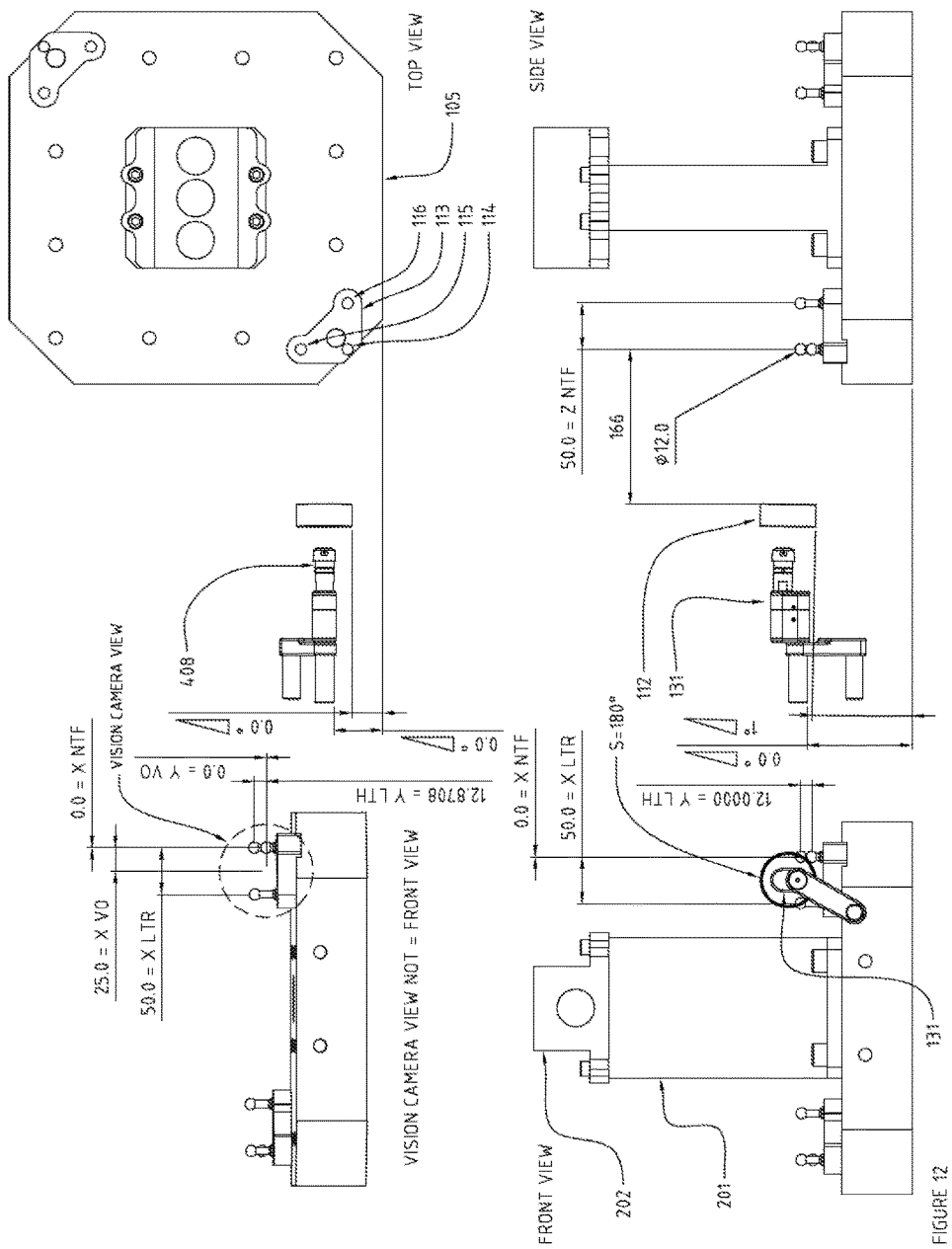
FIG. 12 is orthogonal and camera views depicting the Spindle 180° and its Pitch −1° for the positional alignment and corresponding vision camera's field of view for the multiple axes Horizontal Machine Tool.

FIG. 12 (Orthogonal and Camera Views—*not shown) depicts the Spindle 180° and its Pitch −1° for the positional alignment and corresponding vision camera's field of view for the multiple axes Horizontal Machine Tool *101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder *108 being secured in the machine tool's rotational spindle *107 that is at its 180° rotational position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Work Piece Metrology/Vision Camera System *109 having the camera's Yaw as shown in the Top View being axially aligned and the Pitch as shown in the Side View axially misaligned −1° with the workpiece pallet 105 and correspondingly aligned with the alignment datum's 113 lower alignment datum 114 and it's higher alignment datum 116 for having a 0.0 X axis Near To Far offset (X NTF) as shown in the Camera View that corresponds to their actual 0.0 offset as shown in the Front View, while having a 12.8708 Y axis Low To High offset (Y LTH) as shown in the Camera View that does not correspond to their actual 12.0 offset as shown in the Front View, while having it's corresponding higher alignment datum's 115 50.0 X axis Left To Right (X LTR) as shown in the Camera View that corresponds to their actual 50.0 offset as shown in the Front View, to detect the Yaw alignment and Pitch misalignment for the 180° orientation of the Work Piece Metrology/Vision Camera System *109, the Controlled Non-Rotating Field of View Synchronous Orbital Off-Axis Alignment Camera Device 131, or the Horizontal Machine Tool *101.

Figure 13:
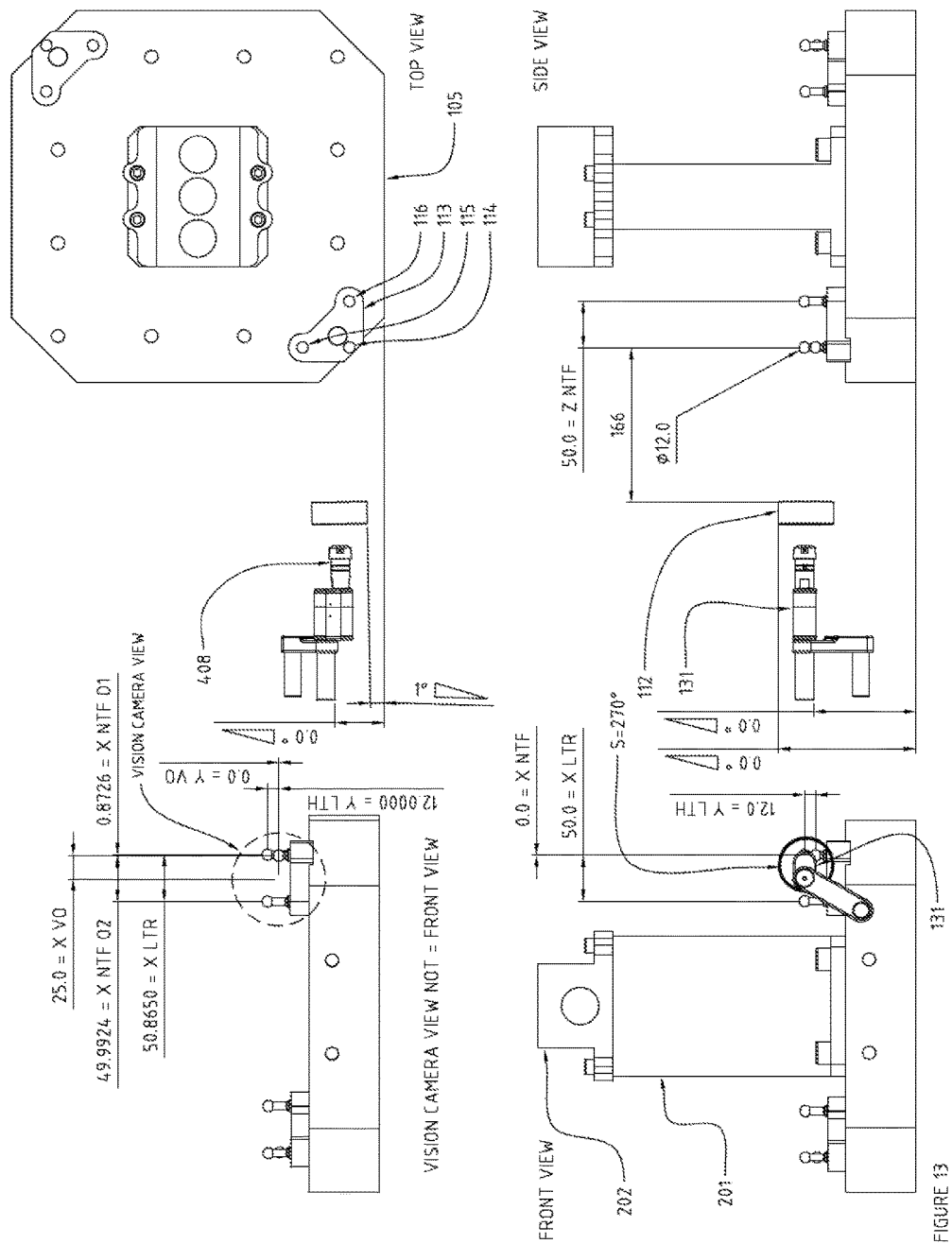
FIG. 13 is orthogonal and camera views depicting the Spindle 270° and its Yaw −1° for the positional alignment and corresponding vision camera's field of view for the multiple axes Horizontal Machine Tool.

FIG. 13 (Orthogonal and Camera Views—*not shown) depicts the Spindle 270° and its Yaw −1° for the positional alignment and corresponding vision camera's field of view for the multiple axes Horizontal Machine Tool *101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder *108 being secured in the machine tool's rotational spindle *107 that is at its 270° rotational position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Work Piece Metrology/Vision Camera System *109 having the camera's Yaw as shown in the Top View axially misaligned −1° and Pitch as shown in the Side View being axially aligned the with the workpiece pallet 105 and correspondingly aligned with the alignment datum's 113 lower alignment datum 114 and it's higher alignment datum 116 for having a 0.8726 X axis Near To Far offset (X NTF O1 as shown in the Camera View that does not correspond to their actual 0.0 offset as shown in the Front View and 49.9924 X axis Near To Far offset (X NTF O2 that does not correspond to their actual 50.0 offset as shown in the Front View, while having a 12.0 Y axis Low To High offset (Y LTH) as shown in the Camera View that corresponds to their actual 12.0 offset as shown in the Front View, while having it's corresponding higher alignment datum's 115 50.5680 X axis Left To Right (X LTR) as shown in the Camera View that does not correspond to their actual 50.0 offset, to detect the Yaw alignment and Pitch misalignment for the 270° orientation of the Work Piece Metrology/Vision Camera System *109, the Controlled Non-Rotating Field of View Synchronous Orbital Off-Axis Alignment Camera Device 131, or the Horizontal Machine Tool *101.

Optionally, the workpiece pallet 105 being mounted to the rotational B axis *102 is rotated to its 271° position for having a common alignment with the vision camera optics 112 of the Work Piece Metrology/Vision Camera System *109 to have the vision Camera View being the same as the Front View to facilitate having the potential for the same common vision camera alignments as shown in FIG. 18.

Optionally, the workpiece pallet 105 being mounted to the rotational B axis *102 is rotated to its 1° position for having a common alignment with the vision camera optics 112 of the Work Piece Metrology/Vision Camera System *109 to have the vision Camera View being the same as the Front View to facilitate having the potential for the same common vision camera alignments as shown in FIG. 23.

Figure 14:
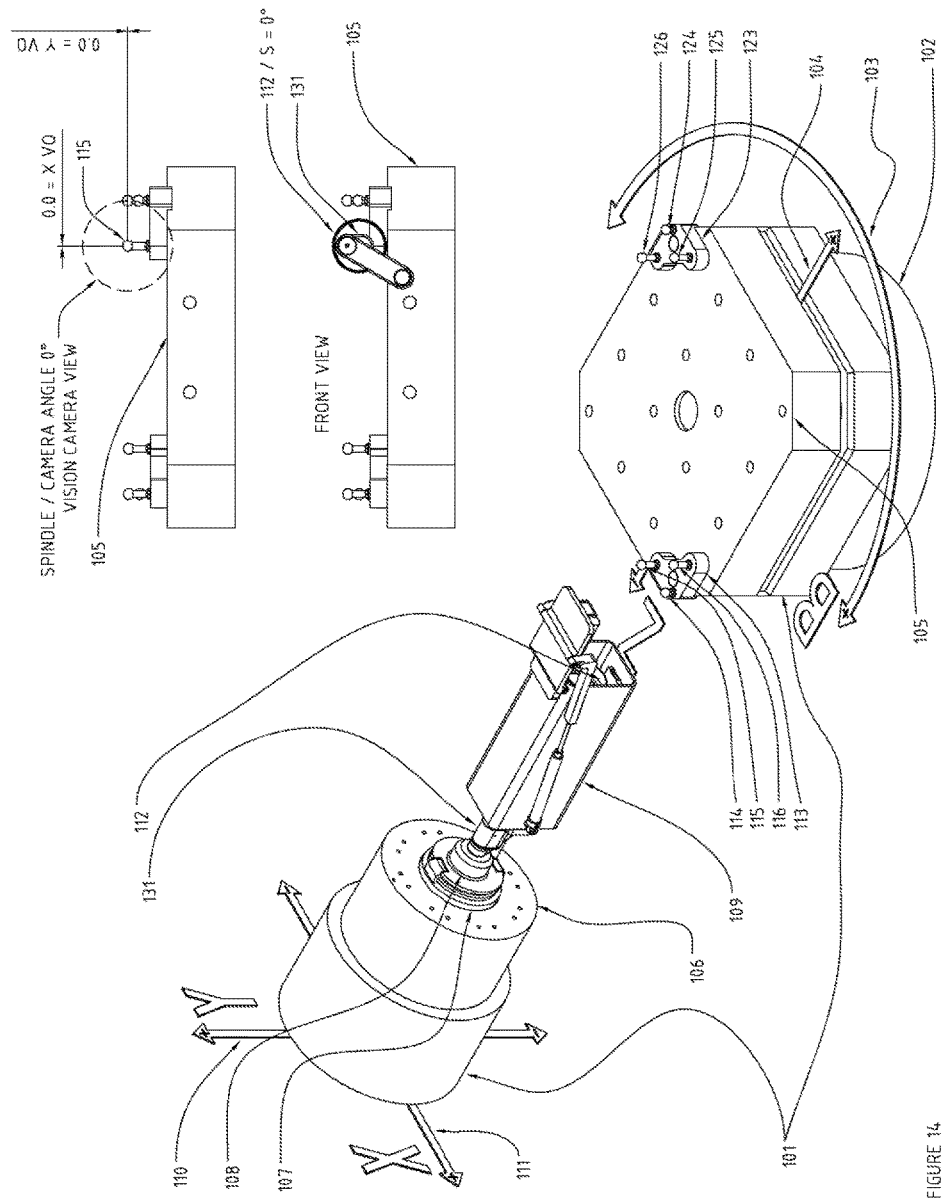
FIG. 14 is front isometric and front views depicting the multiple axes Horizontal Machine Tool with the Controlled Orbital Mounted Angular Off-axis Vision Camera System comprising the Work Piece Metrology/Vision Camera System.

FIG. 14 (X+ Front Isometric and Front Views—*not shown) depicts the multiple axes Horizontal Machine Tool 101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder 108 being secured in the machine tool's rotational spindle 107 that is at its 0° rotational position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Work Piece Metrology/Vision Camera System *109 being focused on single alignment datum's 115 for its positional analyses, verification, and calibration.

Figure 15:
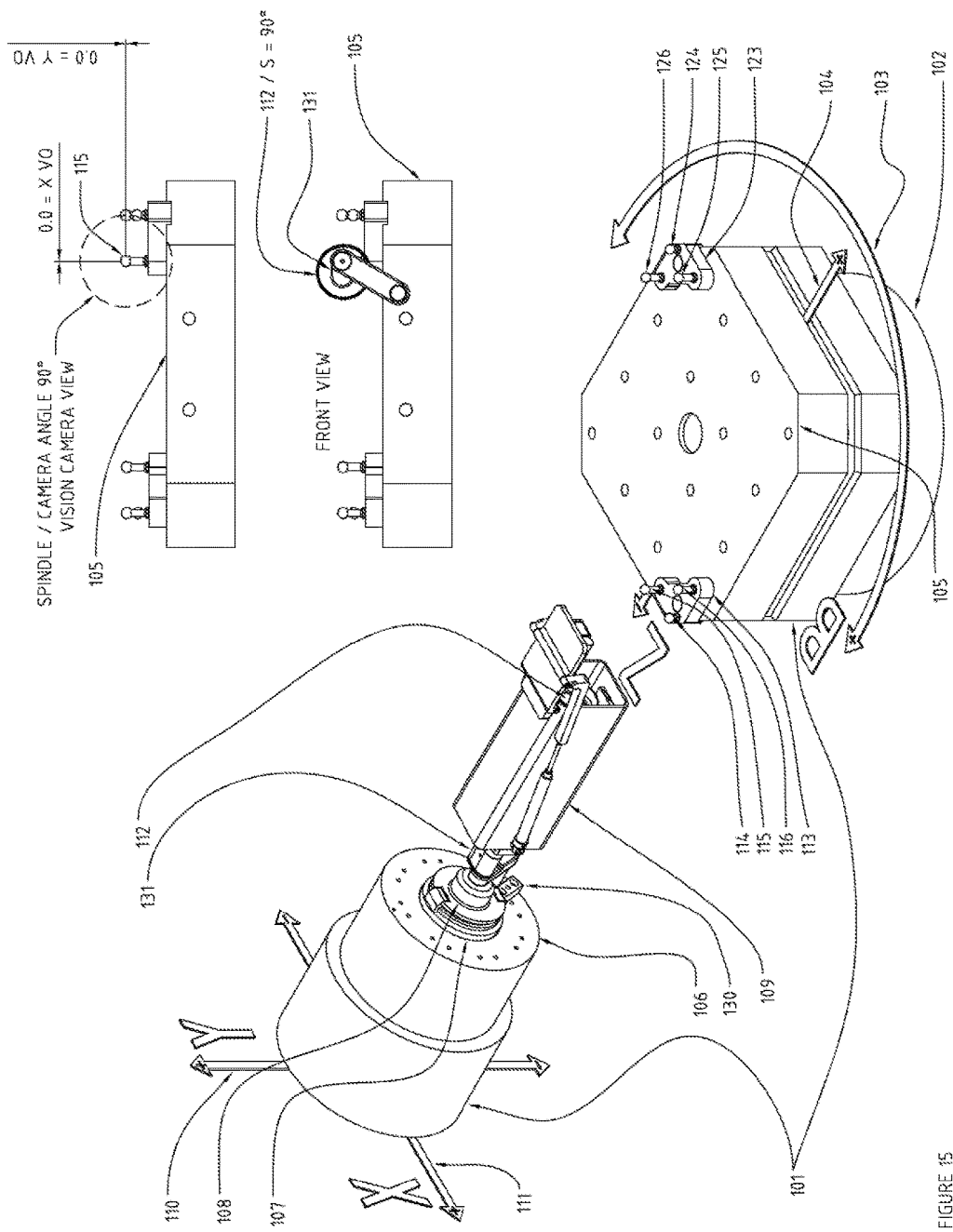
FIG. 15 is front isometric and front views depicting the multiple axes Horizontal Machine Tool with the Controlled Orbital Mounted Angular Off-axis Vision Camera System comprising the Work Piece Metrology/Vision Camera System.

FIG. 15 (X+ Front Isometric and Front Views—*not shown) depicts the multiple axes Horizontal Machine Tool 101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder 108 being secured in the machine tool's rotational spindle 107 that is an its 90° position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Work Piece Metrology/Vision Camera System *109 being focused on single alignment datum's 115 for its positional analyses, verification, and calibration.

Figure 16:
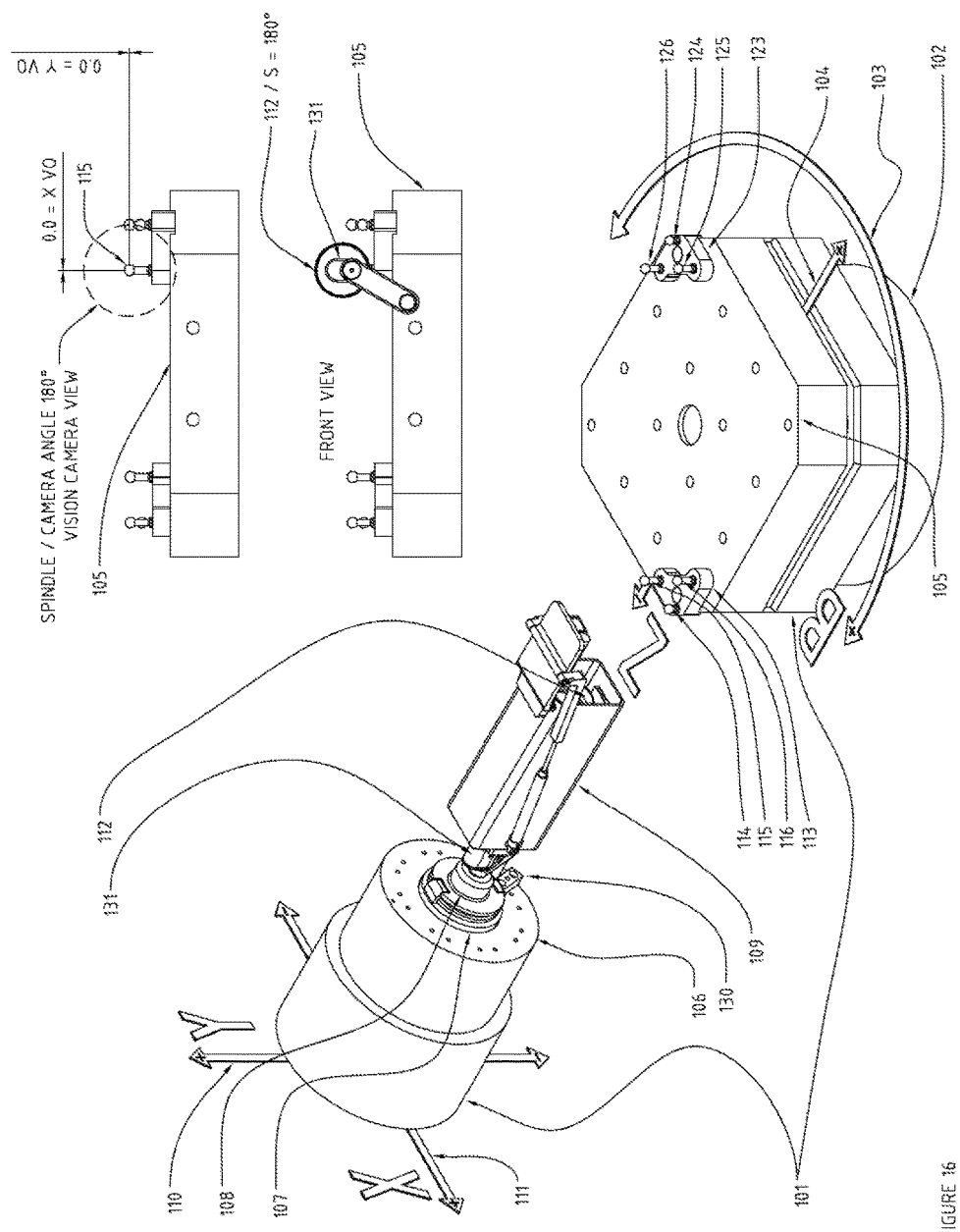
FIG. 16 is front isometric and front views depicting the multiple axes Horizontal Machine Tool with the Controlled Orbital Mounted Angular Off-axis Vision Camera System comprising the Work Piece Metrology/Vision Camera System.

FIG. 16 (X+ Front Isometric and Front Views—*not shown) depicts the multiple axes Horizontal Machine Tool 101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder 108 being secured in the machine tool's rotational spindle 107 that is an its 180° position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Work Piece Metrology/Vision Camera System *109 being focused on single alignment datum's 115 for its positional analyses, verification, and calibration.

Figure 17:
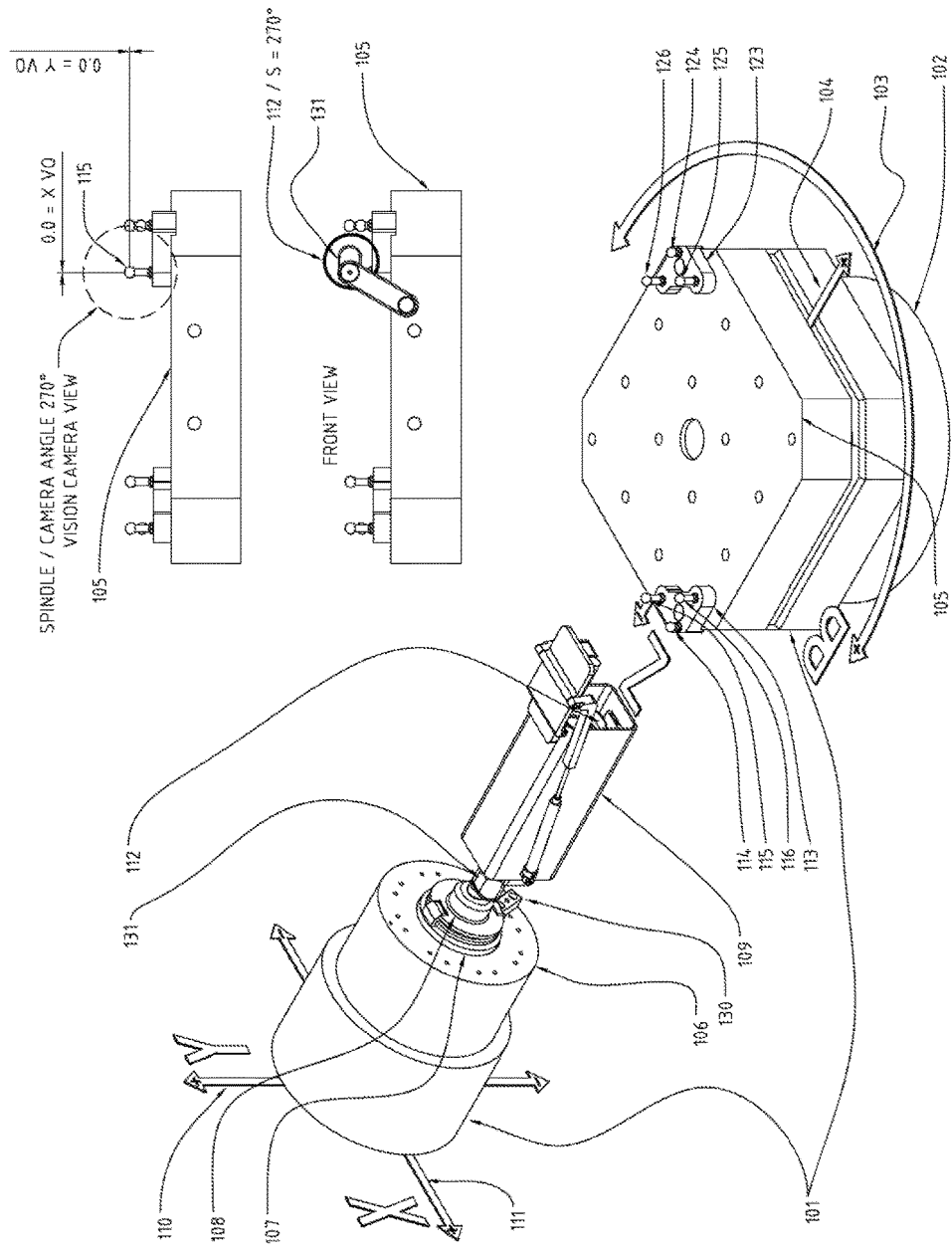
FIG. 17 is front isometric and front views depicting the multiple axes Horizontal Machine Tool with the Controlled Orbital Mounted Angular Off-axis Vision Camera System comprising the Work Piece Metrology/Vision Camera System.

FIG. 17 (X+ Front Isometric and Front Views—*not shown) depicts the multiple axes Horizontal Machine Tool 101 with the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 installed in the spindle tool holder 108 being secured in the machine tool's rotational spindle 107 that is an its 270° position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Work Piece Metrology/Vision Camera System *109 being focused on single alignment datum's 115 for its positional analyses, verification, and calibration.

FIG. 18 (Orthogonal and Camera Views—*not shown) depicts the Spindle 0° and its initial Yaw and Pitch alignment positional analyses, verification, and calibration and its equivalent Z axis workpiece datum offset for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 0° rotational position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Rotatably Mounted Angular Off-axis Controlled Vision Camera System *609 having both the camera's Yaw as shown in the Top View being axially aligned and the Pitch as shown in the Side View axially aligned with the workpiece pallet 105 and correspondingly aligned with the alignment datum's 113 lower alignment datum 114 and it's higher alignment datum 116 for having a 0.0 X axis Near To Far offset (X NTF) as shown in the Camera View that corresponds to their actual 0.0 offset as shown in the Front View, while having a 12.0 Y axis Low To High offset (Y LTH) as shown in the Camera View that corresponds to their actual 12.0 offset as shown in the Front View, while having it's corresponding higher alignment datum's 115 50.0 X axis Left To Right (X LTR) as shown in the Camera View that corresponds to their actual 50.0 offset as shown in the Front View, to verify and or calibrate the Yaw and Pitch alignments for the S=0° orientation of the Rotatably Mounted Angular Off-axis Controlled Vision Camera System *609.

Using the vision camera's actual 25.0 X axis Vision Offset (X VO) and its 137.5 X axis camera offset (X CO) to mathematically determine the 162.5 X axis offset at the B=270° (O XTZ) and its corresponding Z axis positional value at B=0°, having the actual work piece datum offset dimension being previously known or being subsequently determined via the Rotatably Mounted Angular Off-axis Controlled Vision Camera System *609 being used to optically locate the datum position of the workpiece 202.

Figure 19:
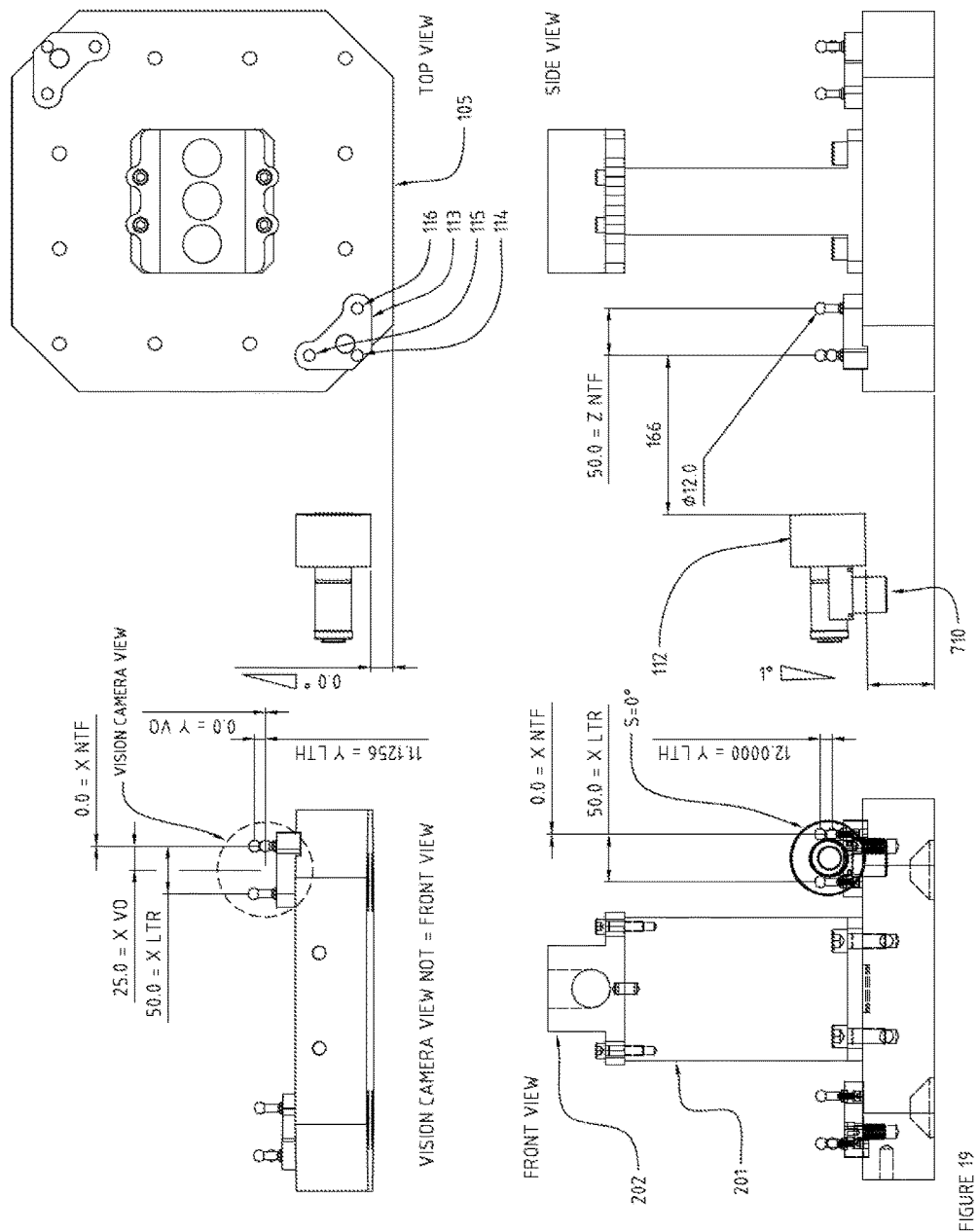
FIG. 19 is orthogonal and camera views depicting the Spindle 0° and its Pitch +1° positional analyses, verification, and calibration.

FIG. 19 (Orthogonal and Camera Views—*not shown) depicts the Spindle 0° and its Pitch +1° positional analyses, verification, and calibration for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 0° position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Rotatably Mounted Angular Off-axis Controlled Vision Camera System *609 having the camera's Yaw being axially aligned as shown in the Top View and the Pitch off-axis alignment or misalignment +1° as shown in the Side View with the workpiece pallet 105 and correspondingly aligned with the alignment datum's 113 lower alignment datum 114 and it's higher alignment datum 116 for having a 0.0 X axis Near To Far offset (X NTF) as shown in the Camera View that corresponds to their actual 0.0 offset as shown in the Front View, while having a 11.1256 Y axis Low To High offset (Y LTH) as shown in the Camera View that does not correspond to their actual 12.0 offset as shown in the Front View, while having it's corresponding higher alignment datum's 115 50.0 X axis Left To Right (X LTR) as shown in the Camera View that corresponds to their actual 50.0 offset as shown in the Front View, to detect the Yaw alignment and Pitch off-axis alignment or misalignment for the S=0° orientation of the Rotatably Mounted Angular Off-axis Controlled Vision Camera System *609 or the Horizontal Machine Tool *101.

Figure 20:
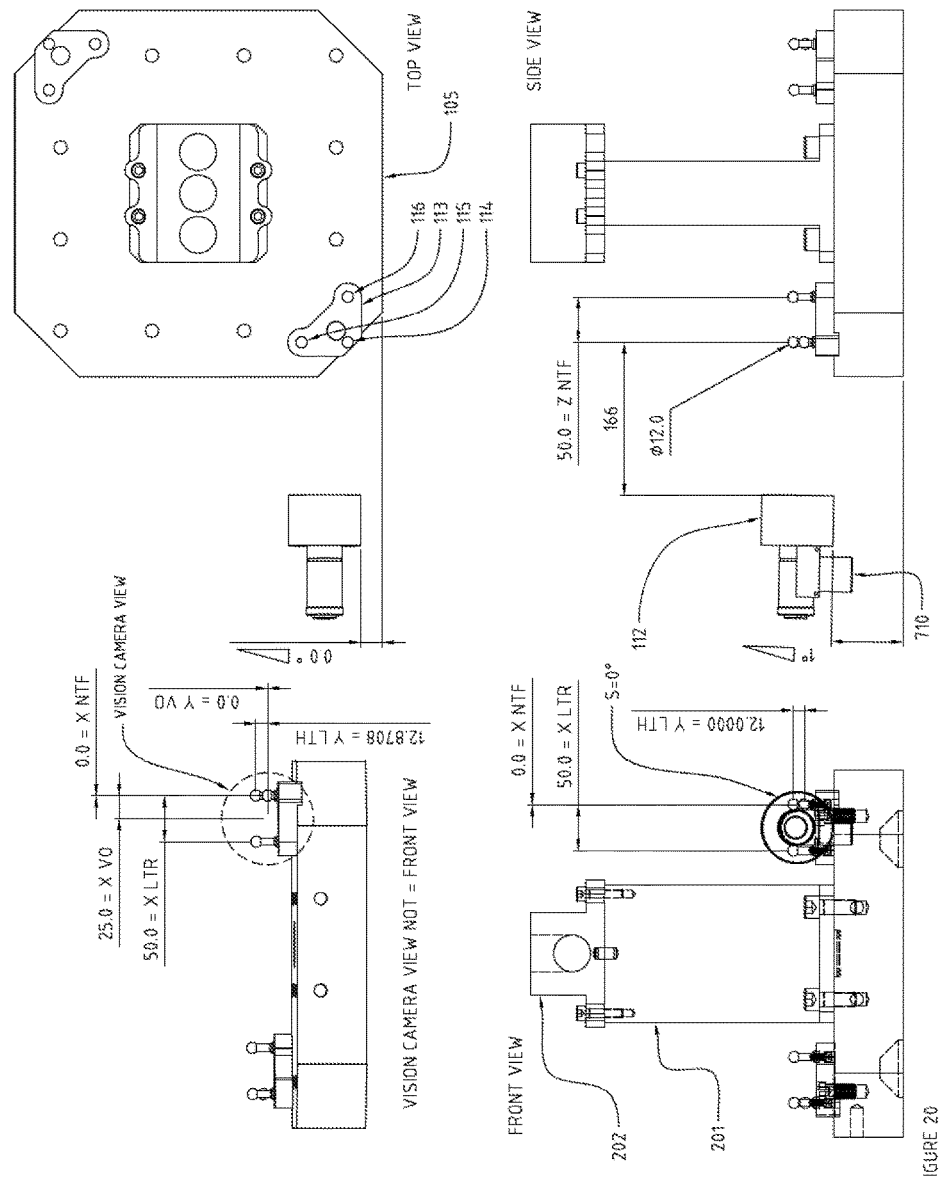
FIG. 20 is orthogonal and camera views depicting the Spindle 0° and its Pitch −1° positional analyses, verification, and calibration.

FIG. 20 (Orthogonal and Camera Views—*not shown) depicts the Spindle 0° and its Pitch −1° positional analyses, verification, and calibration for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 0° position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Rotatably Mounted Angular Off-axis Controlled Vision Camera System *609 having the camera's Yaw being axially aligned as shown in the Top View and the Pitch off-axis alignment or misalignment −1° as shown in the Side View with the workpiece pallet 105 and correspondingly aligned with the alignment datum's 113 lower alignment datum 114 and it's higher alignment datum 116 for having a 0.0 X axis Near To Far offset (X NTF) as shown in the Camera View that corresponds to their actual 0.0 offset as shown in the Front View, while having a 12.8708 Y axis Low To High offset (Y LTH) as shown in the Camera View that does not correspond to their actual 12.0 offset as shown in the Front View, while having it's corresponding higher alignment datum's 115 50.0 X axis Left To Right (X LTR) as shown in the Camera View that corresponds to their actual 50.0 offset as shown in the Front View, to detect the Yaw alignment and Pitch off-axis alignment or misalignment for the S=0° orientation of the Rotatably Mounted Angular Off-axis Controlled Vision Camera System *609 or the Horizontal Machine Tool *101.

Figure 21:
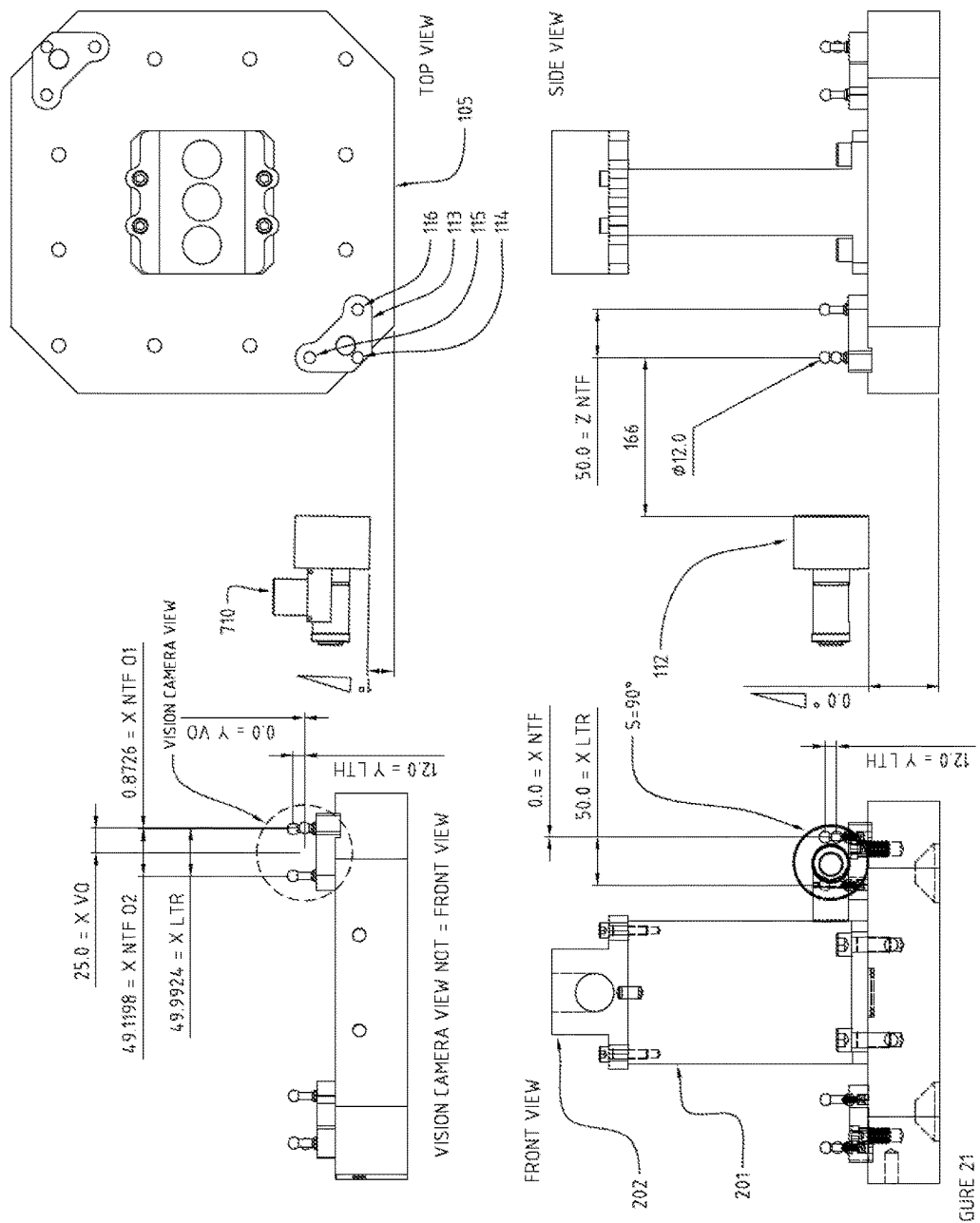
FIG. 21 is orthogonal and camera views depicting the Spindle 90° and its Relative Pitch of +1° equals an Effective Yaw of +1° positional analyses, verification, and calibration for the multiple axes Horizontal Machine Tool.

FIG. 21 (Orthogonal and Camera Views—*not shown) depicts the Spindle 90° and its Relative Pitch of +1° equals an Effective Yaw of +1° positional analyses, verification, and calibration for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 90° position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Rotatably Mounted Angular Off-axis Controlled Vision Camera System *609 having the camera's Yaw off-axis alignment or misalignment +1° as shown in the Top View and the Pitch axially aligned as shown in the Side View with the workpiece pallet 105 and correspondingly aligned with the alignment datum's 113 lower alignment datum 114 and it's higher alignment datum 116 for having a 0.8726 X axis Near To Far offset (X NTF O1 as shown in the Camera View that does not correspond to their actual 0.0 offset as shown in the Front View and 49.1198 X axis Near To Front offset (X NTF O2 as shown in the Camera View that does not correspond to their actual 50.0 offset as shown in the Front View, while having a 12.0 Y axis Low To High offset (Y LTH) as shown in the Camera View that corresponds to their actual 12.0 offset as shown in the Front View, while having it's corresponding higher alignment datum's 115 49.9924 X axis Left To Right (X LTR) as shown in the Camera View that does not correspond to their actual 50.0 offset as shown in the Front View, to detect the Yaw off-axis alignment or misalignment and Pitch alignment for the S=90° orientation of the Rotatably Mounted Angular Off-axis Controlled Vision Camera System *609 or the Horizontal Machine Tool *101.

Figure 22:
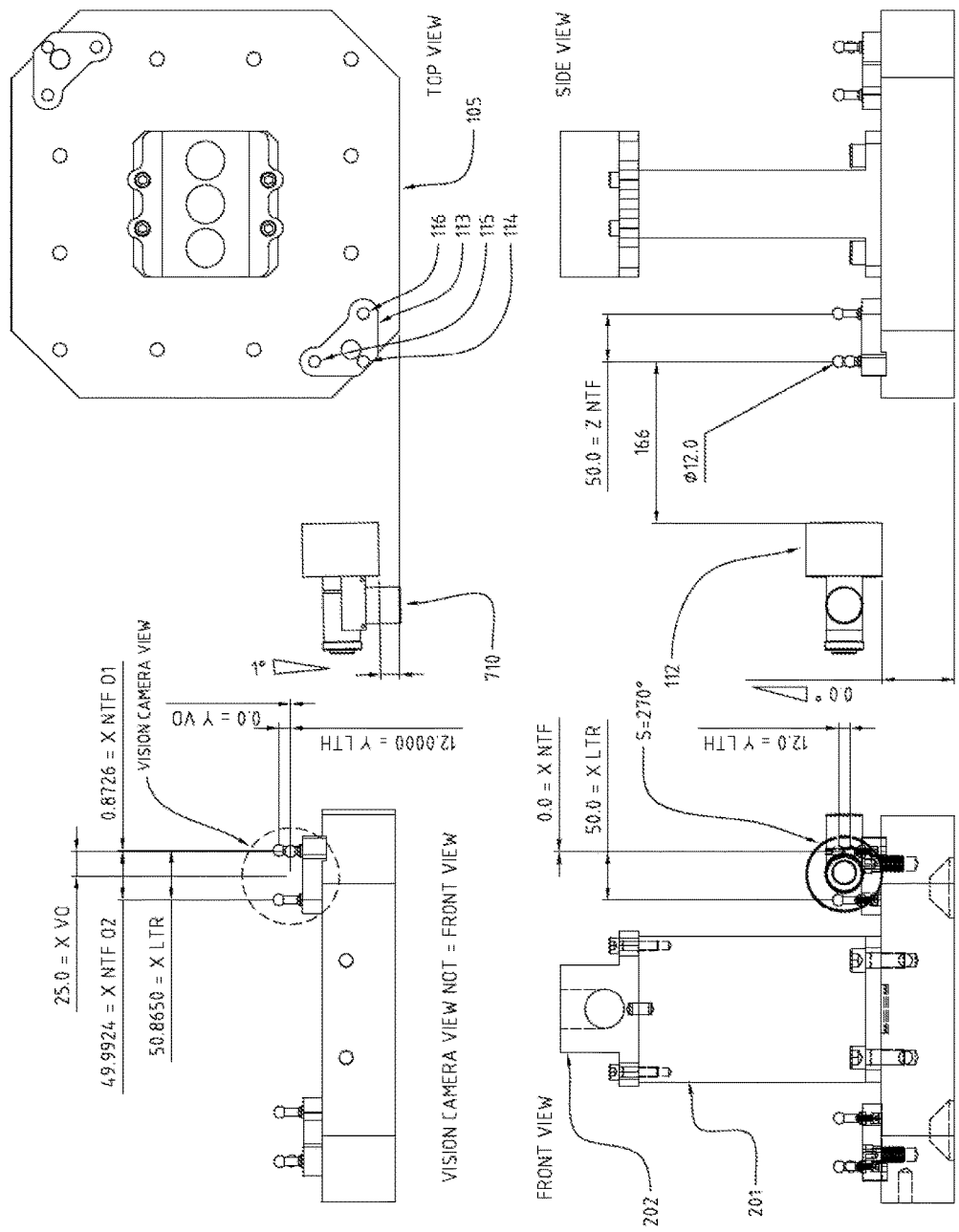
FIG. 22 is orthogonal and camera views depicting the Spindle 270° and its Relative Pitch of +1° equals an Effective Yaw −1° positional analyses, verification, and calibration for the multiple axes Horizontal Machine Tool.

FIG. 22 (Orthogonal and Camera Views—*not shown) depicts the Spindle 270° and its Relative Pitch of +1° equals an Effective Yaw −1° positional analyses, verification, and calibration for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 270° position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 270° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Rotatably Mounted Angular Off-axis Controlled Vision Camera System *609 having the Yaw off-axis alignment or misalignment −1° as shown in the Top View and the Pitch axially aligned as shown in the Side View workpiece pallet 105 and correspondingly aligned with the alignment datum's 113 lower alignment datum 114 and it's higher alignment datum 116 for having a 0.8726 X axis Near To Far offset (X NTF O1 as shown in the Camera View that does not correspond to their actual 0.0 offset as shown in the Front View and 49.9924 X axis Near To Front offset (X NTF O2 as shown in the Camera View that does not correspond to their actual 50.0 offset as shown in the Front View, while having a 12.0 Y axis Low To High offset (Y LTH) as shown in the Camera View that corresponds to their actual 0.0 offset as shown in the Front View, while having it's corresponding higher alignment datum's 115 50.5680 X axis Left To Right (X LTR) as shown in the Camera View that does not correspond to their actual 50.0 offset as shown in the Front View, to detect the Yaw off-axis alignment or misalignment and Pitch alignment for the S=270° orientation of the Rotatably Mounted Angular Off-axis Controlled Vision Camera System *609.

FIG. 23 (Orthogonal and Camera Views—*not shown) depicts the Spindle 0° and its initial Yaw and Pitch alignment positional analyses, verification, and calibration and its equivalent X and Y axes workpiece datum offset for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 0° position being in the spindle nose *106 being linearly positioned by the X axis *111 and Y *110) axis for the vision camera to view Optical Positional/Angular Alignment Datum 116 that is part of the Optical Positional/

Angular Alignment Datum module 113 mounted onto the workpiece pallet 105 being mounted to the rotational B axis *102 that is at its 0° position being linearly positioned by the Z axis *104), having the work piece 202 being mounted to a workpiece holder 201 that are positionally aligned by the edge datum locators *117 and *127 having workpiece 202 being orientated to the machine tool's rotational spindle *107 with the vision camera optics 112 of the Rotatably Mounted Angular Off-axis Controlled Vision Camera System *609 having both the camera's Yaw as shown in the Top View and Pitch as shown in the Side View being axially aligned with the workpiece pallet 105 and correspondingly aligned with the alignment datum's 123 lower alignment datum 124 and it's higher alignment datum 126 for having a 0.0 X axis Near To Front offset (X NTF) as shown in the Camera View that corresponds to their actual 0.0 offset as shown in the Front View, while having a 12.0 Y axis Low To High offset (Y LTH) as shown in the Camera View that corresponds to their actual 12.0 offset as shown in the Front View, while having it's corresponding higher alignment datum's 125 50.0 X axis Left To Right (X LTR) as shown in the Camera View that corresponds to their actual 50.0 offset as shown in the Front View, to verify and or calibrate the Yaw and Pitch alignments for the S=0° orientation of the Rotatably Mounted Angular Off-axis Controlled Vision Camera System *609.

Using the 162.5 X axis offset measured at the B=270° pallet orientation (O XTZ) for the corresponding Z axis datum's positional value at the B=0°, with the vision camera's actual −25.0 X axis Vision Offset (X VO) and its −137.5 X axis camera offset (X CO) to mathematically determine the corresponding 162.5 X axis datum offset's (X DO) positional value, and the vision camera's actual 0.0 Y axis Vision Offset (Y VO) and its 6.4 Y axis camera offset (Y CO) to mathematically determine the corresponding 250.0 Y axis datum offset's (Y DO) positional value, having its actual dimension being previously known or being subsequently determined via the Rotatably Mounted Angular Off-axis Controlled Vision Camera System *609 being used to optically locate the datum's position of the workpiece 202.

Figure 24:
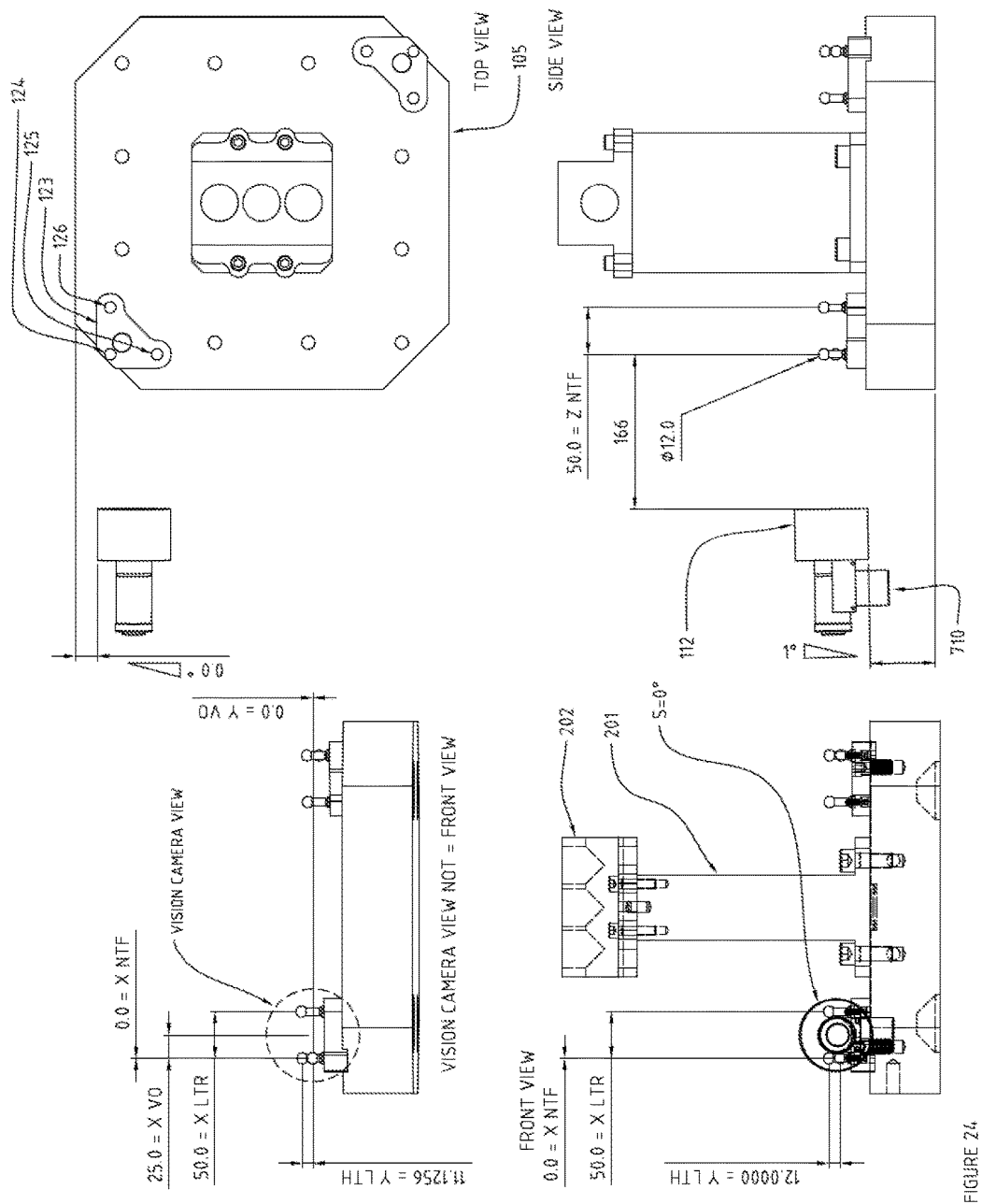
FIG. 24 is orthogonal and camera views depicting the Spindle 0° and its Pitch +1° positional analyses, verification, and calibration for the multiple axes Horizontal Machine Tool.

FIG. 24 (Orthogonal and Camera Views—*not shown) depicts the Spindle 0° and its Pitch +1° positional analyses, verification, and calibration for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 0° position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 0° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Rotatably Mounted Angular Off-axis Controlled Vision Camera System *609 having the camera's Yaw being axially aligned as shown in the Top View and the Pitch off-axis alignment or misalignment +1° as shown in the Side View with the workpiece pallet 105 and correspondingly aligned with the alignment datum's 113 lower alignment datum 114 and it's higher alignment datum 116 for having a 0.0 X axis Near To Far offset (X NTF) as shown in the Camera View that corresponds to their actual 0.0 offset as shown in the Front View, while having a 11.1256 Y axis Low To High offset (Y LTH) as shown in the Camera View that does not correspond to their actual 12.0 offset as shown in the Front View, while having it's corresponding higher alignment datum's 115 50.0 X axis Left To Right (X LTR) as shown in the Camera View that corresponds to their actual 50.0 offset as shown in the Front View, to detect the Yaw alignment and Pitch off-axis alignment or misalignment for the S=0° orientation of the Rotatably Mounted Angular Off-axis Controlled Vision Camera System *609 or the Horizontal Machine Tool *101.

Figure 25:
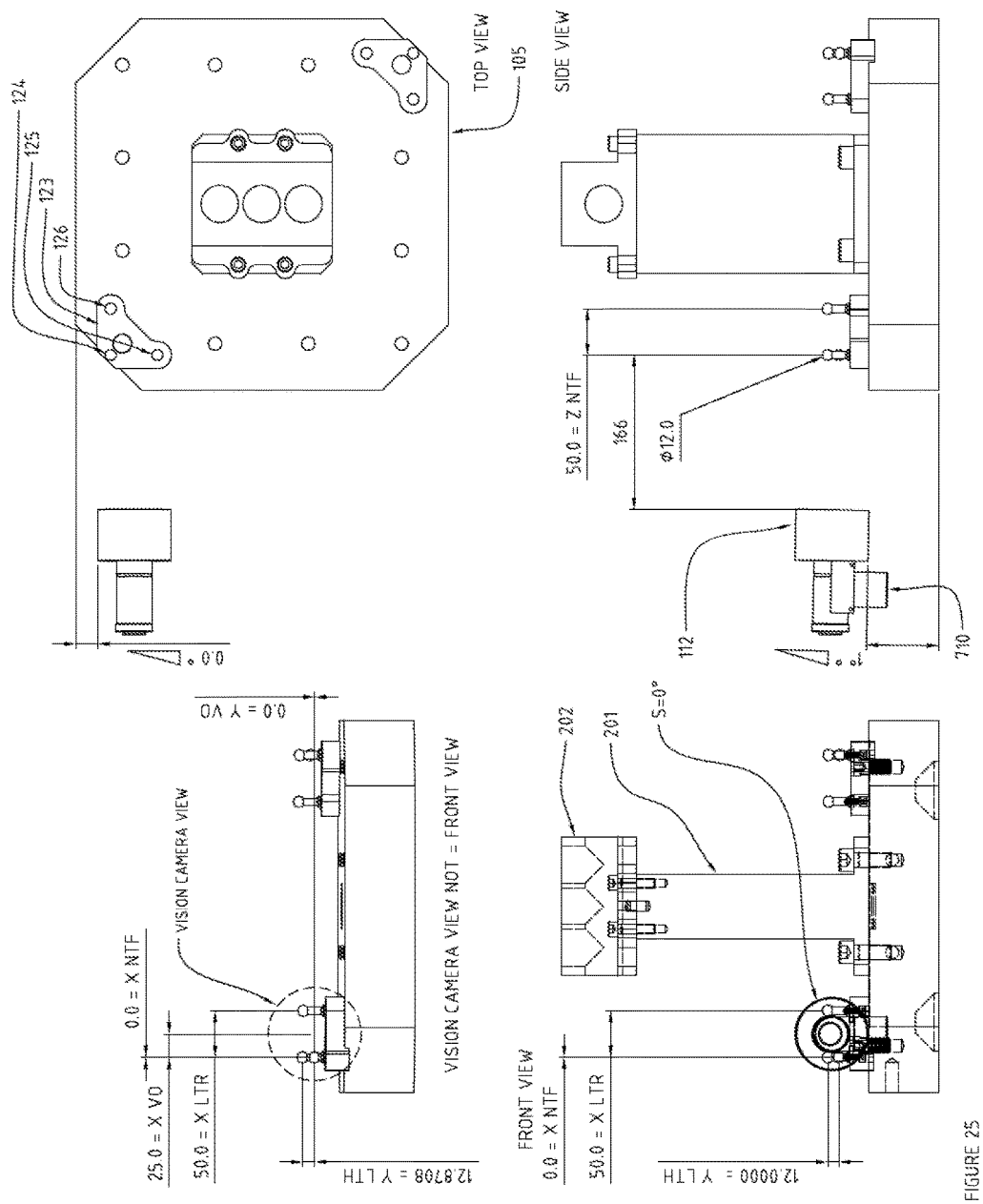
FIG. 25 is orthogonal and camera views depicting the Spindle 0° and its Pitch −1° positional analyses, verification, and calibration for the multiple axes Horizontal Machine Tool.

FIG. 25 (Orthogonal and Camera Views—*not shown) depicts the Spindle 0° and its Pitch −1° positional analyses, verification, and calibration for the multiple axes Horizontal Machine Tool *101 with the Rotatably Mounted Angular Off-axis Controlled Vision Camera System *609 installed in the spindle tool holder *108 being secured in the machine tool's rotational spindle *107 that is an its 0° position being in the spindle nose *106 being linearly positioned by the X axis *111 and Y *110) axis for the vision camera to view Optical Positional/Angular Alignment Datum 116 that is part of the Optical Positional/Angular Alignment Datum module 113 mounted onto the workpiece pallet 105 being mounted to the rotational B axis *102 that is at its 0° position being linearly positioned by the Z axis *104), having the work piece 202 being mounted to a workpiece holder 201 that are positionally aligned by the edge datum locators *117 and *127 having workpiece 202 being orientated 90° to the machine tool's rotational spindle *107 with the vision camera optics 112 of the Rotatably Mounted Angular Off-axis Controlled Vision Camera System *609 having the camera's Yaw being axially aligned as shown in the Top View and the Pitch off-axis alignment or misalignment −1° as shown in the Side View with the workpiece pallet 105 and correspondingly aligned with the alignment datum's 113 lower alignment datum 114 and it's higher alignment datum 116 for having a 0.0 X axis Near To Far offset (X NTF) as shown in the Camera View that corresponds to their actual 0.0 offset as shown in the Front View, while having a 12.8708 Y axis Low To High offset (Y LTH) as shown in the Camera View that does not correspond to their actual 12.0 offset as shown in the Front View, while having it's corresponding higher alignment datum's 115 50.0 X axis Left To Right (X LTR) as shown in the Camera View that corresponds to their actual 50.0 offset as shown in the Front View, to detect the Yaw alignment and Pitch off-axis alignment or misalignment for the S=0° orientation of the Rotatably Mounted Angular Off-axis Controlled Vision Camera System *609 or the Horizontal Machine Tool *101.

Figure 26:
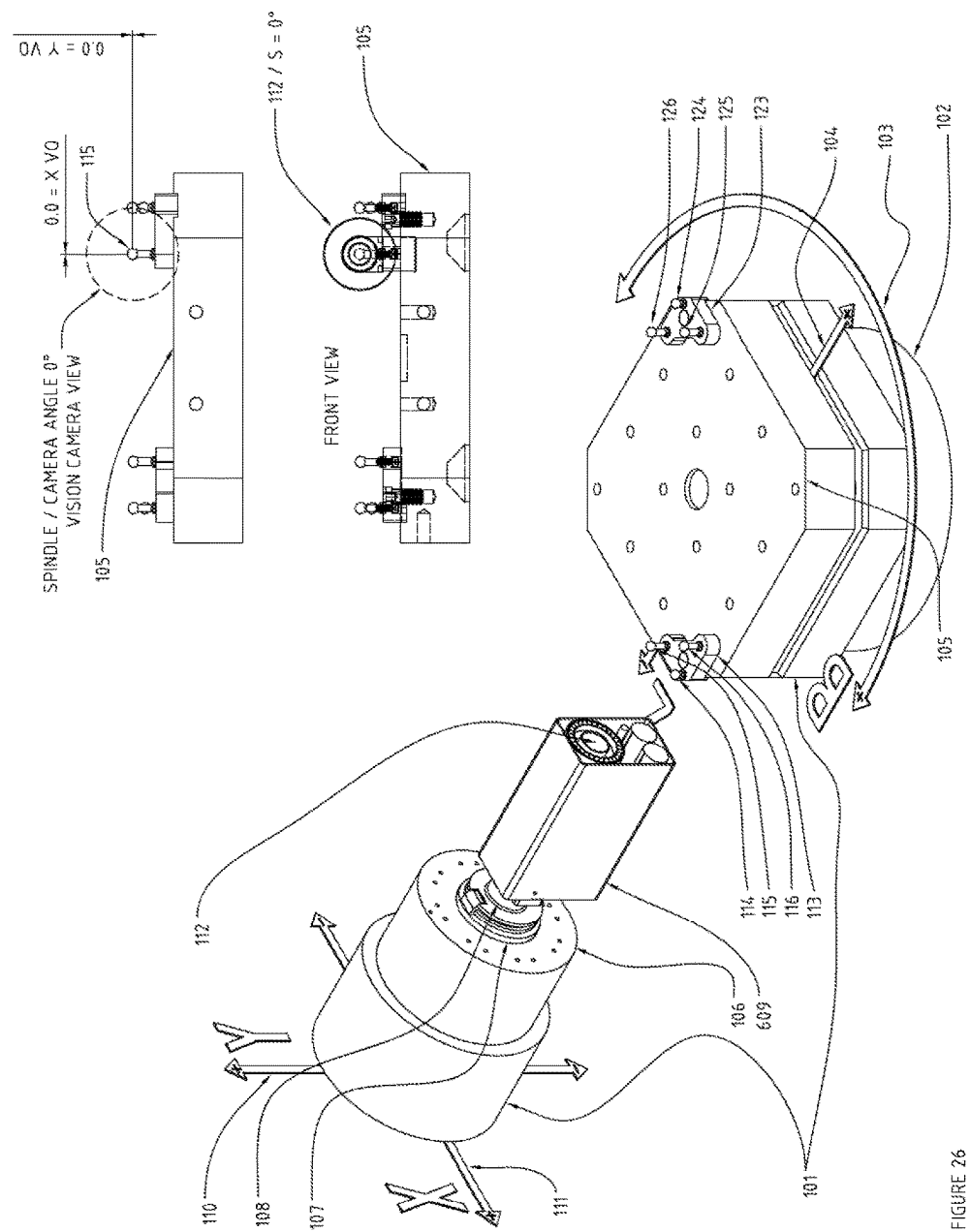
FIG. 26 is front isometric and front views depicting the multiple axes Horizontal Machine Tool with the Rotatably Mounted Angular Off-axis Controlled Vision Camera System.

FIG. 26 (X+ Front Isometric and Front Views—*not shown) depicts the multiple axes Horizontal Machine Tool 101 with the Rotatably Mounted Angular Off-axis Controlled Vision Camera System 609 installed in the spindle tool holder 108 being secured in the machine tool's rotational spindle 107 that is an its 0° position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Rotatably Mounted Angular Off-axis Controlled Vision Camera System 609 being focused on higher alignment datum's 115 for its positional analyses, verification, and calibration.

Figure 27:
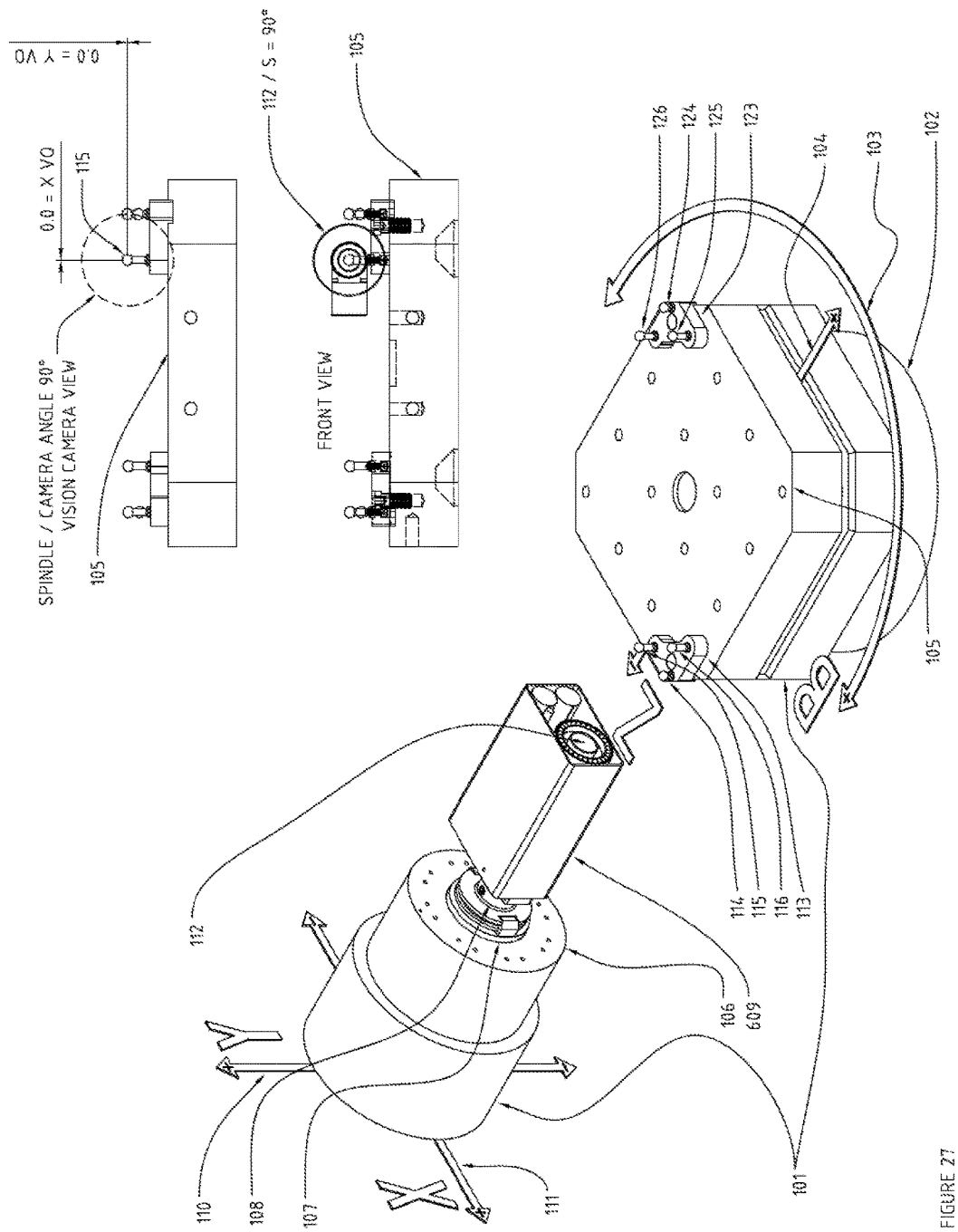
FIG. 27 is front isometric and front views depicting the multiple axes Horizontal Machine Tool 101 with the Rotatably Mounted Angular Off-axis Controlled Vision Camera System.

FIG. 27 (X+ Front Isometric and Front Views—*not shown) depicts the multiple axes Horizontal Machine Tool 101 with the Rotatably Mounted Angular Off-axis Controlled Vision Camera System 609 installed in the spindle tool holder 108 being secured in the machine tool's rotational spindle 107 that is an its 90° position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Rotatably Mounted Angular Off-axis Controlled Vision Camera System 609 being focused on higher alignment datum's 115 for its positional analyses, verification, and calibration.

Figure 28:
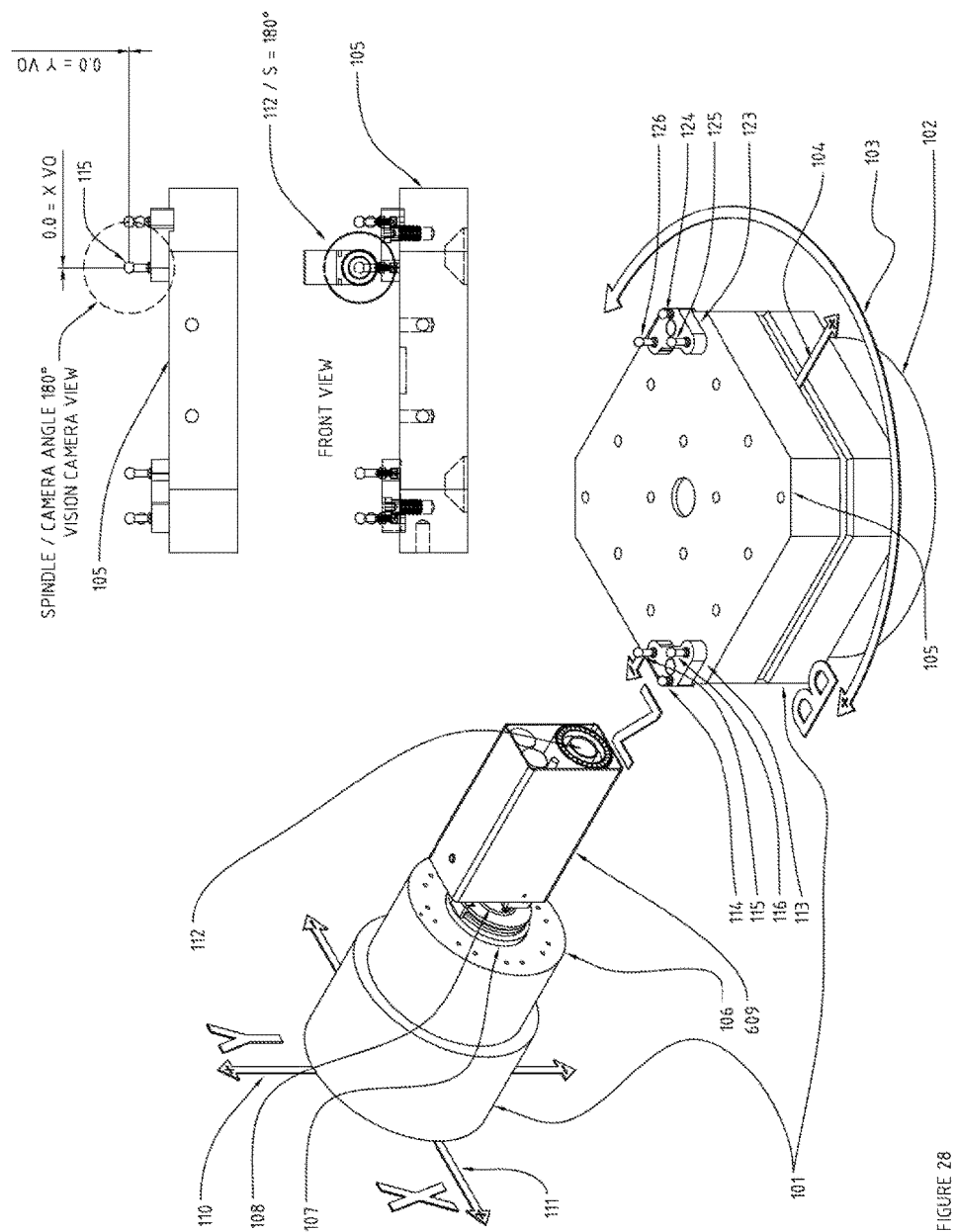
FIG. 28 is front isometric and front views depicting the multiple axes Horizontal Machine Tool 101 with the Rotatably Mounted Angular Off-axis Controlled Vision Camera System.

FIG. 28 (X+ Front Isometric and Front Views—*not shown) depicts the multiple axes Horizontal Machine Tool 101 with the Rotatably Mounted Angular Off-axis Controlled Vision Camera System 609 installed in the spindle tool holder 108 being secured in the machine tool's rotational spindle 107 that is an its 180° position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Rotatably Mounted Angular Off-axis Controlled Vision Camera System 609 being focused on higher alignment datum's 115 for its positional analyses, verification, and calibration.

Figure 29:
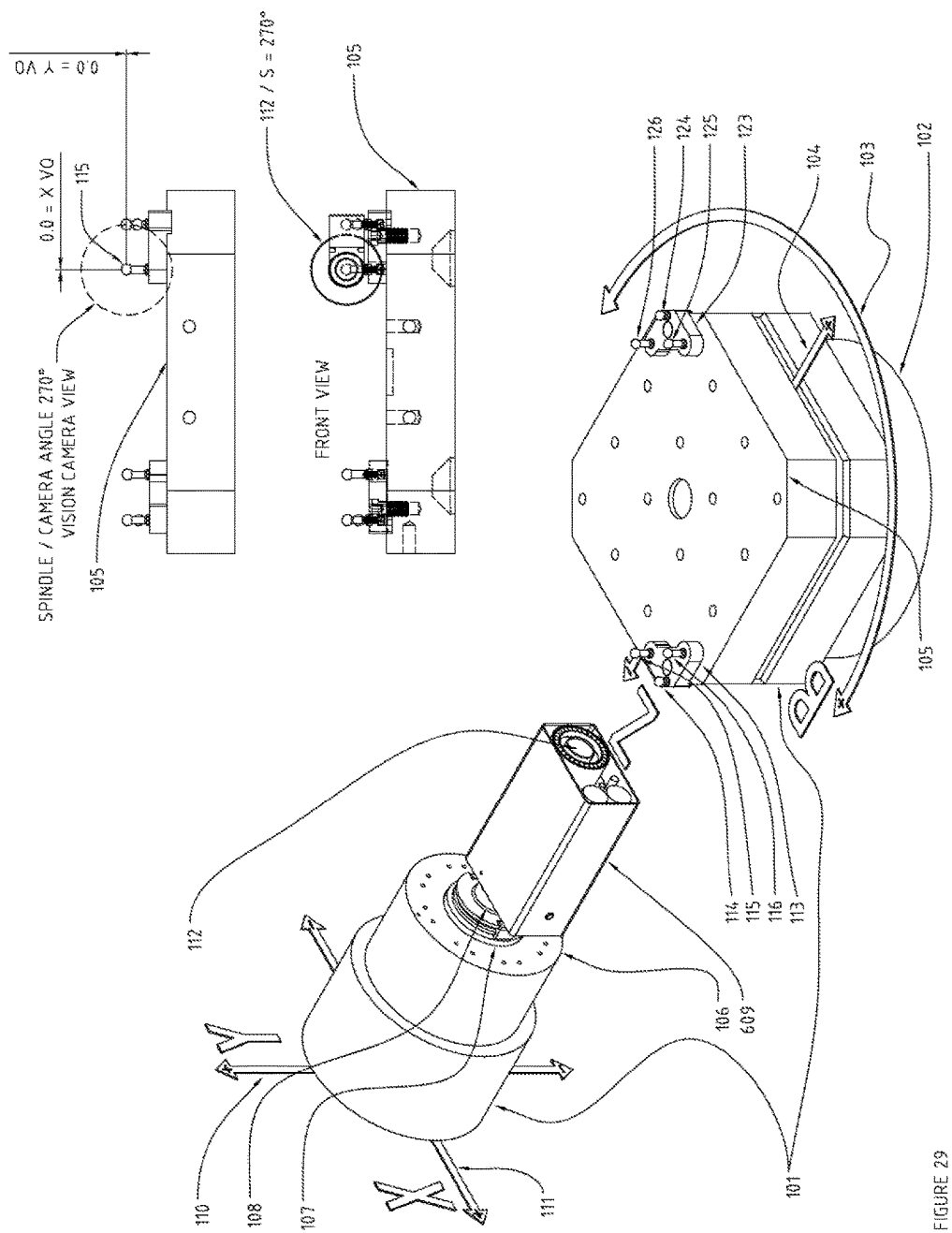
FIG. 29 is front isometric and front views depicting the multiple axes Horizontal Machine Tool 101 with the Rotatably Mounted Angular Off-axis Controlled Vision Camera System.

FIG. 29 (X+ Front Isometric and Front Views—*not shown) depicts the multiple axes Horizontal Machine Tool 101 with the Rotatably Mounted Angular Off-axis Controlled Vision Camera System 609 installed in the spindle tool holder 108 being secured in the machine tool's rotational spindle 107 that is an its 270° position being in the spindle nose 106 being linearly positioned by the X axis 111 and Y 110) axis for the vision camera optic's 112 view of the Optical Positional/Angular Alignment Datum 116 that is part of the Optical Positional/Angular Alignment Datum module 113 mounted onto the workpiece pallet 105 being mounted to the rotational B axis 102 that is at its 270° position being linearly positioned by the Z axis 104, having the work piece *202 being mounted to a workpiece holder *201 that are positionally aligned by the edge datum locators *117 and *127 having vision camera optics 112 of the Rotatably Mounted Angular Off-axis Controlled Vision Camera System 609 being focused on higher alignment datum's 115 for its positional analyses, verification, and calibration.

FIG. 30 (Comparative Camera Aligned Views—*not shown) depicting the visual perspective of the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 or the Rotatably Mounted Angular Off-axis Controlled Vision Camera System *609 or the Controlled Rotating Field of View Synchronous Orbital Off-Axis Alignment Camera Device—not shown being installed in the spindle tool holder *108 for the acceptable work piece's 202 through bore's 203 3 of 3 intersections for the 3 corresponding perpendicular holes 204, 205, and 206 for the Pitch +1° axial off-axis alignment of the vision camera optics *112 to the rotatable machine tool's rotational spindle *107 axis to facilitate having the bore's inside diameter 3001 of the work piece's 202 as being viewed via the vision camera at a depth from the workpiece 202 having surface for the spindle/vision camera *109 being oriented at the S=0° to view the bore's 3001 upper wall features, S=90° to view the bore's 3002 right side wall features, S=180° to view the bore's 3003 lower wall features, and S=270° to view the bore's 3004 left side wall features. Having the 3 intersections of the corresponding perpendicular holes 204, 205, and 206 being fully viewable/detectable at the correct location for the work piece's 202 through bore's 203 in-bore camera views at the spindle position for S=0°, while being appropriately partially viewable/detectable at the spindle positions for S=90° and S=270°, and not having any viewable/detectable details and or features at the spindle position for S=180°.

FIG. 31 (Comparative Camera Aligned Views—*not shown) depicting the visual perspective of the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device 131 or the Rotatably Mounted Angular Off-axis Controlled Vision Camera System *609 or the Controlled Rotating Field of View Synchronous Orbital Off-Axis Alignment Camera Device—not shown being installed in the spindle tool holder *108 for the defective work piece's 202 through bore's 203 1 of 3 intersections for the 3 corresponding perpendicular holes 204, 205, and 206 for the Pitch +1° axial off-axis alignment of the vision camera optics *112 to the rotatable machine tool's rotational spindle *107 axis to facilitate having the bore's inside diameter 3101 of the work piece's 202 as being viewed via the vision camera at a depth from the workpiece 202 having surface for the spindle/vision camera *109 being oriented at the S=0° to view the bore's 3101 upper wall features, S=90° to view the bore's 3102 right side wall features, S=180° to view the bore's 3103 lower wall features, and S=270° to view the bore's 3104 left side wall features. Having only the 1 center hole 205 the 3 intersections of the corresponding perpendicular holes *204, 205, and *206 being fully viewable/detectable at the correct location for the work piece's 202 through bore's 203 in-bore camera views at the spindle position for S=0°, while being appropriately partially viewable/detectable at the spindle positions for S=90° and S=270°, and not having any viewable/detectable details and or features at the spindle position for S=180°.

Figure 32:
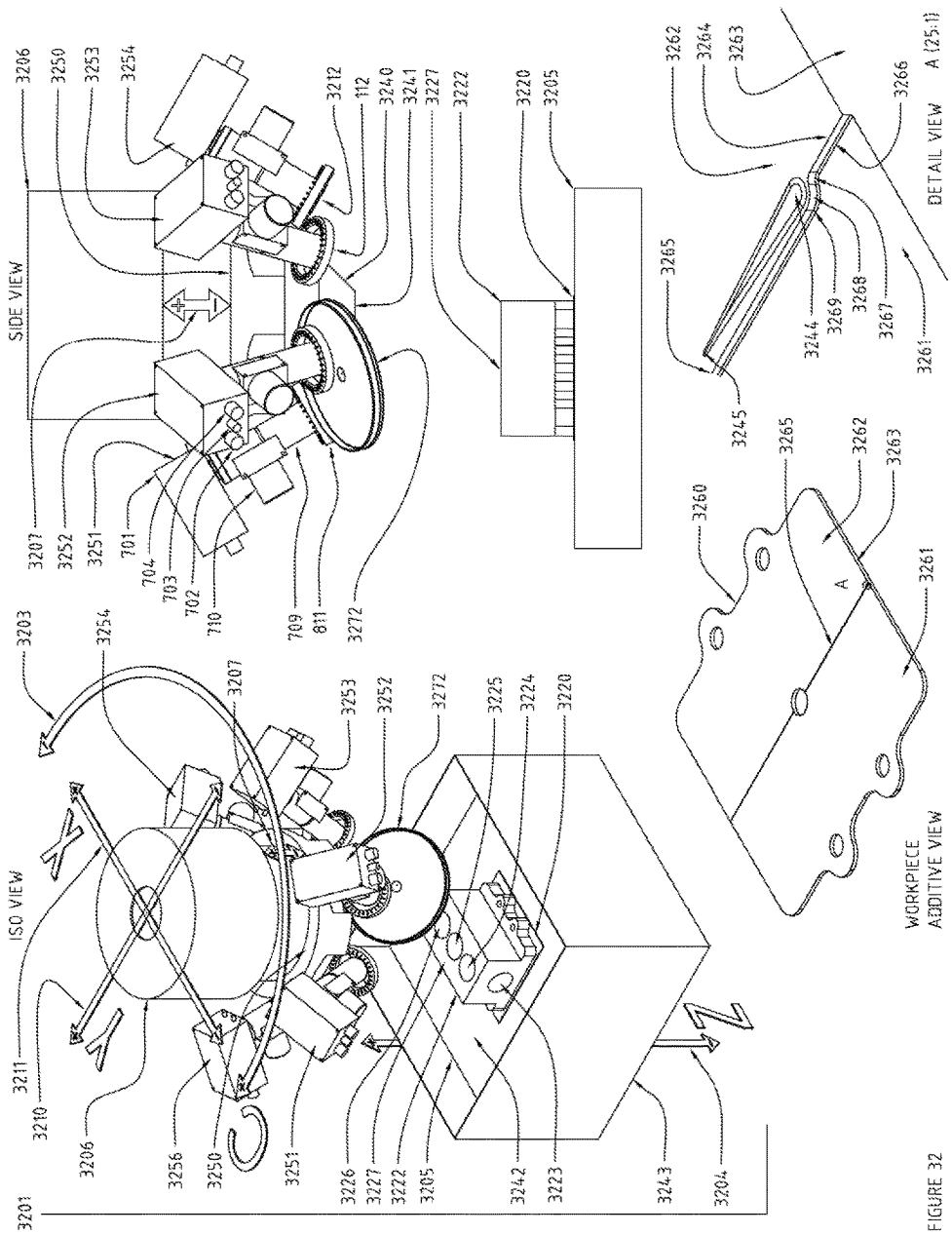
FIG. 32 is a front isometric, side, workpiece additive, and detail views depicting the Multiple Rotatably Controlled Orbital Mounted Angular Off-axis Field of View Vision Camera System.

FIG. 32 (X− Front Isometric, Side, Workpiece Additive, and Detail Views—*not shown) depicts the Multiple Rotatably Controlled Orbital Mounted Angular Off-axis Field of View Vision Camera System utilized on the multiple axes Subtractive or Additive Material Bed Laser Fusion vertical Machine Tool 3201 being linearly positioned by the X axis 3211 and Y 3210) axis having six Angular Off-axis Vision Camera Systems 3251, 3252, 3253, 3254, *3255, and 3256 being located about the rotational C axis bearing way 3250), being optionally installed onto an independent Z axis 3207 for directing the FOV of the six Angular Off-axis Vision Camera Systems **3251, 3252, 3253, 3254, *3255, and 3256 to be focused on the workpieces' details/objects of interest as required, being aligned and secured onto the central housing machine tool's central "spindle" 3206 having the additive fusion energy device 3240) for directing the additive fusion energy beam(s) from the emitter 3241 that can optionally utilize an internal energy directing device/system—not shown to cause its directing the fusion energy in overlapping traversing spiraling circular path(s) onto the workpiece that is directed at the additive material 3242 contained within the additive material enclosure 3243 for the additive layered fusion buildup of the workpiece 3222 beginning on a substrate support structure 3220) on the elevator platen 3205 being vertically positioned by the Z axis 3204 to precisely focus the additive fusion energy onto the additive material 3242 and workpiece's 3260) corresponding layer transition 3265 of the additive bonding for the lower surface 3261 and upper surface 3262 having the six Angular Off-axis Vision Camera Systems 3251, 3252, 3253, 3254, *3255, and 3256 being focused on the geometric characteristics, thermal data, dimensional and thermal transitions of the additive fusion material structures 3261, 3262, 3264, 3266, 3267, 3268, 3269, 3265, and 3263 optionally utilizing a spinning or rotatable transparent disc and or "VisiPort" and or equivalent *3271, 3272, *3273, *3274, *3275, and *3276 to actively or passively protect and or reel to reel transparent film to passively protect the visible imaging optics 112 and or invisible/infrared/near infrared imaging optics 3212 and illumination ring 811 of the subtractive base material or additive fusion energy process for its real-time positional and dimensional analyses, operative thermal verifications, ambient and adjacent workpiece temperature detection and calibration, temperature transition gradient deltas, measurable temperature transition gradient and geometries 3244 and 3245**.

Various examples of the device and systems introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

The stationary field-of-view "horizon" and/or fixed angle alignment perspective(s) of traditional vision camera systems limit the collection of useful image data for analysis of a workpiece. In addition, the traditional image software algorithms used to process the anti-aliased/raw data images taken by vision cameras compromise the finer details of the image in an attempt to clarify the aliased image data noise which causes a loss/modification of the image's data that could otherwise be used for the image's analysis.

The image sensors for vision cameras have their pixels arranged in a generally rectangular array, while the image's raw data that would be captured by the vision camera for inspecting typical workpieces do not always comprise straight edges and or features. Typical machined surfaces often have the, sometimes near microscopic, appearance of elliptical circular paths (e.g., arcs that are in an overlapping traversing spiraling pattern(s) across the surface of the workpiece/object of interest), thereby increasing the difficulties for the image software algorithms to process the anti-aliased images without the loss of the additional useful/critical image data. (Exhibit-1)

Some embodiments, may include a camera housing, such as that described in U.S. patent application Ser. No. 14/875,317, filed Oct. 15, 2015, and entitled SPINDLE MOUNTABLE CAMERA SYSTEM, the disclosure of which is hereby incorporated by reference in its entirety.

It is understood that the CNC's spindle 106 and 3206 or its equivalents can be mounted onto additional rotating/pivoting axes not shown, or a combination thereof, that are operatively connected to the other axes for being the functional equivalent of the combined operational axes for the rotationally mountable off-axis alignment camera systems would be accomplished.

Vision Camera Systems' Operational Background:

The vision image camera is typically used to individually and or sequentially capture the perceptual image(s) of a workpiece/object from (a) a stationary position while being aimed at an workpiece/object that is also stationary, (b) or while being moved relative to workpiece/object in its field-of-view, (c) or having the workpiece/object moving relative to the stationary vision image camera's field-of-view, (d) or having the workpiece/object moving relative to the moving vision image camera's field-of-view, (e) or any sequential combination of those fore mentioned methods.

A vision image camera is typically used to individually and or sequentially capture the perceptual image(s) of a workpiece/object for the conversion of its reflected illumination and "colors"/data via an image sensor on a pixel by pixel basis and its ancillary hardware that is operatively collected and converted into digital data that is analyzed and corrected via common initial image analysis software algorithms for its subsequent, analysis and/or transfer, viewing and/or analysis via application specific imaging analysis/processing software algorithms.

Having the overall objective accuracy of the image's end product data analysis/processing being dependent upon the captured data of the vision image camera's initial perceptual image(s) of the workpiece/object.

Constraints of the Non-Dynamic Vision Camera Systems:

Having the vision camera's image sensor being in a fixed and or aligned field-of-view to capture the perceptual image(s) of a workpiece/object limits the amount of the images' data for processing that has to be done by the initial image analysis software algorithms, it also limits the images' data that would be collected that could be beneficial for its subsequent viewing and/or analysis via application specific and/or common imaging analysis/processing software algorithms.

Dynamic Rotational/Orbital/Rotational Orbiting Off-Axis Vision Camera Systems:

Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131 and the Rotatably Mounted Angular Off-axis Controlled Vision Camera System *609 and the Controlled Rotating Field of View Synchronous Orbital Off-Axis Alignment Camera Device (*—not shown).

There are multiple methods to individually and or sequentially collect the rotatable spindle mounted vision camera's perceptual image(s) of a workpiece/object and utilize the images data for its viewing and/or analysis. As an example being as an individual means and or using a combination of (a) via mechanically utilizing the rotatable spindle mounted vision camera's 1,800 RPM rotation speed being synchronized with the vision camera images' 30 frames per second capture rate to facilitate the viewing and/or analysis via the imaging analysis/processing software algorithm's rotating each of the sequential 1,800 captured frames per minute an additional incremental multiple of 12 degrees for having their common alignment, (b) via the common image analysis software algorithms that are used to rotationally and/or positionally aligned align the image's data for captured data of a referenced workpiece/object with that of the vision image camera's actual perceptual image(s) of a workpiece/object, that is rotationally and/or positionally misaligned with the image sensor, that is typically used for sorting/detecting the orientation and position of the individual multiple workpieces/objects being at random orientations and/or positions on a moving conveyor, or (c) via the currently available additional meta/binary data being the sequential unique identification data/timecode for each captured image frame as commonly used by the Society of Motion Picture and Television Engineers in the SMPTE specification to provide an image frame's time reference for editing, synchronization and identification comprising binary coded decimal hour:minute:second:frame identification and 32 bits for use by users.

The off-axis angular alignment, i.e. not having the vision camera's viewing axis being perpendicular to the surface of the workpiece/object, of the vision camera's image sensor facilitates the capturing of additional reflected illumination and "colors"/data via vision camera's perceptual image(s) of a workpiece/object that would otherwise not be detectable, with having the off-axis alignment of the adjacent workpiece/object illumination improving image sensors data collection for features/details of the workpiece/object via the additional reflected illumination and "colors"/data, while having the captured image's off-axis perceptual/perspective misalignment being geometrically and dimensionally corrected via the currently available image analysis software algorithms.

The off-axis alignment of the vision camera's image sensor utilizing the typical, fixed or variable focal length, tele-centric lens would facilitate having accurate in-focus images at a range of depths for features/details of the workpiece/object to facilitate the accurate in-focus planar, and or relatively perpendicular side wall, surface image capturing for the vision image camera being at an off-axis alignment to its perceptual perspective surface image(s) without reliance on the fore mentioned off-axis misalignment corrective image analysis software algorithm to correct the images' perceptual distortion.

With reference to the following Figures for the representative embodiment is as disclosed. The Rotatably mountable camera system is connectable to a subtractive manufacturing CNC machine 101 for work piece 202 or an additive manufacturing CNC machine 3201 for the real-time and point-of-use closed loop manufacturing process via the perceptual data monitoring and its corresponding automated manufacturing process control for the prevention and/or correction of manufacturing defects/irregularities such as voids, gaps, inclusions, hard spots, workpiece structural defects, contamination, "discoloration", etc., in addition to the finished work piece's inspection, metrology inspections, identification, traceability, and evidence of defect causation/responsibility. The Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131 and or the Rotatably Mounted Angular Off-axis Controlled Vision Camera System *609 and or the Controlled Rotating Field of View Synchronous Orbital Off-Axis Alignment Camera Device (*—not shown) includes a mounting stem 108 connectable to the spindle 106 and 3206 of a CNC machine 101 and 3201. When the camera system is mounted to the spindle of the CNC machine, the CNC machine 101 can move the Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131 and or the Rotatably Mounted Angular Off-axis Controlled Vision Camera System *609 and or the Controlled Rotating Field of View Synchronous Orbital Off-Axis Alignment Camera Device (*—not shown) as required to inspect work piece(s) 202 and the Optical Positional/Angular Alignment Datum's 113 and or 123 mounted therein.

With reference to the additive manufacturing processes' fusion means being either welding, directed energy, "3-D printing", etc. the rotation alignment of the work piece's imaging device being either the full or partial rotation of its axis and or axes to provide a more complete viewing perspective of the workpiece/object of interest for the FOV's imaging and its alignment oriented tracking of the alternating additive material fusion paths. Optionally utilizing optical and/or infrared lens filters and or optical and infrared FOV mask for shielding/masking/blocking the fusion means energy saturation of the workpiece's reflectivity to the imaging device to improve the collection of the work piece's imaging data.

Utilizing serially and or in parallel an optional internal onboard image data processing and or a combination of local, remote, and/or global analysis software and data resources via wireless and or wired communications for programming, statistical analysis, command and control means/functions as required via having multiple input modalities and multiple output modalities.

For FIGS. 1-5 the Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131 (*—not shown):

FIG. 1 (X– Front Isometric View) depicts the multiple axes Horizontal Machine Tool 101 with the Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131 that is installed in the spindle tool holder 108 being secured in the machine tool's rotational spindle 107 that is an its 0° position being in the spindle nose 106. Having the Controlled Non-Rotating Field of View Synchronous Orbital Off-Axis Alignment Camera Device 131 being rotationally fixed by the anti-rotation anchor block 130) being linearly positioned by the X axis 111 and Y 110) axis for the vision camera to view Optical Positional/Angular Alignment Datum 116 that is part of the Optical Positional/Angular Alignment Datum module 113 mounted onto the workpiece pallet 105 being mounted to the rotational B axis 102 that is at its 0° position being linearly positioned by the Z axis 104, having the work piece 202 being mounted to a workpiece holder 201 that are positionally aligned by the edge datum locators 117 and 127. To facilitate the visual camera's positional analyses, verification, calibration, and off-axis work piece inspection. For the Controlled Orbital Mounted Angular Off-axis Vision Camera System 109 and 131 to inspect the workpiece's 202 through hole 203 and its 3 perpendicularly intersecting holes 204, 205, and 206 details/features.

FIG. 2 (X+ Front Isometric View) depicts the advanced multi-functionality Spindle Work Piece Metrology/Vision Camera System 109, having the internal components being shown via the housings cutaway, with the pneumatically actuated protective lens cover being in the open position for the vision camera's optical element 112 to collect the perceived workpiece image for the Work Piece Metrology/Vision Camera System 109 that are common to the Rotatably Mounted Angular Off-axis Controlled Vision Camera System 609 that may not be shown.

FIG. 3 (X+ Front Isometric View) depicts the internal modules and devices for the advanced multi-functionality Spindle Work Piece Metrology/Vision Camera System 109, having the internal components being shown, for the vision camera's optical element 112 to collect the perceived workpiece image for the Work Piece Metrology/Vision Camera System 109 that are common to the Rotatably Mounted Angular Off-axis Controlled Vision Camera System 609 that may not be shown.

FIG. 4 (Front, Side cross-section, and X− Front Isometric Views) depicts the major external components and internal passages of the Controlled Non-Rotating Field of View Synchronous Orbital Off-Axis Alignment Camera Device 131, having an internal air passage for air to enter the orbital drive tool's mounting post 401 via its Inlet passage/opening 410) that transmits compressed air from the spindle into the Work Piece Metrology/Vision Camera System's 109 mounting stem 408 via its outlet passages/openings 411, having the anti-rotation anchor post 402 being attached to the stationary arm 403 of the Controlled Non-Rotating Field of View Synchronous Orbital Off-Axis Alignment Camera Device 131 having the orbital drive tool's mounting post 401 being secured to the timing belt drive housing 405 by its corresponding anchor pin 420) and the angled off-axis output housing 406 by its corresponding anchor pin 421 utilizing the appropriate debris/pneumatic shaft seals 506x2 and 518 as required to prevent contamination while containing the compressed air within the device.

FIG. 5 (Exploded, Drive and Driven components X− Front Isometric Views) depicts the exploded assembly of Controlled Non-Rotating Field of View Synchronous Orbital Off-Axis Alignment Camera Device 131, having the orbital drive tool's mounting post 401 being coupled to the angled off-axis output housing 406 and having the stationary arm 403 being coupled to the stationary timing belt pulley 510), having an engagement detail 526 being connected by its corresponding anchor pin 409 and having its timing drive belt 512 being coupled to the driven timing belt pulley 511 that is coupled to the 1st member of the universal joint 517 that is coupled to its cross roller universal joint 519 that is coupled to the 2nd member of the universal joint being the mounting stem 408 mounted in the angled off-axis output housing 406 causing the mounting stem 408 to maintain its relative rotational alignment with the stationary arm 403 as the orbital drive tool's mounting post 401 is being rotated by the spindle causing the coupled angled off-axis output housing 406 to rotate with it, effectively causing the mounting stem 408 to rotate/orbit about the orbital drive tool's mounting post 401 with the angled off-axis output housing 406 being at an off-axis angle to the orbital drive tool's mounting post 401. Having the Controlled Non-Rotating Field of View Synchronous Orbital Off-Axis Alignment Camera Device 131 utilizing the appropriate rotational/thrust shaft bearings 507x2, 508, 514, and 516 as required to being rotatable by the spindle when it is pneumatically activated its use causing the rotational positional locking pin 502 to be unlocked/retracted from its corresponding position home position/S=0° alignment detent 501 of the orbital drive tool's mounting post 401, for its being subsequently rotatable by the spindle, via the internal air passage for the orbital drive tool's mounting post 401 exiting the alignment detent 501 traveling toward the single acting piston 503 compressing the alignment detent engagement spring 504.

With reference to FIGS. 4 and 5, an embodiment of an orbiting camera mount 131 can include an anti-rotation arm 403 configured for connection, at a first end portion, to a spindle nose 106 of a machine tool 101 (FIG. 1). A stationary pulley 510, having a pulley bore, is fixed to a second end portion of the anti-rotation arm 403. The mount 131 also includes a mounting post 401 configured for connection to a spindle 107 of the machine tool 101 (FIG. 1) and includes a drive shaft portion 523 extending through the pulley bore and rotatable therein. A drive housing 404-407 is fixed to the drive shaft portion 523 for rotation therewith and an output shaft 513 is supported in the drive housing 404-407. A driven pulley 511 is fixed to the output shaft 513 and a drive belt 512 extends between the stationary pulley 510 and the driven pulley 511, whereby rotation of the mounting post 401 causes the output shaft 513 to orbit around and rotate counter to the drive shaft portion 523. A camera mounting stem 408 is coupled to the output shaft 513 for rotation therewith. Accordingly, a camera system 109 mounted to the camera mounting stem 408 orbits around the drive shaft portion 523 while remaining in a horizontal (i.e., level) orientation, see for example FIGS. 14-17.

In some embodiments, the drive shaft portion 523 and the output shaft 513 can be oriented approximately parallel with respect to each other. In some embodiments, the camera mounting stem 408 can be oriented at a non-zero angle with respect to the drive shaft portion 523. For example, in some embodiments, the camera mounting stem 408 can be oriented at a 1 degree angle with respect to the drive shaft portion 523, as shown in FIG. 4. Of course, the mount can be configured to position the orientation of the camera mounting stem 408 at other angles. In some embodiments, the drive belt 512 can comprise a timing belt and the stationary and driven pulleys 510/511 can be timing pulleys. In some embodiments, the mount 131 can include a universal joint 519 coupling the camera mounting stem 408 to the output shaft 513. In some embodiments, the drive housing 404-407 can include first and second body portions 405 and 406, respectively. In some embodiments, the first body portion 405 can include a pair of parallel bores configured to receive the drive shaft portion 523 and the output shaft 513. In some embodiments, the second body portion 406 can include a stem bore configured to receive the camera mounting stem 408. In some embodiments, the stem bore is oriented at a non-zero angle with respect to the pair of parallel bores, whereby the camera mounting stem 408 is positioned at a non-zero angle with respect to the mounting post 401. In some embodiments, the stationary pulley 510 and the driven pulley 511 can have a one-to-one drive ratio whereby the camera mounting stem 408 rotates counter to the drive shaft portion 523.

In some embodiments, the mounting post 401 includes an axial pneumatic supply passage 410 and the camera mounting stem 408 includes one or more outlet passages 411 in fluid communication with the supply passage 410. In some embodiments, the drive housing 404-407 is pneumatically sealed and wherein the one or more outlet passages 411 and the supply passage 410 are connected via the drive housing 404-407.

In some embodiments, the camera mounting stem 408 can be directly coupled to the drive shaft portion 523 by a synchronous drive, such as timing pulleys 510/511 and timing belt 512. In other words, the universal joint 519 and output shaft 513 can be omitted and the stem 408 can be extended to couple directly to the driven pulley 511. The camera mounting stem 408 can be angled at a non-zero angle with respect to the mounting post 401 within the misalignment tolerances of the synchronous drive (e.g., pulleys 510/511 and belt 512).

Having the operational orbital drivetrain for the Controlled Non-Rotating Field of View Synchronous Orbital Off-Axis Alignment Camera Device 131 comprising the orbital drive tool's mounting post 401 passing through the stationary timing belt pulley 510), being rotationally coupled to the machine tool spindle, having an engagement detail 521 being connected by its corresponding anchor pin 421 of the rotating the angled off-axis output housing 406 containing the 2nd member of the universal joint being the vision camera's—not shown mounting stem 408 being connected to the driven timing belt pulley 511 having its timing drive belt 512 being coupled to the stationary timing belt pulley 510) that is connected by its corresponding anchor pin 409 to the stationary arm 403 that is anchored via the stationary anchor post 402.

Optionally having the operational orbital drivetrain for the Controlled Non-Rotating Field of View Synchronous Orbital Off-Axis Alignment Camera Device 131 being configured for a Controlled Rotating Field of View Synchronous Orbital Off-Axis Alignment Camera Device—not shown via the use of a stationary gear drive and corresponding driven gear drive train, with an optional reversing direction idler gear—not shown, whereas an even number of gears in the drive trail will cause the rotation of the mounting stem 408 to be in the in the same rotational direction as the orbital drive tool's mounting post 401 and an odd number of gears in the drive trail will cause the rotation of the mounting stem 408 to be in the in the opposite rotational direction as the orbital drive tool's mounting post 401, in place of the stationary timing belt pulley 510), timing drive belt 512, and driven timing belt pulley 511 causing the rotation of the mounting stem 408 while it is being driven to rotate/orbit about the orbital drive tool's mounting post 401 with the angled off-axis output housing 406 being at an off-axis angle to the orbital drive tool's mounting post 401. To have the Controlled Rotating Field of View Synchronous Orbital Off-Axis Alignment Camera Device—not shown, to be capable of capturing the same rotating FOV images/data as the Controlled Orbital Mounted Angular Off-axis Vision Camera System comprising the Work Piece Metrology/Vision Camera System *109, installed in the Controlled Non-Rotating Field of View Synchronous Orbital Off-Axis Alignment Camera Device *131.

Optionally having the operational orbiting rotations via a dedicated axis drive system comprising an auxiliary axis drive motor—not shown for rotating the vision camera's mounting stem 408 to have the Controlled Rotating Field of View Synchronous Orbital Off-Axis Alignment Camera Device—not shown, to be capable of optionally capturing the same rotating FOV images/data as the Rotatably Mounted Angular Off-axis Controlled Vision Camera System 609.

For FIGS. 6-8 the Rotatably Mounted Angular Off-axis Controlled Vision Camera System 609 (*—not shown):

FIG. 6 (X– Front Isometric View) depicts the multiple axes Horizontal Machine Tool 101 with the Rotatably Mounted Angular Off-axis Controlled Vision Camera System 609, being contained within its enclosure/housing 610) and having an operable enclosure lens cover—not show, that is installed in the spindle tool holder 108 being secured in the machine tool's rotational spindle 107 that is an its 0° position being in the spindle nose 106 being linearly positioned by the X axis 111 and Y 110) axis for the vision camera to view Optical Positional/Angular Alignment Datum 116 that is part of the Optical Positional/Angular Alignment Datum module 113 mounted onto the workpiece pallet 105 being mounted to the rotational B axis 102 that is at its 0° position being linearly positioned by the Z axis 104, having the work piece 202 being mounted to a workpiece holder 201 that are positionally aligned by the edge datum locators 117 and 127. To facilitate the camera's visual positional analyses, verification, calibration, and off-axis work piece inspection. For the Rotatably Mounted Angular Off-axis Controlled Vision Camera System 609 of the workpiece's 202 through hole 203 and its 3 perpendicularly intersecting holes 204, 205, and 206 details/features.

FIG. 7 are the four isometric views that depicts the internal elements and components contained within the enclosure/housing *610) of the Rotatably Mounted Angular Off-axis Controlled Vision Camera System 609, to control and communicate with the re-positional vision camera 701, its corresponding vision camera optics 112, coaxial illumination 710), variable focal distance zoom optical lens 709, linear positioning of the illumination ring 811, and other elements and devices as required, having the stationary guide 708 being attached to the enclosure/housing 610) with the corresponding left pivot actuator 712 and right pivot actuator 714 being attached to the enclosure/housing 610) for the re-positional vision camera 701 to be pivotally mounted in its respective Yaw and Pitch axes within the enclosure/housing 610), having the corresponding rotary actuator 716 for operating the variable focal distance zoom optical lens 709 and corresponding rotary actuator 718 for operating the shadow guide tube 711 and its adjacent illumination ring while being fixed to the re-positional vision camera 701.

FIG. 8 are the six orthogonal views that depicts the internal elements and components for the Rotatably Mounted Angular Off-axis Controlled Vision Camera System 609), being contained within its enclosure/housing *610), to control and communicate with the vision camera 701, its vision camera optics 112, coaxial illumination 710), variable focal distance zoom optical lens 709, having the linear re-positional illumination ring 811 being shown in its retracted 801 and extended 802 positions, and other elements and devices as required.

For FIG. 9 the Controlled Orbital Mounted Angular Off-axis Vision Camera System comprising the Work Piece Metrology/Vision Camera System *109 installed in the Controlled Non-Rotating Field of View Synchronous Orbital Off-Axis Alignment Camera Device *131 and or the Rotatably Mounted Angular Off-axis Controlled Vision Camera System *609 and or the Controlled Rotating Field of View Synchronous Orbital Off-Axis Alignment Camera Device—not shown (*—not shown):

FIG. 9 shows details for the Optical Positional/Angular Alignment Datum's 113 and or 123 with each having an lower height outer datum sphere 114 or 124 and a pair of higher height inner datum spheres 115 and 116 or 125 and 126 being located at a specific distance from the outer lower height datum sphere 114 or 124 and that right angles to each other while being aligned parallel and perpendicular to the workpiece positioning system *101 and *3201 via the alignment edge detail 709 of the Optical Positional/Angular Alignment Datum's 113 and or 123.

For FIGS. 10-17 the Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131 (*—not shown):

FIG. 10 shows the front, orthogonal, and camera views of the vision camera optics 112 for the spindle mountable camera *109 rotated to its S=0° being positioned to view the Optical Positional/Angular Alignment Datum's 113 having the work piece pallet 105 rotated to its B=270° having the pitch misaligned and yaw angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its pitch axis angled +1°, or and a combination of, the plane of the workpiece pallet 105 being angled −1°.

FIG. 11 shows the front, orthogonal, and camera views of the vision camera optics 112 for the spindle mountable camera *109 rotated to its S=90° being positioned to view the Optical Positional/Angular Alignment Datum's 113 having the work piece pallet 105 rotated to its B=270° having the yaw misaligned and pitch angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its yaw axis angled +1°, or and a combination of, the rotational B axis *102 of the workpiece pallet 105 being angled −1°.

FIG. 12 shows the front, orthogonal, and camera views of the vision camera optics 112 for the spindle mountable camera *109 rotated to its S=180° being positioned to view the Optical Positional/Angular Alignment Datum's 113 having the work piece pallet 105 rotated to its B=270° having the pitch misaligned and yaw angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its pitch axis angled −1°, or and a combination of, the plane of the workpiece pallet 105 being angled +1°.

FIG. 13 shows the front, orthogonal, and camera views of the vision camera optics 112 for the spindle mountable camera *109 rotated to its S=270° being positioned to view the Optical Positional/Angular Alignment Datum's 113 having the work piece pallet 105 rotated to its B=270° having the yaw misaligned and pitch angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its yaw axis angled −1°, or and a combination of, the rotational B axis *102 of the workpiece pallet 105 being angled +1°.

FIG. 14 shows the isometric, front, and camera views of the vision camera optics 112 for the spindle mountable camera 109 rotated to its S=0° being positioned to view the corresponding higher alignment datum 115 of the Optical Positional/Angular Alignment Datum's 113 having the work piece pallet 105 rotated to its B=270° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera 109 as shown in FIGS. 15, 16, and 17.

FIG. 15 shows the isometric, front, and camera views of the vision camera optics 112 for the spindle mountable camera 109 rotated to its S=90° being positioned to view the corresponding higher alignment datum 115 of the Optical Positional/Angular Alignment Datum's 113 having the work piece pallet 105 rotated to its B=270° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera 109 as shown in FIGS. 14, 16, and 17.

FIG. 16 shows the isometric, front, and camera views of the vision camera optics 112 for the spindle mountable camera 109 rotated to its S=180° being positioned to view the corresponding higher alignment datum 115 of the Optical Positional/Angular Alignment Datum's 113 having the work piece pallet 105 rotated to its B=270° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera 109 as shown in FIGS. 14, 15, and 17.

FIG. 17 shows the isometric, front, and camera views of the vision camera optics 112 for the spindle mountable camera 109 rotated to its S=270° being positioned to view the corresponding higher alignment datum 115 of the Optical Positional/Angular Alignment Datum's 113 having the work piece pallet 105 rotated to its B=270° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera 109 as shown in FIGS. 14, 15, and 16.

For FIGS. 18-29 the Rotatably Mounted Angular Off-axis Controlled Vision Camera System 609 (*—not shown):

FIG. 18 shows the front, orthogonal, and camera views of the vision camera optics 112 for the spindle mountable camera *609 rotated to its S=0° being positioned to view the Optical Positional/Angular Alignment Datum's 113 having the work piece pallet 105 rotated to its B=270° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105.

FIG. 19 shows the front, orthogonal, and camera views of the vision camera optics 112 for the spindle mountable camera *609 rotated to its S=0° being positioned to view the Optical Positional/Angular Alignment Datum's 113 having the work piece pallet 105 rotated to its B=270° having the pitch misaligned and yaw angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its pitch axis angled +1°, or and a combination of, the plane of the workpiece pallet 105 being angled −1°.

FIG. 20 shows the front, orthogonal, and camera views of the vision camera optics 112 for the spindle mountable camera *609 rotated to its S=0° being positioned to view the Optical Positional/Angular Alignment Datum's 113 having the work piece pallet 105 rotated to its B=270° having the pitch misaligned and yaw angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its pitch axis angled −1°, or and a combination of, the plane of the workpiece pallet 105 being angled +1°.

FIG. 21 shows the front, orthogonal, and camera views of the vision camera optics 112 for the spindle mountable camera *609 rotated to its S=90° being positioned to view the Optical Positional/Angular Alignment Datum's 113 having the work piece pallet 105 rotated to its B=270° having the rotated camera's pitch misaligned and yaw angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its pitch axis angled +1°, or and a combination of the rotational B axis *102 of the workpiece pallet 105 being angled −1°.

FIG. 22 shows the front, orthogonal, and camera views of the vision camera optics 112 for the spindle mountable camera *609 rotated to its S=270° being positioned to view the Optical Positional/Angular Alignment Datum's 113 having the work piece pallet 105 rotated to its B=270° having the rotated camera's pitch misaligned and yaw angular alignment for the vision camera optics 112 being generally aligned with the coordinate system of the CNC machine 101 for having the various alignments, misalignments, and offsets for the Optical Positional/Angular Alignment Datum's 113, the workpiece 202, workpiece positioner 201, and its workpiece pallet 105, via either the vision camera optics 112 having its pitch axis angled +1°, or and a combination of the rotational B axis *102 of the workpiece pallet 105 being angled +1°.

FIG. 23 shows the front, orthogonal, and camera views of the vision camera optics 112 for the spindle mountable camera *609 rotated to its S=0° being positioned to view the Optical Positional/Angular Alignment Datum's 123 having the work piece pallet 105 rotated to its B=0° having the pitch and yaw angular alignment for the vision camera optics 112 being identically aligned with the coordinate system of the CNC machine 101 for having the various alignments and offsets for the Optical Positional/Angular Alignment Datum's 123, the workpiece 202, workpiece positioner 201, and its workpiece pallet 105.

FIG. 24 shows the front, orthogonal, and camera views of the vision camera optics 112 for the spindle mountable camera *609 rotated to its S=0° being positioned to view the Optical Positional/Angular Alignment Datum's 123 having the work piece pallet 105 rotated to its B=0° having the pitch misaligned and yaw angular alignment for the vision camera optics 112 being generally aligned with the coordinate system of the CNC machine 101 for having the various alignments, misalignments, and offsets for the Optical Positional/Angular Alignment Datum's 123, the workpiece 202, workpiece positioner 201, and its workpiece pallet 105, via either the vision camera optics 112 having its pitch axis angled +1°, or and a combination of, the plane of the workpiece pallet 105 being angled −1°.

FIG. 25 shows the front, orthogonal, and camera views of the vision camera optics 112 for the spindle mountable camera *609 rotated to its S=0° being positioned to view the Optical Positional/Angular Alignment Datum's 123 having the work piece pallet 105 rotated to its B=0° having the pitch misaligned and yaw angular alignment for the vision camera optics 112 being generally aligned with the coordinate system of the CNC machine 101 for having the various alignments, misalignments, and offsets for the Optical Positional/Angular Alignment Datum's 123, the workpiece 202, workpiece positioner 201, and its workpiece pallet 105, via either the vision camera optics 112 having its pitch axis angled −1°, or and a combination of, the plane of the workpiece pallet 105 being angled +1°.

FIG. 26 shows the isometric, front, and camera views of the vision camera optics 112 for the spindle mountable camera 609 rotated to its S=0° being positioned to view the corresponding higher alignment datum 115 of the Optical Positional/Angular Alignment Datum's 113 having the work piece pallet 105 rotated to its B=270° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera *109 as shown in FIGS. 27, 28, and 29.

FIG. 27 shows the isometric, front, and camera views of the vision camera optics 112 for the spindle mountable camera 609 rotated to its S=90° being positioned to view the corresponding higher alignment datum 115 of the Optical Positional/Angular Alignment Datum's 113 having the work piece pallet 105 rotated to its B=90° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera *109 as shown in FIGS. 26, 28, and 29.

FIG. 28 shows the isometric, front, and camera views of the vision camera optics 112 for the spindle mountable camera 609 rotated to its S=180° being positioned to view the corresponding higher alignment datum 115 of the Optical Positional/Angular Alignment Datum's 113 having the work piece pallet 105 rotated to its B=180° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera *109 as shown in FIGS. 26, 27, and 29.

FIG. 29 shows the isometric, front, and camera views of the vision camera optics 112 for the spindle mountable camera 609 rotated to its S=270° being positioned to view the corresponding higher alignment datum 115 of the Optical Positional/Angular Alignment Datum's 113 having the work piece pallet 105 rotated to its B=270° having the pitch and yaw angular alignment for the vision camera optics 112 being identically aligned with the coordinate system of the CNC machine 101 for having the various alignments and offsets for the Optical Positional/Angular Alignment Datum's 113, the workpiece 202, workpiece positioner 201, and its workpiece pallet 105 to subsequently verify the axial alignment, or its controlled angular offset, of the vision camera optics 112 for the spindle mountable camera *109 as shown in FIGS. 26, 27, and 28.

For FIGS. 30-31 the Controlled Orbital Mounted Angular Off-axis Vision Camera System comprising the Work Piece Metrology/Vision Camera System 109 installed in the Controlled Non-Rotating Field of View Synchronous Orbital Off-Axis Alignment Camera Device 131, or the Rotatably Mounted Angular Off-axis Controlled Vision Camera System *609, or Controlled Rotating Field of View Synchronous Orbital Off-Axis Alignment Camera Device—not shown (*—not show):

FIG. 30 shows the corresponding comparative acceptable work piece 202 inspection result via the image's data analysis of the *rotational camera system's views for the vision camera optics 112 Pitch=+1° off-axis alignment to the *rotational camera system as viewing the inside diameter surfaces of a subtractive round through hole detail 203 for the rotational camera system's* being oriented at the S=0° to view the bore's 3001 upper wall features, S=90° to view the bore's 3002 right side wall features, S=180° to view the bore's 3003 lower wall features, and S=270° to view the bore's 3004 left side wall features that would replicate the rotational camera system's* off-axis alignment for viewing the external surface of the workpiece 202 utilizing the typical, fixed or variable focal length, tele-centric lens to facilitate having an accurate in-focus image at a range of depths for the intersecting perpendicular holes 204, 205, and 206 features/details of the workpiece 202 to facilitate an in-focus accuracy while being relatively perpendicular side wall, surface image capturing for the vision image camera 109 or 131 or *609 or the Controlled Rotating Field of View Synchronous Orbital Off-Axis Alignment Camera Device—not shown being at an off-axis alignment to the workpiece's 202 perceptual/perspective surface image(s) as described above.

FIG. 31 shows the corresponding comparative un-acceptable work piece 202 inspection result versus the work piece 202 of FIG. 30 via the image's data analysis of the rotational camera system's* views for the vision camera optics 112 Pitch=+1° off-axis alignment to the rotational camera system* as viewing the inside diameter surfaces of a subtractive round through hole detail 203 for the *rotational camera system's being oriented at the S=0° to view the bore's 3001 upper wall features, S=90° to view the bore's 3002 right side wall features, S=180° to view the bore's 3003 lower wall features, and S=270° to view the bore's 3004 left side wall features that would replicate the *rotational camera system's off-axis alignment for viewing the external surface of the workpiece 202 utilizing the typical, fixed or variable focal length, tele-centric lens to facilitate having an accurate in-focus image at a range of depths for the intersecting perpendicular holes 204, 205, and 206 features/details of the workpiece 202 to facilitate an in-focus accuracy while being relatively perpendicular side wall, surface image capturing for the vision image camera 109 or 131 or *609 or the Controlled Rotating Field of View Synchronous Orbital Off-Axis Alignment Camera Device—not shown being at an off-axis alignment to the workpiece's 202 perceptual/perspective surface image(s) as described above, as both the near and far intersecting perpendicular holes are missing 204 and 206, having only the one middle intersecting perpendicular hole 205.

For FIG. 32 the Additive or Subtractive Manufacturing Process utilizing the Multiple Rotatably Controlled Orbital Mounted Angular Off-axis Field of View Vision Camera System comprising six Angular Off-axis Vision Camera Systems 3251, 3252, 3253, 3254, *3255, and 3256 utilizing the Off-Axis Alignment Camera Device *131 and or Angular Off-axis Controlled Vision Camera System *609 and or the Controlled Rotating Field of View Synchronous Orbital Off-Axis Alignment Camera Device being mounted onto corresponding individual auxiliary rotational spindles—not show utilizing Visible imaging optics 112 and or Thermal imaging optics 3212 as required. (*—not show):

FIG. 32 shows the isometric, side, workpiece additive, and detail views of the Multiple Rotatably Controlled Orbital Mounted Angular Off-axis Field of View Vision Camera System utilized on the multiple axes subtractive base material or additive fusion energy process vertical Machine Tool 3201 for the rotational alignment of the six Angular Off-axis Vision Camera Systems 3251, 3252, 3253, 3254, *3255, and 3256 being focused on the geometric characteristics, thermal data analysis, dimensional and thermal transitions of the additive material structures 3261, 3262, 3264, 3266, 3267, 3268, 3269, 3265, and 3263 of the additive manufacturing process, or the corresponding subtractive material structures—not show, while being capable of being rotationally aligned via the rotational C axis bearing way 3250) as required to actively track the overlapping traversing spiraling pattern(s) of the additive or subtractive manufacturing process's workpiece additive or subtractive paths for its real-time positional analyses, operative thermal verifications, ambient and adjacent workpiece temperature detection and calibration, measurable temperature transition gradient and geometries 3244 and 3245 utilizing the Off-Axis Alignment Camera Device *131 or Angular Off-axis Controlled Vision Camera System *609 or Controlled Rotating Field of View Synchronous Orbital Off-Axis Alignment Camera Device—not show to provide real-time operational data to the closed-loop process control system—not show being synchronized/correlated to the ancillary variable data—not show for operational performance of the fusion process, fusion energy output-focus-scattering-reflectivity, axis positioning accuracy-error, ambient conditions-deviations, environmental environment-deviations, seismic state-activity, additive material void-gap detection, fusion re-melt-repair-defect utilizing adaptive control-correction-verification-resumption, statistical process control data trending, etc. with operational and workpiece data archiving for statistical analysis, performance verification, traceability, etc., utilizing visible imaging optics 112 and or invisible/infrared/near infrared imaging optics 3212 and or selective vision image lens mask—not show with or without the image capturing being synchronized with the selective fusion energy strobe/pulse and or disbursement/coolant output—not show and or intermittent or continuous Thermal imaging optics 3212 optionally utilizing, individually or a combination of, a spinning or rotatable transparent disc and or VisiPort® and or equivalent *3271, 3272, *3273, *3274, *3275, and *3276 to actively or passively protect and or reel to reel transparent protecting film to passively protect the visible imaging optics 112 and or invisible/infrared/near infrared imaging optics 3212 and illumination ring 811 as required.

Having the six Angular Off-axis Vision Camera Systems 3251, 3252, 3253, 3254, *3255, and 3256 being configured and housed in the *camera housing enclosures utilizing the corresponding internal components having the functionality as required for being configured as either the Controlled Orbital Mounted Angular Off-axis Vision Camera System comprising the Work Piece Metrology/Vision Camera System *109, or the Rotatably Mounted Angular Off-axis Controlled Vision Camera System *609, or the Controlled Rotating Field of View Synchronous Orbital Off-Axis Alignment Camera Device being mounted onto corresponding individual auxiliary rotational spindles—not show as described and referenced in the detailed description for FIG. 5—not shown, as required.

In some embodiments, the rotational or orbital or rotational orbiting Off-axis camera for image capturing being applicable to other metrology and vision camera imaging processes, for improving the images data collection and the corresponding analytical ability of the vision image analysis software algorithms.

In some embodiments, the rotational or orbital or rotational orbiting Off-axis camera for image capturing having the camera's line of sight at an off axis angle to the rotational axis to facilitate enhanced 2-D imaging from the single vision camera, for improving the images data collection and the corresponding analytical ability of the vision image analysis software algorithms.

In some embodiments, the rotational or orbital or rotational orbiting Off-axis camera for image capturing having the camera's line of sight at an off axis angle to the rotational axis to facilitate 3-D imaging from the single vision camera, for improving the images data collection and the corresponding analytical ability of the vision image analysis software algorithms.

In some embodiments, the rotational or orbital or rotational orbiting Off-axis camera(s) for image capturing having the multiple cameras' lines of sight at an off axis angle to the rotational axis to facilitate 3-D imaging from multiple vision cameras, for improving the images data collection and the corresponding analytical ability of the vision image analysis software algorithms.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

I claim:

1. An orbiting camera mount, comprising:
   an anti-rotation arm configured for connection, at a first end portion, to a spindle nose of a machine tool;
   a stationary pulley, having a pulley bore, fixed to a second end portion of the anti-rotation arm;
   a mounting post configured for connection to a spindle of the machine tool and including a drive shaft portion extending through the pulley bore and rotatable therein;
   a drive housing fixed to the drive shaft portion for rotation therewith;
   an output shaft supported in the drive housing;
   a driven pulley fixed to the output shaft;
   a drive belt extending between the stationary pulley and the driven pulley, whereby rotation of the mounting post causes the output shaft to orbit around the drive shaft portion; and
   a camera mounting stem coupled to the output shaft for rotation therewith.

2. The camera mount of claim 1, wherein the drive shaft portion and the output shaft are oriented approximately parallel with respect to each other.

3. The camera mount of claim 1, wherein the camera mounting stem is oriented at a non-zero angle with respect to the drive shaft portion.

4. The camera mount of claim 1, wherein the drive belt comprises a timing belt.

5. The camera mount of claim 1, further comprising a universal joint coupling the camera mounting stem to the output shaft.

6. The camera mount of claim 1, wherein the drive housing comprises first and second body portions.

7. The camera mount of claim 6, wherein the first body portion includes a pair of parallel bores configured to receive the drive shaft portion and the output shaft.

8. The camera mount of claim 7, wherein the second body portion includes a stem bore configured to receive the camera mounting stem and oriented at a non-zero angle with respect to the pair of parallel bores.

9. The camera mount of claim 1, wherein the stationary pulley and the driven pulley have a one-to-one drive ratio whereby the camera mounting stem rotates counter to the drive shaft portion.

10. The camera mount of claim 1, wherein the mounting post includes an axial pneumatic supply passage and the camera mounting stem includes one or more outlet passages in fluid communication with the supply passage.

11. The camera mount of claim 10, wherein the drive housing is pneumatically sealed and wherein the one or more outlet passages and the supply passage are connected via the drive housing.

12. An orbiting camera mount, comprising:
  an anti-rotation arm configured for connection, at a first end portion, to a spindle nose of a machine tool;
  a mounting post configured for connection to a spindle of the machine tool and including a drive shaft portion extending through a second end portion of the arm;
  a drive housing fixed to the drive shaft portion for rotation therewith;
  a camera mounting stem extending from the drive housing; and
  a synchronous drive coupling the drive shaft portion with the camera mounting stem, whereby rotation of the mounting post causes the camera mounting stem to orbit around and rotate counter to the mounting post.

13. The camera mount of claim 12, wherein the camera mounting stem is oriented at a non-zero angle with respect to the mounting post.

14. The camera mount of claim 12, wherein the synchronous drive has a one-to-one drive ratio.

15. An orbiting camera system, comprising:
  an orbiting mount, including:
    an anti-rotation arm configured for connection, at a first end portion, to a spindle nose of a machine tool;
    a mounting post configured for connection to a spindle of the machine tool and including a drive shaft portion extending through a second end portion of the arm;
    a drive housing fixed to the drive shaft portion for rotation therewith;
    a camera mounting stem extending from the drive housing; and
    a synchronous drive coupling the drive shaft portion with the camera mounting stem, whereby rotation of the mounting post causes the camera mounting stem to orbit around and rotate counter to the mounting post; and
  a camera system mounted to the camera mounting stem.

16. The camera system of claim 15, wherein the camera mounting stem is oriented at a non-zero angle with respect to the mounting post.

17. The camera system of claim 15, wherein the synchronous drive has a one-to-one drive ratio.

* * * * *

UNITED STATES PATENT AND TRADEMARK OFFICE
CERTIFICATE OF CORRECTION

PATENT NO.       : 10,095,091 B2
APPLICATION NO.  : 15/480594
DATED            : October 9, 2018
INVENTOR(S)      : Larry J. Costa It is certified that error appears in the above-identified patent and that said Letters Patent is hereby corrected as shown below:

In the Specification

In Column 2, Line 16, delete "and or" and insert -- and/or --, therefor.

In Column 2, Line 28, delete "and or" and insert -- and/or --, therefor.

In Column 2, Line 38, delete "and or" and insert -- and/or --, therefor.

In Column 2, Line 38, delete "and or" and insert -- and/or --, therefor.

In Column 2, Line 52, delete "and or" and insert -- and/or --, therefor.

In Column 2, Line 52, delete "and or" and insert -- and/or --, therefor.

In Column 2, Line 67, delete "and or" and insert -- and/or --, therefor.

In Column 3, Line 7, delete "and or" and insert -- and/or --, therefor.

In Column 3, Line 7, delete "and or" and insert -- and/or --, therefor.

In Column 3, Line 20, delete "and or" and insert -- and/or --, therefor.

In Column 3, Line 20, delete "and or" and insert -- and/or --, therefor.

In Column 3, Line 35, delete "and or" and insert -- and/or --, therefor.

In Column 3, Line 45, delete "and or" and insert -- and/or --, therefor.

In Column 4, Line 5, delete "and or" and insert -- and/or --, therefor.

Signed and Sealed this
Fifth Day of February, 2019

Andrei Iancu
*Director of the United States Patent and Trademark Office*

CERTIFICATE OF CORRECTION (continued)
U.S. Pat. No. 10,095,091 B2

In Column 4, Line 5, delete "and or" and insert -- and/or --, therefor.

In Column 4, Lines 39-40, delete "and or" and insert -- and/or --, therefor.

In Column 4, Line 40, delete "and or" and insert -- and/or --, therefor.

In Column 4, Line 57, delete "and or" and insert -- and/or --, therefor.

In Column 5, Line 1, delete "and or" and insert -- and/or --, therefor.

In Column 5, Line 11, delete "and or" and insert -- and/or --, therefor.

In Column 5, Line 12, delete "and or" and insert -- and/or --, therefor.

In Column 5, Line 32, delete "and or" and insert -- and/or --, therefor.

In Column 7, Line 58, delete "836" and insert -- 8036 --, therefor.

In Column 8, Line 9, delete "-65-" and insert -- -B5- --, therefor.

In Column 10, Line 19, delete "and or" and insert -- and/or --, therefor.

In Column 13, Line 18, delete "and or" and insert -- and/or --, therefor.

In Column 18, Line 16, delete "and or" and insert -- and/or --, therefor.

In Column 21, Line 23, delete "and or" and insert -- and/or --, therefor.

In Column 24, Line 26, delete "and or" and insert -- and/or --, therefor.

In Column 24, Line 56, delete "and or" and insert -- and/or --, therefor.

In Column 25, Line 25, delete "and or" and insert -- and/or --, therefor.

In Column 25, Line 26, delete "and or" and insert -- and/or --, therefor.

In Column 25, Line 27, delete "and or" and insert -- and/or --, therefor.

In Column 25, Line 29, delete "and or" and insert -- and/or --, therefor.

In Column 26, Line 2, delete "and or" and insert -- and/or --, therefor.

In Column 26, Line 24, delete "and or" and insert -- and/or --, therefor.

In Column 26, Line 34, delete "and or" and insert -- and/or --, therefor.

CERTIFICATE OF CORRECTION (continued)
U.S. Pat. No. 10,095,091 B2

In Column 26, Line 49, delete "and or" and insert -- and/or --, therefor.

In Column 27, Line 1, delete "and or" and insert -- and/or --, therefor.

In Column 27, Line 5, delete "and or" and insert -- and/or --, therefor.

In Column 27, Line 50, delete "and or" and insert -- and/or --, therefor.

In Column 28, Line 6, delete "and or" and insert -- and/or --, therefor.

In Column 28, Line 8, delete "and or" and insert -- and/or --, therefor.

In Column 28, Line 18, delete "and or" and insert -- and/or --, therefor.

In Column 28, Line 19, delete "and or" and insert -- and/or --, therefor.

In Column 28, Line 23, delete "and or" and insert -- and/or --, therefor.

In Column 28, Line 29, delete "and or" and insert -- and/or --, therefor.

In Column 28, Line 33, delete "and or" and insert -- and/or --, therefor.

In Column 28, Line 38, delete "and or" and insert -- and/or --, therefor.

In Column 28, Line 39, delete "and or" and insert -- and/or --, therefor.

In Column 28, Line 41, delete "and or" and insert -- and/or --, therefor.

In Column 32, Line 63, delete "and or" and insert -- and/or --, therefor.

In Column 32, Line 65, delete "and or" and insert -- and/or --, therefor.

In Column 33, Line 2, delete "and or" and insert -- and/or --, therefor.

In Column 33, Line 10, delete "and or" and insert -- and/or --, therefor.

In Column 33, Line 28, delete "or and" and insert -- and/or --, therefor.

In Column 33, Line 42, delete "or and" and insert -- and/or --, therefor.

In Column 33, Line 56, delete "or and" and insert -- and/or --, therefor.

In Column 34, Line 3, delete "or and" and insert -- and/or --, therefor.

In Column 35, Line 26, delete "or and" and insert -- and/or --, therefor.

CERTIFICATE OF CORRECTION (continued)
U.S. Pat. No. 10,095,091 B2

In Column 35, Line 40, delete "or and" and insert -- and/or --, therefor.

In Column 35, Line 54, delete "or and" and insert -- and/or --, therefor.

In Column 36, Line 2, delete "or and" and insert -- and/or --, therefor.

In Column 36, Line 28, delete "or and" and insert -- and/or --, therefor.

In Column 36, Line 42, delete "or and" and insert -- and/or --, therefor.

In Column 38, Line 36, delete "and or" and insert -- and/or --, therefor.

In Column 38, Line 37, delete "and or" and insert -- and/or --, therefor.

In Column 38, Line 41, delete "and or" and insert -- and/or --, therefor.

In Column 39, Line 12, delete "and or" and insert -- and/or --, therefor.

In Column 39, Line 13, delete "and or" and insert -- and/or --, therefor.

In Column 39, Line 17, delete "and or" and insert -- and/or --, therefor.

In Column 39, Line 18, delete "and or" and insert -- and/or --, therefor.

In Column 39, Lines 20-21, delete "and or" and insert -- and/or --, therefor.

In Column 39, Line 21, delete "and or" and insert -- and/or --, therefor.

In Column 39, Line 22, delete "and or" and insert -- and/or --, therefor.

In Column 39, Line 24, delete "and or" and insert -- and/or --, therefor.